(12) United States Patent
Nishiguchi et al.

(10) Patent No.: US 7,818,579 B2
(45) Date of Patent: Oct. 19, 2010

(54) INFORMATION PROCESSOR HAVING INFORMATION DISPERSING FUNCTION

(75) Inventors: Naoki Nishiguchi, Kawasaki (JP); Kouichi Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 826 days.

(21) Appl. No.: 11/800,639

(22) Filed: May 7, 2007

(65) Prior Publication Data
US 2007/0266261 A1    Nov. 15, 2007

(30) Foreign Application Priority Data
May 12, 2006    (JP)    ............... 2006-134035

(51) Int. Cl.
*H04L 29/06*    (2006.01)
*H04L 9/08*    (2006.01)
*G06F 12/14*    (2006.01)

(52) U.S. Cl. .................. 713/181; 713/193; 380/286

(58) Field of Classification Search .............. None
See application file for complete search history.

(56) References Cited

U.S. PATENT DOCUMENTS 6,192,472 B1 *    2/2001    Garay et al. ............ 713/165

2006/0288425 A1 *    12/2006    Redlich et al. ............ 726/26

FOREIGN PATENT DOCUMENTS

JP    2005-229178    8/2005

* cited by examiner

*Primary Examiner*—Gilberto Barron, Jr.
*Assistant Examiner*—David Le
(74) *Attorney, Agent, or Firm*—Greer, Burns & Crain, Ltd.

(57) ABSTRACT

An information processor has an information dispersing function, a dividing unit for dividing a first data (DT0) into n pieces of disperse information, and executing secret sharing scheme capable of restoring the first data (DT0) by using arbitrary k pieces (1<k<n) of disperse information out of the n pieces of disperse information, a first storage control unit for storing the arbitrary k pieces of disperse information generated by the dividing unit into plurality of portable recording devices, an editing unit for reconstructing the first data (DT0) by using the k pieces of disperse information stored in the plurality of recording devices and editing the restored first data (DT0), a difference generating unit, after the dividing unit divides a second data which is post-data (DT1) originated in the restored first data into n pieces of post-edit disperse information, for calculating the difference between post-edit disperse information corresponding to the recording device and pre-edit disperse information which has been stored in the recording device, and a second storage control unit for storing, for each of the recording devices, the post-edit disperse information of the recording device and the difference corresponding to the other recording devices.

19 Claims, 42 Drawing Sheets

FIG.5

| STEP | PERSONAL COMPUTER PC | USB MEMORY | FILE SERVER (FSV) |
|---|---|---|---|
| S101 | ORIGINAL DATA DT1<br>DISPERSE INFORMATION B11<br>DISPERSE INFORMATION B21<br>DISPERSE INFORMATION B31 | — | — |
| S104 | DISPERSE INFORMATION B11 | DISPERSE INFORMATION B21 | DISPERSE INFORMATION B11<br>DISPERSE INFORMATION B21<br>DISPERSE INFORMATION B31 |

FIG.14

| STEP | PERSONAL COMPUTER PC | USB MEMORY | |
|---|---|---|---|
| START TIME | DT3  B12 | B22 | GENERATE DISPERSE INFORMATION FROM DT3 |
| S121 | DT3  B12<br>B13  B23  B33 | | |
| S122 | DT3  B12<br>B13  B23 | DITTO | |
| S123 | DT3  B12  B22<br>B13  B23 | DITTO | |
| S124 | DITTO | DITTO | |
| S125 | DT3  B12  B22<br>B13  B23<br>S(B13-B12) | DITTO | GENERATE DIFFERENCE FROM PRE-EDIT AND POST-EDIT DISPERSE INFORMATION |
| S127 | DITTO | DITTO | |
| S128 | DITTO | B22<br>S(B13-B12) | STORE DIFFERENCE INFORMATION INTO USB MEMORY |
| S129 | DITTO | DITTO | |
| S130 | DITTO | B23<br>S(B13-B12) | STORE POST-EDIT DISPERSE INFORMATION |
| S132 | B13  S(B23-B22)<br>~~DT3~~ ~~B12~~ ~~B23~~ ~~B22~~ | B23  ~~B22~~<br>S(B13-B12) | DELETE UNNECESSARY INFORMATION |

FIG.15

| STEP | PERSONAL COMPUTER PC | USB MEMORY | |
|---|---|---|---|
| START TIME | DT3  B11  S(B12-B11)<br>B13  B23 | B21<br>S(B22-B21) | CARRY-OUT DISPERSE INFORMATION EXISTS |
| S121 | DT3  B11  S(B12-B11)<br>B13  B23  B33 | DITTO | GENERATE DISPERSE INFORMATION FROM DT3 |
| S122 | DT3  B11  S(B12-B11)<br>B13  B23 | DITTO | |
| S123 | DT3  B11  S(B12-B11)<br>B13  B23  B21  S(B22-B21) | DITTO | |
| S124 | DITTO | DITTO | |
| S126 | DT3  B11  S(B12-B11)<br>B13  B23  S(B22-B21)<br>B21  S(B23-B21)<br>S(B13-B11) | DITTO | GENERATE DIFFERENCE FROM CARRY-OUT DISPERSE INFORMATION |
| S127 | DITTO | DITTO | |
| S128 | DITTO | B21<br>S(B22-B21)<br>S(B13-B11) | STORE DIFFERENCE INFORMATION INTO USB MEMORY |
| S129 | DITTO | DITTO | |
| S131 | DITTO | B21<br>S(B22-B21)<br>S(B13-B11)<br>S(B23-B21) | STORE CARRY-OUT DISPERSE INFORMATION |
| S132 | B11  ~~S(B12-B11)~~<br>~~DT3~~ ~~B13~~ ~~B23~~<br>~~S(B22-B21)~~ S(B13-B11)<br>S(B23-B21) | B21<br>~~S(B22-B21)~~<br>S(B13-B11)<br>S(B23-B21) | DELETE UNNECESSARY INFORMATION |

FIG.17

| STEP | PERSONAL COMPUTER PC | USB MEMORY | FILE SERVER FSV | |
|---|---|---|---|---|
| START TIME | B12<br>S(B22-B21) → | B22<br>S(B12-B11) | B11  B21  B31 | |
| S141 | B12  S(B22-B21)<br>B22  S(B12-B11) | DITTO | DITTO | RECONSTRUCT POST-EDIT DT2 |
| S142 | DITTO | DITTO | DITTO | GENERATE DISPERSE INFORMATION FROM DT2 |
| S144 | B12  S(B22-B21)<br>B22  S(B12-B11)  DT2 | DITTO | DITTO | |
| S145 | B12  S(B22-B21)<br>B22  S(B12-B11)  DT2<br>B32 | DITTO | | UPDATE AND STORE DISPERSE INFORMATION |
| S146 | DITTO | DITTO | B11  B21  B31<br>B12  B22  B32 | STORE BACKUP OF DISPERSE INFORMATION |
| S147 | DITTO | DITTO | B̶1̶1̶  B̶2̶1̶  B̶3̶1̶<br>B12  B22  B32 | DELETE DIFFERENCE INFORMATION |
| S148 | B12  S̶(̶B̶2̶2̶-̶B̶2̶1̶)̶  B32<br>B22  S̶(̶B̶1̶2̶-̶B̶1̶1̶)̶  DT2 | B22<br>S̶(̶B̶1̶2̶-̶B̶1̶1̶)̶ | B12  B22  B32 | |
| S149 | B12  B̶2̶2̶  B̶3̶2̶<br>D̶T̶2̶ | B22 | B12  B22  B32 | DELETE UNNECESSARY INFORMATION |

FIG.18

| STEP | PERSONAL COMPUTER PC | USB MEMORY | FILE SERVER FSV | |
|---|---|---|---|---|
| START TIME | B11  S(B12-B11)<br>S(B22-B21) | B21<br>S(B22-B21)<br>S(B12-B11) | B11 | |
| S141 | B11  S(B22-B21)<br>B21  S(B12-B11) | DITTO | DITTO | GENERATE POST-EDIT DISPERSE INFORMATION |
| S142 | DITTO | DITTO | DITTO | RECONSTRUCT POST-EDIT DT2 |
| S143 | B11  S(B22-B21)<br>B21  S(B12-B11)<br>B12  B22 | DITTO | DITTO | GENERATE DISPERSE INFORMATION FROM DT2 |
| S144 | B11  S(B22-B21)<br>B21  S(B12-B11)<br>B12  B22  DT2 | DITTO | DITTO | |
| S145 | B11  S(B22-B21)<br>B21  S(B12-B11)<br>B12  B22  B32  DT2 | DITTO | DITTO | |
| S146 | DITTO | S(B22-B21)<br>S(B12-B11)<br>B21  B22 | B11  B21  B31<br>B32 | UPDATE AND STORE DISPERSE INFORMATION |
| S147 | DITTO | DITTO | B11  B21  B31<br>B12  B22  B32 | STORE BACKUP OF DISPERSE INFORMATION |
| S148 | B11  S̶(̶B̶1̶2̶-̶B̶1̶1̶)̶<br>B21  S̶(̶B̶2̶2̶-̶B̶2̶1̶)̶<br>B12  B22  B32  DT2 | S̶(̶B̶1̶2̶-̶B̶1̶1̶)̶<br>S̶(̶B̶2̶2̶-̶B̶2̶1̶)̶<br>B̶2̶1̶  B22 | B̶1̶1̶  B̶2̶1̶  B̶3̶1̶<br>B12  B22  B32 | DELETE DIFFERENCE INFORMATION |
| S149 | B̶1̶1̶  B̶2̶1̶<br>B12  B̶2̶2̶  B̶3̶2̶  D̶T̶2̶ | B22 | B12  B22  B32 | DELETE UNNECESSARY INFORMATION |

FIG.20

| STEP | PERSONAL COMPUTER PC | USB MEMORY | FILE SERVER FSV | |
|---|---|---|---|---|
| START TIME | B13  S(B23-B22)  S(B22-B21) | — | B11  B21  B31 | OBTAIN BACKUP INFORMATION B21 |
| S151 | B13  S(B23-B22)  S(B22-B21)  B21 | | DITTO | GENERATE POST-EDIT DISPERSE INFORMATION B22 |
| S154 FIRST TIME | B13  S(B23-B22)  S(B22-B21)  B21  B22 | | DITTO | GENERATE POST-EDIT DISPERSE INFORMATION B23 |
| S154 SECOND TIME | B13  S(B23-B22)  S(B22-B21)  B21  B22  B23 | | DITTO | RECONSTRUCT POST-EDIT DT3 |
| S157 | B13  S(B23-B22)  S(B22-B21)  B21  B22  B23  DT3 | | DITTO | GENERATE DISPERSE INFORMATION FROM DT3 |
| S158 | B13  S(B23-B22)  S(B22-B21)  B21  B22  B23  B33 | | DITTO | UPDATE AND STORE DISPERSE INFORMATION |
| S159 | B13  DT3  B21  B22  B23  B33 | B23 | B11  B21  B31  B33 | |
| .... | B13 | B23 | B13  B23  B33 | DELETE UNNECESSARY INFORMATION |
| S162 | | | | |

FIG.22

| STEP | PERSONAL COMPUTER PC | USB MEMORY | FILE SERVER (FSV) |
|---|---|---|---|
| S201 | ORIGINAL DATA DT1<br>DISPERSE INFORMATION B11<br>DISPERSE INFORMATION B21<br>DISPERSE INFORMATION B31 | — | — |
| S203 | DISPERSE INFORMATION B11 | DISPERSE INFORMATION B21 | DISPERSE INFORMATION B31 |

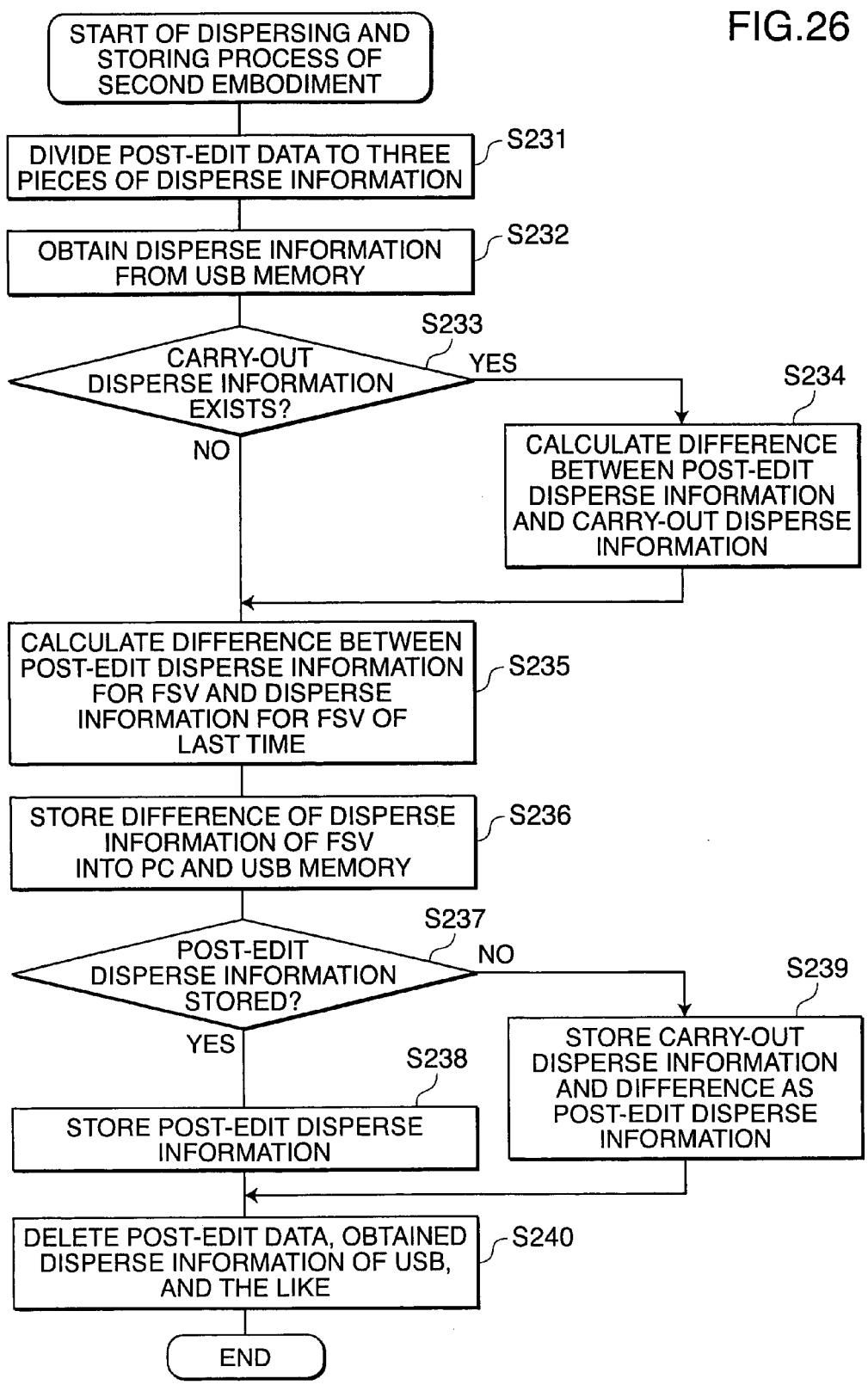

FIG.27

| STEP | PERSONAL COMPUTER PC | USB MEMORY | |
|---|---|---|---|
| START TIME | | B21<br>S(B22-B21) | |
| S231 | DT3<br>B11   S(B12-B11) | DITTO | DT3 ------><br>B13,B23,B33 |
| S232 | DT3   B23   B33<br>B11   B31   S(B12-B11)<br>            S(B22-B21) | DITTO | |
| S233 | DT3   B23   B33<br>B11   B31   S(B12-B11)<br>            S(B22-B21) | DITTO | GENERATE DIFFERENCE AFTER EDITING<br>S(B13-B11)<br>S(B23-B21) |
| S234 | DT3   B23   B33<br>B11   B31   S(B12-B11)<br>B21         S(B23-B21) | DITTO | |
| S235 | DT3   B23   B33<br>B11   B31   S(B12-B11)<br>B21         S(B23-B21)<br>S(B13-B11)<br>S(B33-B31) | DITTO | |
| S236 | DITTO | B21<br>S(B22-B21)<br>S(B33-B31) | |
| S237 | DITTO | DITTO | |
| S239 | DITTO | B21<br>S(B22-B21)<br>S(B33-B31)<br>S(B23-B21) | |
| S240 | B11   S(B13-B11)<br>      S(B33-B31) | B21<br>S(B23-B21)<br>S(B33-B31) | |

FIG.29

| STEP | PERSONAL COMPUTER PC | USB MEMORY | FILE SERVER FSV | |
|------|---------------------|------------|-----------------|---|
| START TIME | B11<br>S(B13-B11)<br>S(B33-B31) | B21<br>S(B22-B21)<br>S(B33-B31) | B31 | |
| S251 | B11<br>S(B13-B11)     B31<br>S(B33-B31) | DITTO | DITTO | OBTAIN B31 |
| S252 | B11     B31<br>S(B13-B11)  B33<br>S(B33-B31) | DITTO | B31<br>B33 | GENERATE POST-EDIT DISPERSE INFORMATION B33 |
| S253 | DITTO | DITTO | DITTO | |
| S254 | B11     B31<br>S(B13-B11)  B33<br>S(B33-B31)<br>S(B23-B21)  B21 | DITTO | DITTO | OBTAIN B21<br>AND S(B23-B21) |
| S255 | B11     B31<br>S(B13-B11)  B33<br>S(B33-B31)<br>S(B23-B21)  B21<br>B13   B23 | DITTO | DITTO | GENERATE POST-EDIT DISPERSE INFORMATION B13 AND B23 |
| S256 | B11     B31<br>S(B13-B11)  B33<br>S(B33-B31)<br>S(B23-B21)  B21<br>B13   B23 | S(B33-B31)<br>B23 | DITTO | |
| S257 | B13 | B23 | B33 | UPDATE TO POST-EDIT DISPERSE INFORMATION |

FIG.31

| STEP | PERSONAL COMPUTER PC | USB MEMORY | FILE SERVER FSV | |
|---|---|---|---|---|
| START TIME | B11<br>S(B13-B11)<br>S(B33-B31) | — | B31 | OBTAIN B31 |
| S261 | B11<br>S(B13-B11)<br>S(B33-B31)  B31 | DITTO | DITTO | GENERATE POST-EDIT DISPERSE INFORMATION B33 |
| S262 | B11  B31<br>S(B13-B11)  B33<br>S(B33-B31) | DITTO | DITTO | GENERATE POST-EDIT DISPERSE INFORMATION B13 |
| S263 | DITTO | DITTO | DITTO | GENERATE POST-EDIT DATA DT3 |
| S264 | B11  B31<br>S(B13-B11)  B33<br>S(B33-B31)  B13 | DITTO | DITTO | GENERATE POST-EDIT DISPERSE INFORMATION FROM DATA DT3 |
| S265 | B11  B31<br>S(B13-B11)  B33<br>S(B33-B31)  B13<br>        DT3 | DITTO | DITTO | |
| S266 | B11  B31<br>S(B13-B11)  B33<br>S(B33-B31)  B13<br>        DT3  B23 | DITTO | DITTO | |
| S267 | DITTO | B23 | B31<br>B33 | |
| S268 | DITTO | B23 | B̶3̶1̶<br>B33 | |
| S269 | B13 | B23 | B33 | UPDATE TO POST-EDIT DISPERSE INFORMATION |

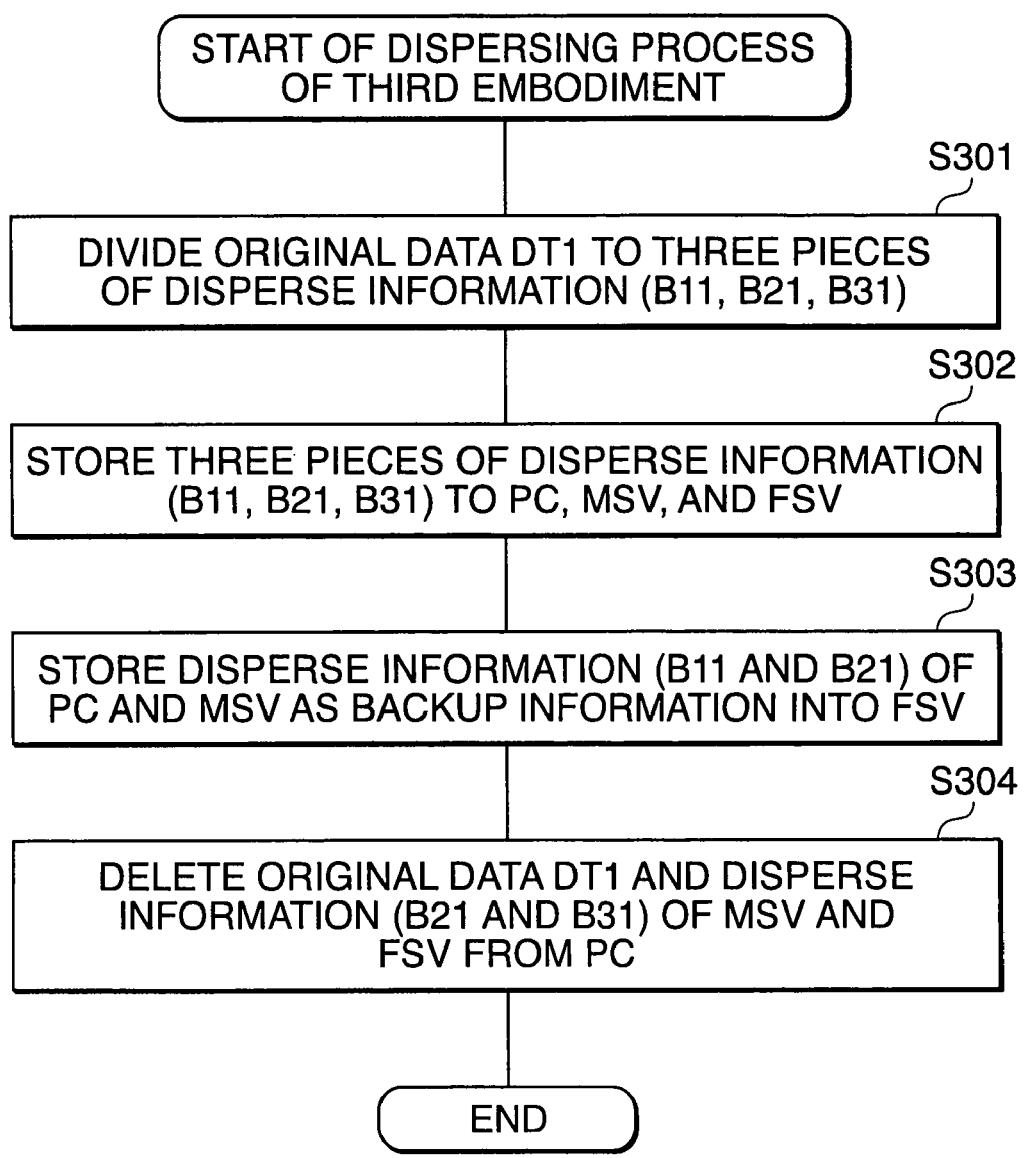

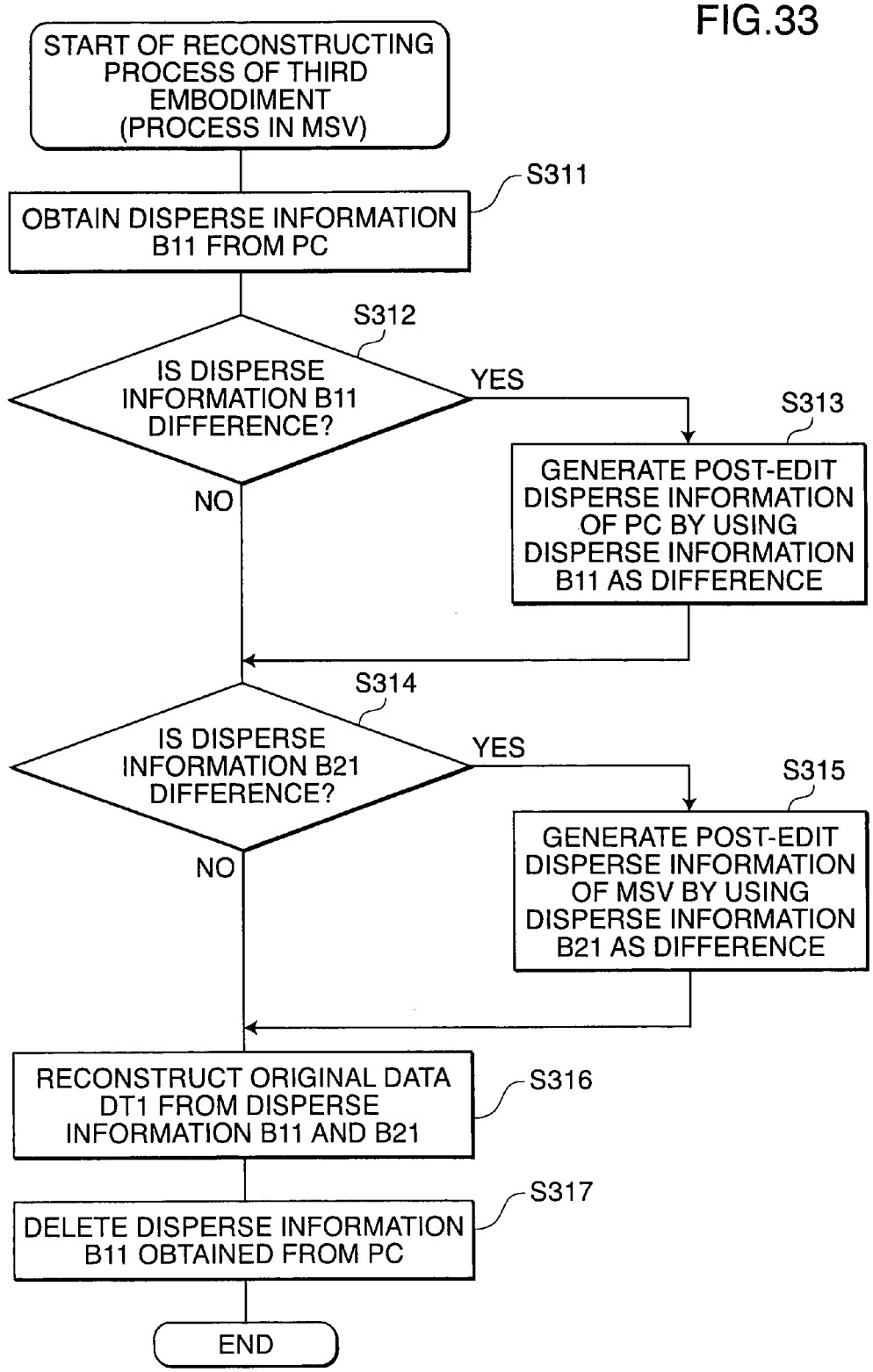

INFORMATION PROCESSOR HAVING INFORMATION DISPERSING FUNCTION

CROSS-REFERENCE TO RELATED APPLICATION

This application is related to Japanese patent application No. 2006-134035 filed on May 12, 2006 whose priority is claimed under 35 USC §119, the disclosure of which is incorporated by reference in its entirety.

BACKGROUND OF THE INVENTION

1. Field of the Invention

The present invention relates to an information processor and, more particularly, to an information processor having an information dispersing function for preventing information leakage when a personal computer is forgotten or stolen, by dividing one piece of data into a plurality of pieces of disperse information and holding the disperse information by using the secret sharing scheme.

2. Description of the Related Art

In some cases, an important file of a secret document or the like is subjected to a special process such as ciphering and the processed file is stored, or divided into some files and stored in devices or memories which are physically different from each other so that even if the file is stolen, the data in the file cannot be reconstructed.

For example, a technique of dividing one file into a plurality of pieces of disperse information and storing the plurality of pieces of information by using the secret sharing scheme has been proposed (see Japanese Patent Laid-Open No. 2005-229178).

By collecting and combining some of the plurality of pieces of disperse information, the original file divided into the plurality of pieces of disperse information by the secret sharing scheme can be reconstructed. Redundancy can be provided so that an original file can be reconstructed by using the number of pieces of disperse information smaller than the division number. Even in the case where one piece of the disperse information is stolen, the original file can be reconstructed from the other disperse information.

For example, in the case of carrying secret data to an outside place, by storing disperse information of the secret data, by which the secret data can be reconstructed, into some devices (such as a personal computer, a USB memory, an FD, and the like) and carrying only necessary devices, the risk that all of the devices are stolen can be reduced. Since the secret data cannot be reconstructed unless all of the devices are used, it can be guaranteed that leakage of information does not occur.

FIG. 42 is a schematic view of conventional information dispersion and reconstruction.

It is assumed that original data D00 is generated and stored by a personal computer and, at the time of storage, the original data D00 is dispersed to three pieces of information with a threshold value 2 by using the secret sharing scheme.

The threshold value denotes here the number of pieces of disperse information from which the original data can be reconstructed. The "threshold value 2" denotes that the original data can be reconstructed from any two pieces of disperse information out of the three pieces of disperse information.

For example, the original data D00 is divided into three pieces of disperse information (1, 2, 3) which are stored into a hard disk in a personal computer (PC), a USB memory, and a server.

After that, the user carries only the personal computer (PC) and the USB memory, that is, only two pieces of disperse information (1, 2).

The user reads the two pieces of disperse information (1, 2) to edit the original data D00 in an outside place. Although the three pieces of disperse information are not available, the original data D00 is reconstructed from the two pieces of disperse information (1, 2) and becomes an editable state.

After the reconstructed original data D00 is edited, post-edit data D01 which is partly different from the original data D00 is obtained. When the post-edit data D01 is stored in an outside place, by using a similar secret sharing scheme, the data D01 is divided into three pieces of disperse information (A, B, and C).

In the case of editing the original data D00 in an outside place, when the secret sharing scheme is performed again after the editing, disperse information C for the device which is not carried out is also generated. However, the device (server) which is not carried out is not available on an outside place, so that the disperse information C cannot be stored. When the post-edit disperse information C is stored in the hard disk of the personal computer, two pieces of the post-edit disperse information A and C exist in the hard disk, so that the post-edit data D01 can be reconstructed only in the personal computer. It is unpreferable from the viewpoint of security. Therefore, the disperse information C is deleted. When the disperse information C is deleted, redundancy as the feature of the secret sharing scheme is lost.

As the countermeasure against the problem, it is considered to update the disperse information via a network in the device which is not carried out. However, it is not always possible to connect the device via a network in an outside place. Consequently, also in the case where editing is made off-line in the outside place, the disperse information C is deleted, so that the redundancy may be lost.

In such a state where there is no redundancy, even one of the devices (for example, the USB memory) is stolen, the post-edit data D01 cannot be reconstructed. Even if the secret data D00 before it is taken out is pre-stored on a device in a safe place, the post-edit data D01 is lost.

SUMMARY OF THE INVENTION

The present invention provides an information processor having an information dispersing function, including: a dividing unit for dividing a first data into n pieces of disperse information, and executing secret sharing scheme capable of restoring the first data by using arbitrary k pieces (1<k<n) of disperse information out of the n pieces of disperse information; a first storage control unit for storing the arbitrary k pieces of disperse information out of the disperse information generated by the dividing unit into plurality of recording devices; an editing unit for reconstructing the first data by using the k pieces of disperse information stored in the plurality of recording devices and editing the restored first data; a difference generating unit, after the dividing unit divides a second data which is post-edit data originated in the restored first data into n pieces of post-edit disperse information, for calculating the difference between post-edit disperse information corresponding to the recording device and pre-edit disperse information which has been stored in the recording device; and a second storage control unit for storing, for each of the recording devices, the post-edit disperse information of the recording device and the difference corresponding to the other recording devices.

With the configuration, even if one recording device A is lost after edition of data, the difference for the lost recording device A is stored in the other recording device, so that the post-edit data can be reconstructed. Without loosing redundancy, all of post-edit disperse information is reconstructed and the subsequent editing can be continued.

BRIEF DESCRIPTION OF THE DRAWINGS

FIG. 5 is a diagram illustrating storages of the disperse information of the first embodiment of the invention;

FIG. 14 is a diagram showing storages of the disperse information of the first embodiment of the invention;

FIG. 15 is a diagram showing storages of the disperse information of the first embodiment of the invention;

FIG. 17 is a diagram showing storages of the disperse information of the first embodiment of the invention;

FIG. 18 is a diagram showing storages of the disperse information of the first embodiment of the invention;

FIG. 20 is a diagram showing storages of the disperse information of the first embodiment of the invention;

FIG. 22 is a diagram showing storages of the disperse information of the second embodiment of the invention;

FIG. 26 is a flowchart of a dispersing and storing process of the second embodiment of the invention;

FIG. 27 is a diagram showing storages of the disperse information of the second embodiment of the invention;

FIG. 29 is a diagram showing storages of the disperse information of the second embodiment of the invention;

FIG. 31 is a diagram showing storages of the disperse information of the second embodiment of the invention;

FIG. 32 is a flowchart of a dispersing process of a third embodiment of the invention;

FIG. 33 is a flowchart of a reconstructing process of the third embodiment of the invention;

DESCRIPTION OF THE PREFERRED EMBODIMENTS

Figure 1:
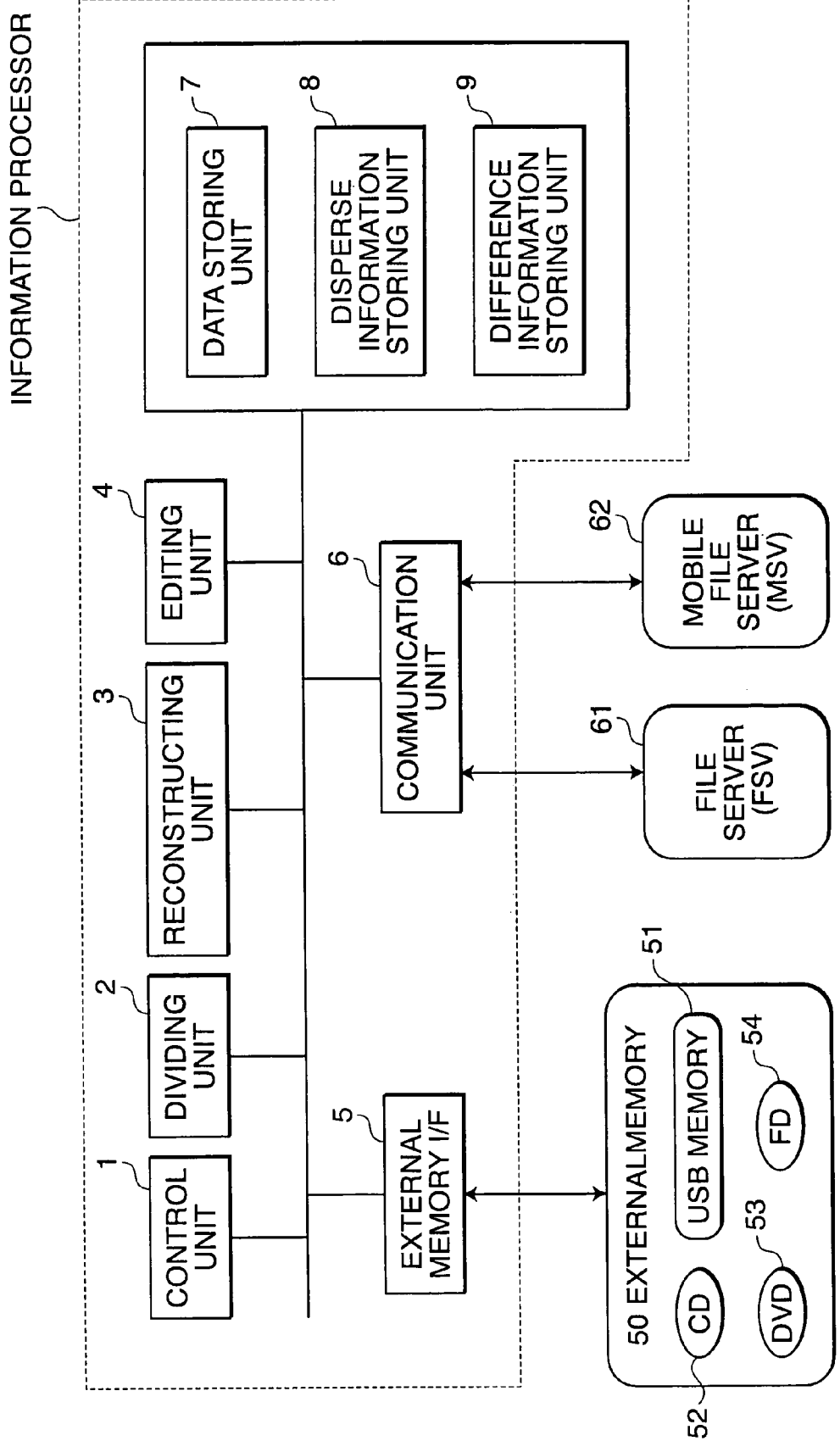
FIG. 1 is a configuration block diagram showing an example of an information processor of the present invention.

This present invention is an information processor capable of storing post-edit disperse information and reconstructing post-edit data while assuring security of information without loosing redundancy as the feature of the secret sharing scheme by utilizing the difference between pre-edit disperse information and post-edit disperse information.

In the information processor of the present invention, the portable recording device is a portable recording medium which is detachable from the information processor and, by connecting the recording medium, editing works can be performed.

Further, in the information processor, the remaining (n−k) pieces of disperse information which are not stored in the plurality of recording devices out of the n pieces of disperse information generated by the dividing unit are stored in (n−k) pieces of not-carried information devices in a one-to-one corresponding manner, one of the not-carried information devices is a file server, and all of the n pieces of disperse information generated by the dividing unit are stored in the file server before the recording devices are carried out. That is, in the file server, a backup copy of all of generated disperse information is made. In this case, by applying the difference generated after editing to the disperse information stored in the file server, the post-edit data can be reconstructed. The plurality of recording devices may be k pieces of portable recording devices.

Further, the pre-edit disperse information is carry-out disperse information generated by the dividing unit before the recording device is carried out. In this case, by using the carry-out disperse information and the difference generated after editing, the post-edit data can be reconstructed.

When the pre-edit disperse information is carry-out disperse information generated by the dividing unit before the recording device is carried out, the second storage control unit stores the carry-out disperse information and the difference generated by the difference generating unit, but does not store the post-edit disperse information.

In this case, since the post-edit disperse information is not stored, the capacity of a recording device may be small. Even in the case where the number of editing times in an outside place is large, the difference to be recorded does not increase. Thus, the recording capacity can be suppressed.

Further, the pre-edit disperse information is post-edit disperse information generated in an editing operation of last time, the difference is calculated from the post-edit disperse information and the pre-edit disperse information and, when the editing operation is performed a plurality of times, all of differences calculated for the editing operations of the plurality of times are stored.

As the portable recording medium, any of a flash memory, a USB memory, a magneto-optical recording medium, and a magnetic recording medium can be used. Alternatively, a medium capable of storing disperse information such as a network storage may be used.

The information processor further includes a reconstructing unit for generating post-edit disperse information corresponding to the k pieces of recording devices from disperse information corresponding to the k pieces of recording devices stored in the file server and the differences corresponding to the recording devices stored by the second storage control unit after editing, and reconstructing the post-edit data from the generated k pieces of post-edit disperse information.

The information processor further includes an updating unit for storing n pieces of post-edit disperse information into corresponding k pieces of recording devices and (n−k) pieces of information devices. The n pieces of post-edit disperse information are obtained by dividing the post-edit data reconstructed by the reconstructing unit into n pieces by the dividing unit. With the configuration, not only all of disperse information stored in the file server but also dispersion information stored in a not-carried information device can be updated to post-edit disperse information and synchronized with each other.

The present invention also provides an information processor having an information dispersing function, including: a dividing unit for dividing a first data into n pieces of disperse information, and executing secret sharing scheme capable of restoring the first data by using arbitrary k pieces ($1<k<n$) of disperse information out of the n pieces of disperse information; a first storage control unit for storing the arbitrary k pieces of disperse information, out of the disperse information generated by the dividing unit into plurality of recording devices; an editing unit for reconstructing the first data by using the k pieces of disperse information stored in the plurality of recording devices and editing the restored first data; a difference generating unit, after the dividing unit divides a second data which is post-edit data originated in the restored first data into n pieces of post-edit disperse information, for calculating the difference between (n−k) pieces of post-edit disperse information which do not correspond to any of the recording devices and (n−k) pieces of pre-edit disperse information which do not correspond to any of the recording devices which is obtained from post-restored first data; wherein (n−k) pieces of pre-edit disperse information obtain from the restored data DT0, and a second storage control unit for storing, for each of the recording devices, the post-edit disperse information of the recording device and the difference.

With the configuration, even if one of the recording devices is lost, by using the difference of the information of the remaining recording devices, the post-edit data can be reconstructed.

The information processor further includes an updating unit for generating post-edit disperse information corresponding to the not-carried (n−k) pieces of information devices from (n−k) pieces of differences generated by the difference generating unit and (n−k) pieces of disperse information stored in the not-carried (n−k) pieces of information devices, and storing the generated post-edit disperse information into the corresponding (n−k) pieces of information devices.

With the configuration, without a process of reconstructing post-edit data to generate again post-edit disperse information, the disperse information of a not-carried information device can be easily updated.

The present invention also provides a program of an information processor for making a computer realize: a dividing function of dividing a first data into n pieces of disperse information, and executing secret sharing scheme capable of restoring the first data by using arbitrary k pieces ($1<k<n$) of disperse information out of the n pieces of disperse information; a first storage control function of storing the arbitrary k pieces of disperse information out of the n pieces of disperse information generated into plurality of different recording devices which can be carried; an editing function of reconstructing the first data by using the k pieces of disperse information stored in the recording devices and editing the restored first data; a difference generating function, after division of post-edit data into n pieces of post-edit disperse information, of calculating the difference between post-edit disperse information corresponding to the recording device and pre-edit disperse information which has been stored in the recording device; and a second storage control function of storing, for each of the recording devices, the post-edit disperse information of the recording device and the difference corresponding to the other recording devices.

The present invention also provides a program of an information processor having an information dispersion function for making a computer realize: a dividing function of dividing a first data into n pieces of disperse information, and executing secret sharing scheme capable of restoring the first data by using arbitrary k pieces ($1<k<n$) of disperse information out of the n pieces of disperse information; a first storage control function of storing the arbitrary k pieces of disperse information out of the n pieces of disperse information generated into plurality of different recording devices; an editing function of reconstructing the first data by using the k pieces of disperse information stored in the plurality of recording devices and editing the restored first data; a difference generating function, after division of post-edit data to n pieces of post-edit disperse information, of calculating the difference between (n−k) pieces of post-edit disperse information which do not correspond to any of the recording devices and (n−k) pieces of pre-edit disperse information which do not correspond to any of the recording devices which is obtained from post-restored first data; a second storage control function of storing, for each of the recording devices, the post-edit disperse information of the recording device and the difference.

The present invention also provides an information dispersing and storing system including an information processor capable of editing a first data, a plurality of portable recording devices, and a file server connected to the information processor via a network, wherein the information processor includes: a dividing unit for dividing the first data into n pieces of disperse information, and executing secret sharing scheme capable of restoring the first data by using arbitrary k pieces (1<k<n) of disperse information out of the n pieces of disperse information; a first storage control unit for storing the arbitrary k pieces of disperse information out of the disperse information generated by the dividing unit into plurality of different portable recording devices; an editing unit for reconstructing the first data by using the k pieces of disperse information stored in the plurality of recording devices and editing the restored first data; a difference generating unit, after the dividing unit divides post-edit data DT1 to n pieces of post-edit disperse information, for calculating the difference between post-edit disperse information corresponding to the recording device and pre-edit disperse information which has been stored in the recording device; and a second storage control unit for storing, for each of the recording devices, the post-edit disperse information of the recording device and the difference corresponding to the other recording devices, when the recording device and the information processor are carried out, all of carry-out disperse information generated by the dividing unit before carry-out is stored in the file server, in each of the recording devices, carry-out disperse information generated by the dividing unit before carry-out and corresponding to the recording device is stored, and after the editing process by the editing unit, post-edit disperse information corresponding to the recording device and the difference is stored by the second storage control unit.

Here, the information dispersing and storing system further includes a reconstructing unit, when a recording device A out of the carried recording devices is lost, for generating post-edit disperse information corresponding to the recording device A by using carry-out disperse information corresponding to the recording device A and stored in the file server and the differences corresponding to the recording device A and stored by the recording devices other than the recording device A, and reconstructing post-edit data from post-edit disperse information corresponding to the recording devices other than the recording device A and stored in the other recording devices and the generated post-edit disperse information corresponding to the recording device A.

The present invention corresponds to the following first and third embodiments.

The present invention also provides an information dispersing and storing system including an information processor capable of editing a first data, a plurality of portable recording devices, and a file server connected to the information processor via a network, wherein the information processor includes: a dividing unit for dividing the first data into n pieces of disperse information, and executing secret sharing scheme capable of restoring the first data by using arbitrary k pieces (1<k<n) of disperse information out of the n pieces of disperse information; a first storage control unit for storing the arbitrary k pieces of disperse information which can be carried, out of the disperse information generated by the dividing unit into plurality of recording devices; an editing unit for reconstructing the first data by using the k pieces of disperse information stored in the plurality of recording devices and editing the restored first data; a difference generating unit, after the dividing unit divides a second data which is post-edit data originated in the restored first data into n pieces of post-edit disperse information, for calculating the difference between (n−k) pieces of post-edit disperse information which do not correspond to any of the recording devices and (n−k) pieces of pre-edit disperse information which do not correspond to any of the recording devices; and wherein (n−k) pieces of pre-edit disperse information obtain from the restored data DT0, and a second storage control unit for storing, for each of the recording devices, the post-edit disperse information of the recording device and the difference, and when the recording devices and the information processor are carried out, carry-out disperse information generated by the dividing unit before carry-out and corresponding to the file server and the recording devices is stored in the file server and the recording devices.

Here, the information dispersing and storing system further includes a reconstructing unit, when a recording device A out of the carried recording devices is lost, for generating post-edit disperse information corresponding to the file server by using carry-out disperse information corresponding to the file server and stored in the file server and the difference corresponding to the file server and stored in the recording device other than the recording device A, and reconstructing post-edit data from post-edit disperse information corresponding to the recording devices other than the recording device A and stored in the other recording devices and the generated post-edit disperse information corresponding to the file server.

The present invention corresponds to the following second and fourth embodiments.

In the present invention, the function blocks of a dividing unit, a first storage control unit, an editing unit, a difference generating unit, a second storage control unit, a reconstructing unit, and an updating unit are realized by a microcomputer having a CPU, a ROM, a RAM, an I/O controller, a timer, and the like. The CPU organically operates the hardware on the basis of a program recorded on a ROM, RAM, or the like, thereby realizing the functions of the function blocks of the invention.

In the configuration block diagram of FIG. 1 in the following embodiment, the function blocks other than the dividing unit, the reconstructing unit, and the editing unit explicitly expressed correspond to one function of the control unit.

In the first and second embodiments, a recording device which can be carried out corresponds to the USB memory as one of representative recording media being used today.

The information processor of the invention itself has a recording medium such as a hard disk. The information processor is a computer having software capable of editing data and corresponds to a portable personal computer or workstation having a small size and a light weight enough to be carried out.

In the hard disk of the information processor, various information necessary to execute the functions is stored. In the case where the hard disk is regarded as a recording medium for storing data edited by the user, the hard disk functions as a recording device for recording one piece of disperse information. That is, data to be edited is temporarily recorded on the hard disk. In this case, the data itself is not fixedly recorded but one piece of disperse information obtained by dividing the data is stored. In particular, in the case of carrying out the information processor, data itself is not stored in the hard disk but one piece of disperse information obtained from the data is stored.

In the embodiments of the invention, a file server (FSV) can be used as an information device which is not carried out. In the file server (FSV) which is not carried out, only disperse information corresponding a file server itself may be stored or all of "n" pieces of the generated disperse information may be stored. As an information device which is not carried out, a desk-top computer or workstation, other network file servers, or a simple recording medium can be also used.

In the following first and third embodiments, the case where all of the disperse information generated before it is carried out is stored in a file server (FSV) will be described.

In the second and fourth embodiments, the case where only disperse information corresponding to a file server (FSV) itself is stored in the file server (FSV) will be described.

As one of recording devices which can be carried out, a mobile file server (MSV) may be used. In this case, the mobile file server (MSV) includes a recording device. When the portable file server is carried out, only disperse information corresponding to the file server (MSV) is stored in the recording device.

The mobile file server (MSV) is a computer having a small size and a light weight enough to be carried out. The mobile file server (MSV) has basic functions required for a general file server. Further, it is assumed that the mobile file server (MSV) has a software module and a hardware module realizing the functions of the function blocks (such as the dividing unit and the reconstructing unit) other than the editing function performed by the editing unit.

In the following first and second embodiments, the case of using a USB memory as the mobile recording device will be described. In the second and fourth embodiments, the case of carrying the mobile file server (MSV) in place of the USB memory will be described.

Embodiments of the present invention will be described hereinbelow with reference to the drawings. The invention is not limited by the following description of the embodiments.

(Configuration of Information Processor of the Invention)

FIG. 1 is a configuration block diagram of an information processor of the present invention.

The information processor of the invention is a computer on which software or hardware realizing the information dispersing function is mounted, and various devices such as a personal computer PC and a workstation WS.

The information processor of the invention is constructed mainly by a control unit 1, a dividing unit 2, a reconstructing unit 3, an editing unit 4, an external memory I/F 5, a communication unit 6, and three storing units (7, 8, 9).

As the control unit 1, a microcomputer including a CPU, a RAM, a ROM, an I/O controller, and a timer can be used. The dividing unit 2, reconstructing unit 3, and editing unit 4 are function blocks which can be realized when the CPU operates the hardware on the basis of a program stored on the ROM or the like.

The dividing unit 2 is a part for dividing data generated or obtained by the user to a predetermined number of disperse information by using the secret sharing scheme. Generally, in the case where original data DT is divided by using a threshold value K into "n" pieces (n>K) of disperse information (B1, B2, . . . , and Bn), by performing a predetermined reconstructing process using k pieces of disperse information (k denotes an arbitrary number smaller than "n"), the original data DT can be reproduced.

The reconstructing unit 3 is a part for reproducing the original data before it is divided by using disperse information of the number smaller than the number of division.

The editing unit 4 is a part that provides an interface for performing editing process such as generation, addition, change, deletion, and the like on data by the user, and includes input means such as a keyboard and a mouse, display means such as a CRT and an LCD, and printing means such as a printer.

Data edited by the user includes various information such as characters, signs, figures, images, and sounds and is not limited to characters.

The external memory I/F 5 is a part for connecting a recording/reproducing apparatus capable of recording and reproducing information to/from an external storing medium such as a CD-RW, DVD-RAM, DVD-RW, blue-ray disc, HD DVD, MO, FD, or USB memory. The external memory such as a USB memory having an USB interface may be directly connected. The external memory may be connected by a wire or wirelessly.

As the external memory 50, a portable nonvolatile medium (a USB memory 51, a CD 52, a DVD 53, an FD 54, or the like), an externally-connected hard disk, or an external memory device of a connection mode using infrared ray can be used.

The communication unit 6 is a part for performing communication with a file server (FSV) 61 or a mobile file server (MSV) 62 via a network such as a LAN.

At least one of a plurality of pieces of disperse information generated by the dividing unit 2 is stored in the memory such as a hard disk in the information processor. The other disperse information is transferred to other recording media and servers via the external memory I/F 5 and the communication unit 6. Preferably, the transferred disperse information and the original data is deleted from the hard disk.

The file server (FSV) 61 is a computer for recording and managing data generated or obtained by the user and is connected, for example, to an information processor of the invention via a network such as the LAN. The file server (FSV) 61 is a desktop computer which cannot be carried out. All of data generated by the user may be stored as backup data in the file server (FSV) 61.

As the backup data, the data itself may be stored or data obtained by performing a process such as ciphering on the data so as not to be easily read by an outsider may be stored. Alternately, disperse information obtained by dividing the data into some pieces may be stored.

The mobile file server (MSV) 62 is a computer having the function similar to that of the file server 61 but having a small size and a light weight enough to be easily carried.

The mobile file server (MSV) 62 also has the function of being connected to a network such as a LAN. Due to its portability, the mobile file server (MSV) 62 preferably has not only a function of wire-connection to a network but also a wireless connection function.

The information processor also has a nonvolatile stationary recording device such as a hard disk.

The hard disk (HDD) mainly has the data storing unit 7 that stores the original data (or file) itself generated by the user, the disperse information storing unit 8 that stores disperse information generated by the dividing unit 2, and the differential information storing unit 9 that stores the difference between pre-edit disperse information and post-edit disperse information.

In the invention, in the case where an instruction of dispersing data and storing the dispersed data is given after the user generates or edits data, the dividing unit 2 performs the data dispersing process. By the dispersing process, some pieces of disperse information are generated. All of the generated disperse information is temporarily stored in the disperse information storing unit 8. The disperse information transferred to another external memory or the like is deleted from the disperse information storing unit 8 except for disperse information to be stored on the internal hard disk. To present leakage and illegal use of information, the generated original data is also deleted from the data storing unit 7 as a rule.

As for the difference of the disperse information, except for only the difference to be stored in the hard disk, the difference transferred to another external memory and the server (FSV) is deleted from the differential information storing unit 9.

The disperse information and the like is deleted automatically after it is transferred to an external memory and the like in response to a disperse information storing instruction. It is also possible to inquire the user of whether the disperse information can be deleted or not and, when the user gives an erasing instruction, delete the disperse information and the like. Alternatively, whether the erasing process is executed or not can be set as an initial setting.

(Description of Outline of Dispersing Process and Reconstructing Process of the Invention)

(Description of Example A)

Figure 2:
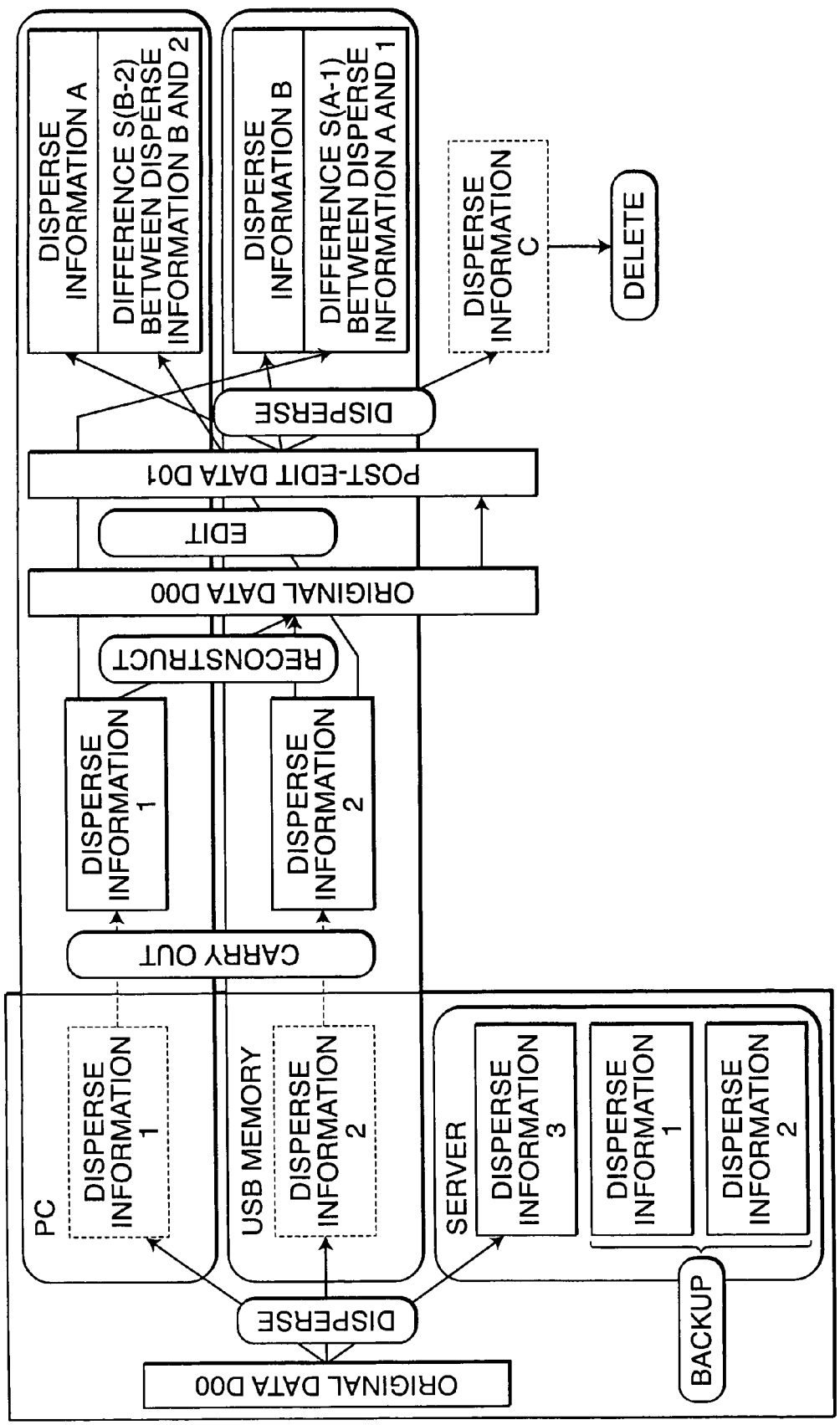
FIG. 2 is a diagram illustrating a schematic example A of information dispersing and reconstructing process of the invention.

FIG. 2 is a schematic diagram showing an example A of information dispersing and reconstructing processes of the information processor of the invention.

FIG. 2 shows the case where information is dispersed and the disperse information is reconstructed with "threshold value 2". That is, it is assumed that original data D00 is divided into three pieces of disperse information 1, 2, and 3, and the original data D00 is reconstructed by using two pieces of the disperse information out of the three pieces of disperse information. The disperse information 1, 2, and 3 is stored in the information processor (personal computer PC) of the invention, a USB memory, and a file server (FSV), respectively.

All of the three pieces of disperse information (1, 2, and 3) divided initially is stored in the file server (FSV) 61. That is, backup information of all of the disperse information is stored in the file server FSV 61.

After the disperse information of the original data is stored in the personal computer PC, the USB memory, and the FSV, the personal computer PC and the USB memory are carried to an outside place.

Figure 40:
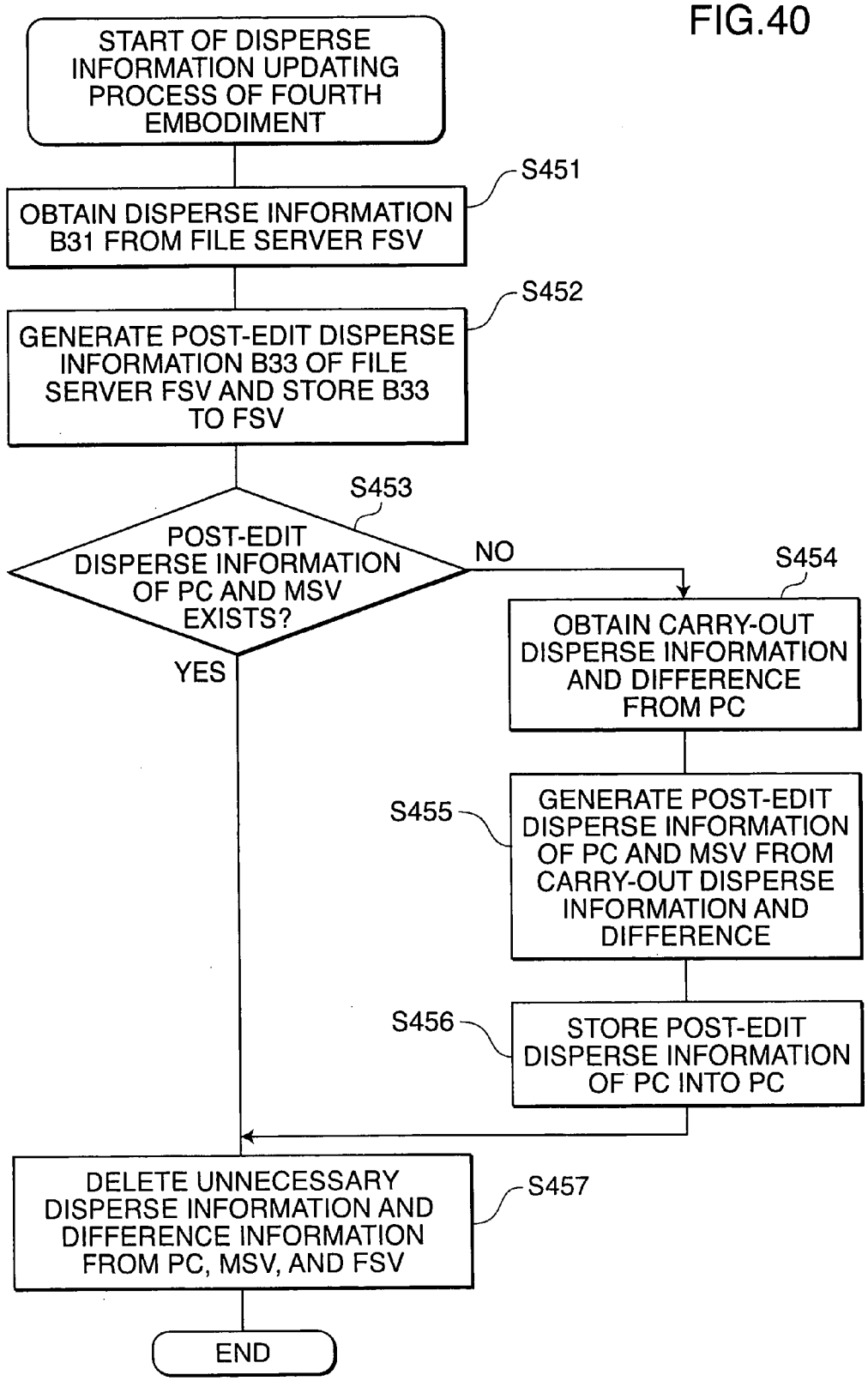
FIG. 40 is a flowchart of a disperse information updating process of the fourth embodiment of the invention.

The process of editing the original data D00 to generate the post-edit data D01 after the personal computer PC and the USB memory are carried out in FIG. 2 is the same as the conventional dispersing process shown in FIG. 40.

However, the example A is different from the conventional technique with respect to the point that when the generated post-edit data D01 is stored, not only the disperse information (A, B, and C) but also difference information S is generated, and both of the disperse information and the difference is stored in the hard disk of the PC and the USB memory.

In FIG. 2, when the post-edit data D01 is dispersed and stored, the dividing unit 2 generates three pieces of disperse information (A, B, and C) and generates the differences between the two pieces of disperse information (A and B) and the carried two pieces of disperse information (1 and 2) which is not subjected to the editing, respectively.

In FIG. 2, the difference information (S(A−1)) between the generated disperse information A and the corresponding pre-edit disperse information 1 is generated and stored in the carried USB memory.

The difference information (S(B−2)) between the generated disperse information B and the corresponding pre-edit disperse information 2 is generated and stored in the hard disk of the carried personal computer. That is, the difference information stored in the personal computer is the difference in the USB memory, and the difference information stored in the USB memory is the difference in the personal computer.

The difference information is generally data including only the different part between two pieces of disperse information. To reduce the amount of the difference information, a compressing process may be performed on the pre-edit and post-edit disperse information or a compressing process may be performed on the data D01. Any difference extracting algorithm can be used.

The post-edit data D01 itself is deleted from the hard disk.

In FIG. 2, post-edit disperse information C corresponding to the file server FSV 61 which is not carried out is also generated. The disperse information C is immediately deleted.

In the foregoing embodiment, after editing, the post-edit disperse information A and the difference information S(B−2) in the USB memory is stored in the hard disk of the personal computer. In the USB memory, the post-edit disperse information B and the difference information S(A−1) in the personal computer is stored.

In the case of performing the editing again in such an edited state, it is sufficient to reproduce the post-edit data D01 by using the post-edit disperse information (A and B) and repeat similar editing.

In the case of performing the editing process after the editing process of the first time, when the information is dispersedly stored after the editing process of the second time, the difference is further added and stored in the PC and the USB memory. That is, the difference information S is additionally stored only by the number of editing times.

The difference information S is used to update the disperse information stored as backup information in the FSV 61 to the post-edit disperse information. The disperse information of the FSV 61 is updated by reconstructing D01 from the disperse information A and B and dispersing D01 again.

For example, in the case where the carried USB memory is lost, the user returns from an outside place and restores the post-edit disperse information B in the USB memory from the difference information S(B−2) stored in the personal computer PC and the disperse information 2 stored as backup information in the FSV 61. After that, the post-edit data D01 is reconstructed by using the post-edit disperse information A stored in the personal computer and the post-edit disperse information B in the USB memory reconstructed.

The disperse information 3 in the FSV 61 which is not carried out is updated to the disperse information C by executing again the dispersing process on the reconstructed post-edit data D01 to generate the post-edit disperse information C.

By performing the dispersing and reconstructing processes as described above, redundancy of the post-edit disperse information is assured. Even if a carried device is lost, when one carried device remains, by using the difference information for the carried other device, the post-edit disperse information of the carried device is reconstructed and the post-edit data can be finally reconstructed.

By using the post-edit difference information, the disperse information of the device which is not carried can be updated to post-edit information.

In the example A, when the dispersing process after editing is performed, the post-edit disperse information (A, B) and the difference information is stored in the personal computer PC and the USB memory. However, the invention is not limited to the example A.

For example, there are four methods of storing the disperse information and the difference information as shown in FIGS. 11A to 11D.

FIGS. 11A to 11D are diagrams illustrating examples of information subjected to the dispersing process after editing and stored.

Figure 11A:
FIGS. 11A to 11D are diagrams showing examples of a storing format of the disperse information of the invention.

FIG. 11A shows the case where only post-edit disperse information (for example, B12 which will be described later) is stored.

Figure 11B:
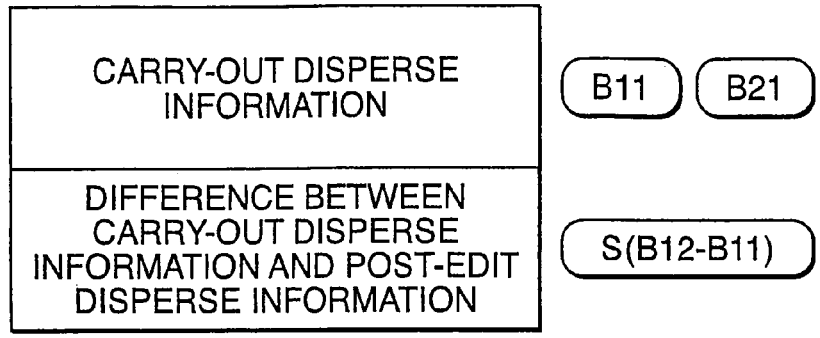

FIG. 11B shows the case where disperse information (for example, B11 which will be described later) at the time of carry-out and the difference information (the difference between the post-edit disperse information and the disperse information at the time of carry-out) is stored. The difference information is, for example, S(B12–B11) which will be described later.

Figure 11C:
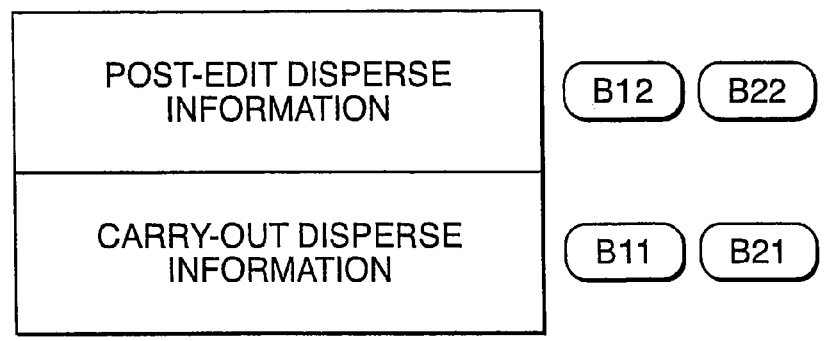

FIG. 11C shows the case where the disperse information (B11) at the time of carry-out and the post-edit disperse information (B12) is stored.

Figure 11D:
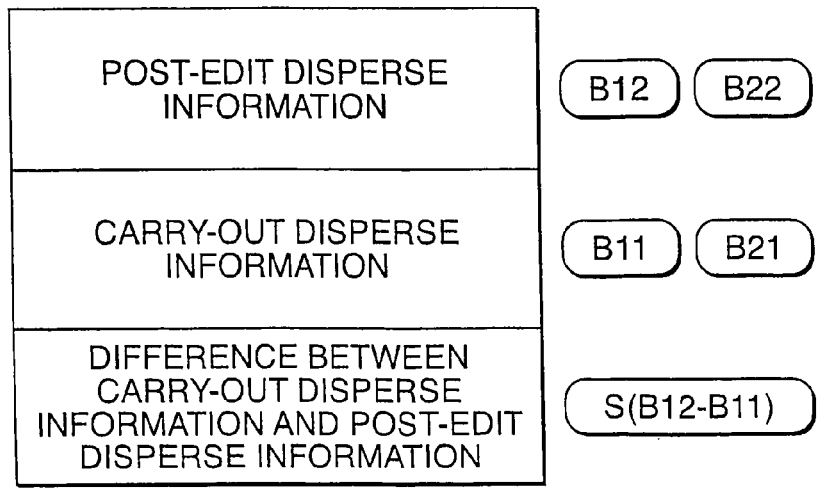

FIG. 11D shows the case where the disperse information (B11) at the time of carry-out, the post-edit disperse information (B12), and the difference information (S(B12–B11)) is stored.

In the case of FIG. 11A, the time of the process of reconstructing data of the next time after editing can be shortened. However, the difference information is generated from the immediately preceding disperse information, so that difference information of the amount corresponding to the number of editing times is necessary.

The case of FIG. 11B has an advantage such that even if the editing operation is repeated at an outside place, the difference information to be stored is not increased and the recording amount is small. The case also has an advantage that updating of the disperse information of the file server and updating of the disperse information when a recording device is lost can be performed by applying the difference. However, it takes time to perform a process such as reconstruction of pre-edit data.

The case of FIG. 11C has an advantage that the reconstructing process can be performed fast and the difference information does not increase.

The case of FIG. 11D has all of the above-described advantages but the amount of the disperse information is large.

In a first embodiment to be described later, the case of employing information shown in FIG. 11B as a format of storing post-edit disperse information or the like will be mainly described.

There are the case where only one piece of difference information is always stored in the personal computer and the USB memory and the case where the difference information is added each time the editing operation is performed in an outside place.

Figure 12:
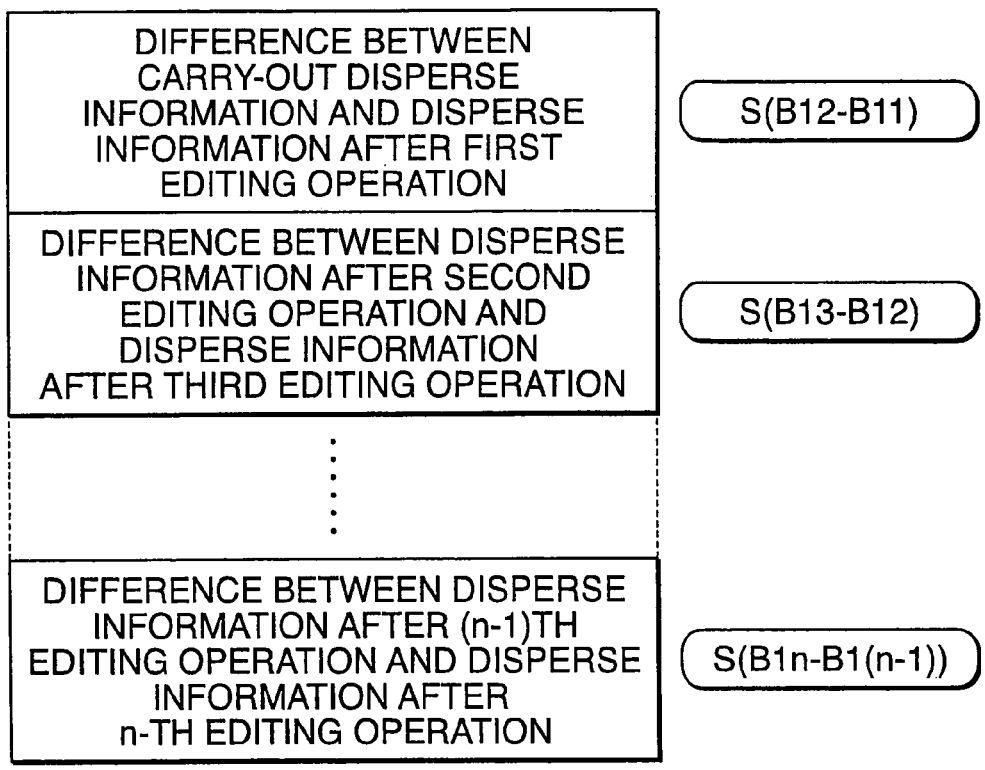
FIGS. 12A and 12B are diagrams showing examples of a storing format of differential information of the invention.
Figure 12B:
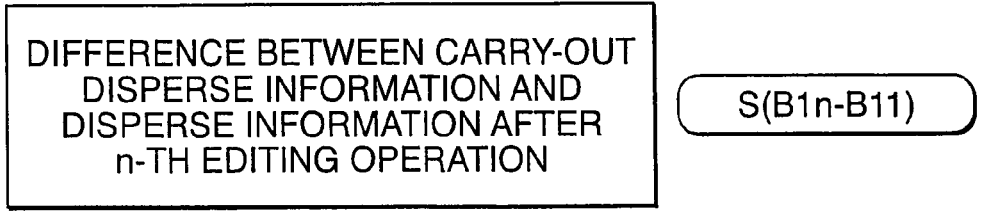

FIGS. 12A and 12B are explanatory diagrams showing example of the difference information storing formats.

FIG. 12A shows storage information of a format in which the difference is added each time the editing operation is performed.

In FIG. 12A, when the editing and storage is repeated n times, n pieces of difference information are stored.

For example, when disperse information at carry-out is B11 and disperse information after the first editing operation is B12, the difference S(B12–B11) is stored. Similarly, when disperse information after the n–1th editing operation is B1(n–1) and the disperse information after the n-th editing operation is B1n, the difference S(B1n–B1(n–1)) is also stored.

FIG. 12B shows the case where only one difference of the disperse information is always stored. That is, only the difference information (S(B1n–B11)) between the carry-out disperse information (B11) and the disperse information (B1n) after the n-th editing process is stored.

In the case of FIG. 12A, as the number of editing times in an outside place increases, larger storage capacity is required to store the differences. However, there is an advantage that the carry-out disperse information does not have to be stored as disperse information. The difference information can be also used as an editing history.

In the case of FIG. 12B, even if the number of editing times increases at an outside place, the storage capacity required for storing the differences is constant and small without being increased. However, the carry-out disperse information has to be stored as the disperse information.

(Description of Example B)

Figure 3:
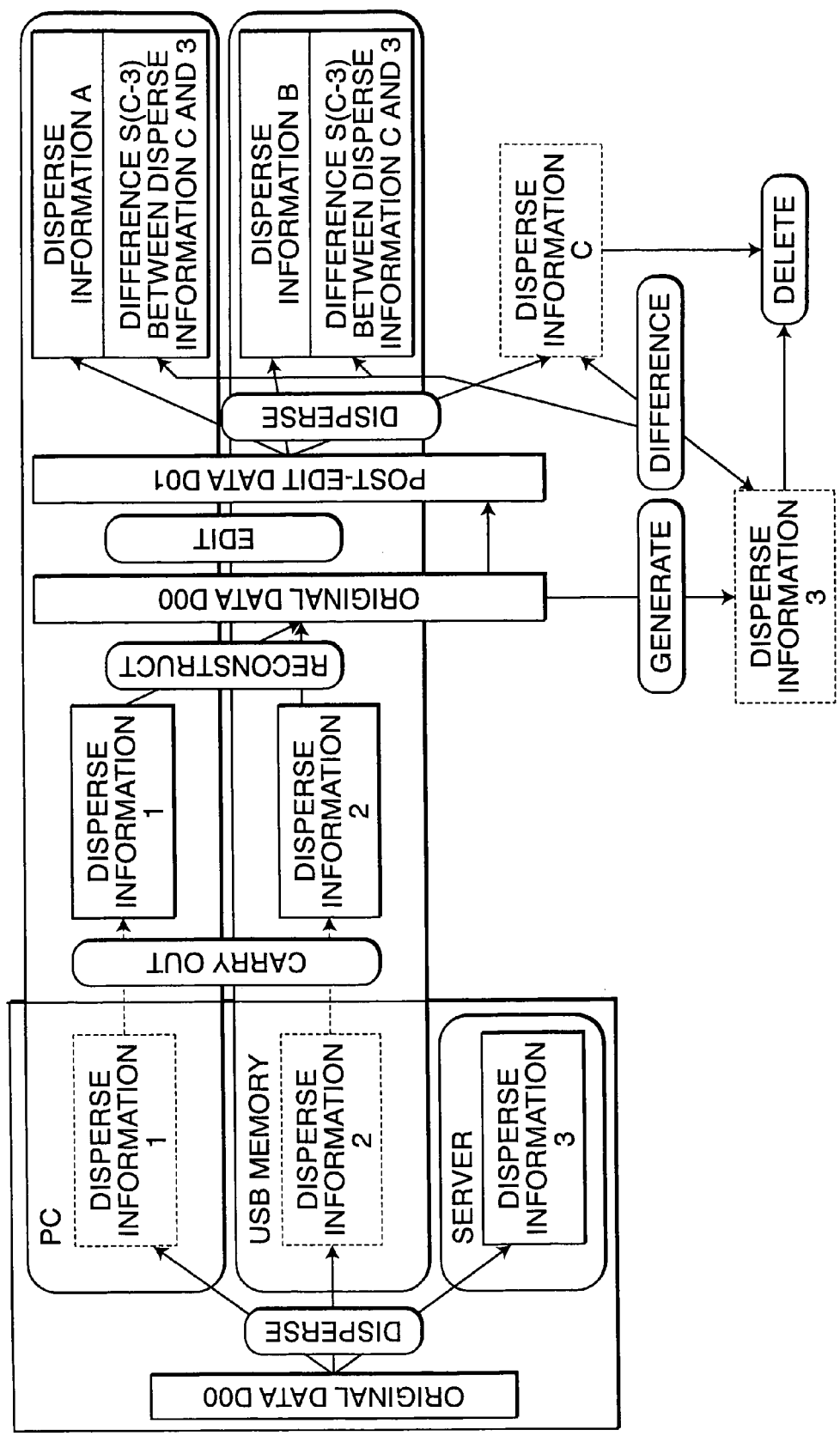
FIG. 3 is a diagram illustrating a schematic example B of the information dispersing and reconstructing process of the invention.

FIG. 3 is a schematic diagram showing an example B of information dispersing and reconstructing processes of the information processor of the invention.

Also in the example B, it is assumed that original data is divided into three pieces of disperse information, the three pieces of disperse information are stored in the personal computer PC, a USB memory, and the FSV 61, and the personal computer PC and the USB memory are carried to an outside place.

Different from the example A, only the disperse information 3 corresponding to the file server 61 is stored in the file server FSV 61, and backup data of the disperse information (1 and 2) corresponding to the other devices such as the personal computer is not stored.

Before information is edited at an outside place, when the original data D00 is reconstructed, the dispersing process is performed on the reconstructed original data D00, thereby generating the pre-edit disperse information 3 corresponding to the not-carried device (file server FSV 61).

The difference information S stored after the dispersing process after editing is performed is different from that of the first embodiment.

When a storing process is executed on the post-edit data D01, in a manner similar to the example A, three pieces of post-edit disperse information (A, B, and C) are generated.

After that, the difference information S(C–3) between the post-edit disperse information C corresponding to the FSV 61 as a not-carried device and the generated pre-edit disperse information 3 is generated and stored in both of the hard disk of the personal computer PC and the USB memory. If there are two or more not-carried devices, all of the difference information S corresponding to the not-carried devices is stored in all of the carried devices (the personal computer and the USB memory).

In FIG. 3, the post-edit data D01 is dispersively stored, the post-edit disperse information A and the difference information S(C–3) is stored in the personal computer PC, and the post-edit disperse information B and the difference information S(C–3) is stored in the USB memory.

After that, the post-edit data D01 itself, the post-edit disperse information C corresponding to the FSV 61, and the pre-edit disperse information 3 is deleted.

The pre-edit disperse information 1 and 2 and the reconstructed data D00 is also deleted from the hard disk of the personal computer PC. In the case where two or more not-carried devices exist, all of disperse information of the not-carried devices is deleted from the hard disk.

Also in the example B, in the case of executing the editing process after editing, the post-edit data D01 is reconstructed by using the disperse information (A, B) stored in the personal computer PC and the USB memory and, after that, the editing process is performed.

In the case of updating the disperse information 3 stored in the not-carried device (file server FSV 61), the difference information S(C–3) stored in the personal computer PC or the USB memory is used.

In the example B, the post-edit disperse information C is directly generated from the disperse information 3 stored in the FSV 61 and the difference information S(C−3). That is, the disperse information in the not-carried device (FSV 61) can be updated without once reconstructing the post-edit data D01 as performed in the example A.

In the case where the carried device (for example, the USB memory) is stolen, the post-edit data D01 can be reconstructed by using the post-edit disperse information stored in the other carried device and the difference information.

For example, the user takes only the personal computer PC home and generates the post-edit disperse information C by using the difference S(C−3) stored in the personal computer and the disperse information 3 in the FSV 61.

Next, the user reconstructs the post-edit data D01 from the post-edit disperse information A in the personal computer and the generated disperse information C.

In the example B, by dispersing the reconstructed data D01 again, the post-edit disperse information B in the lost USB memory can be restored. As a result, three pieces of the post-edit disperse information are available, so that the redundancy of the post-edit disperse information is assured.

Concrete processes such as the dispersing and reconstructing processes in the information processor of the present invention will be described hereinbelow.

First Embodiment of the Invention

An example of the case of storing backup information of the disperse information in the file server FSV will be described.

Figure 4:
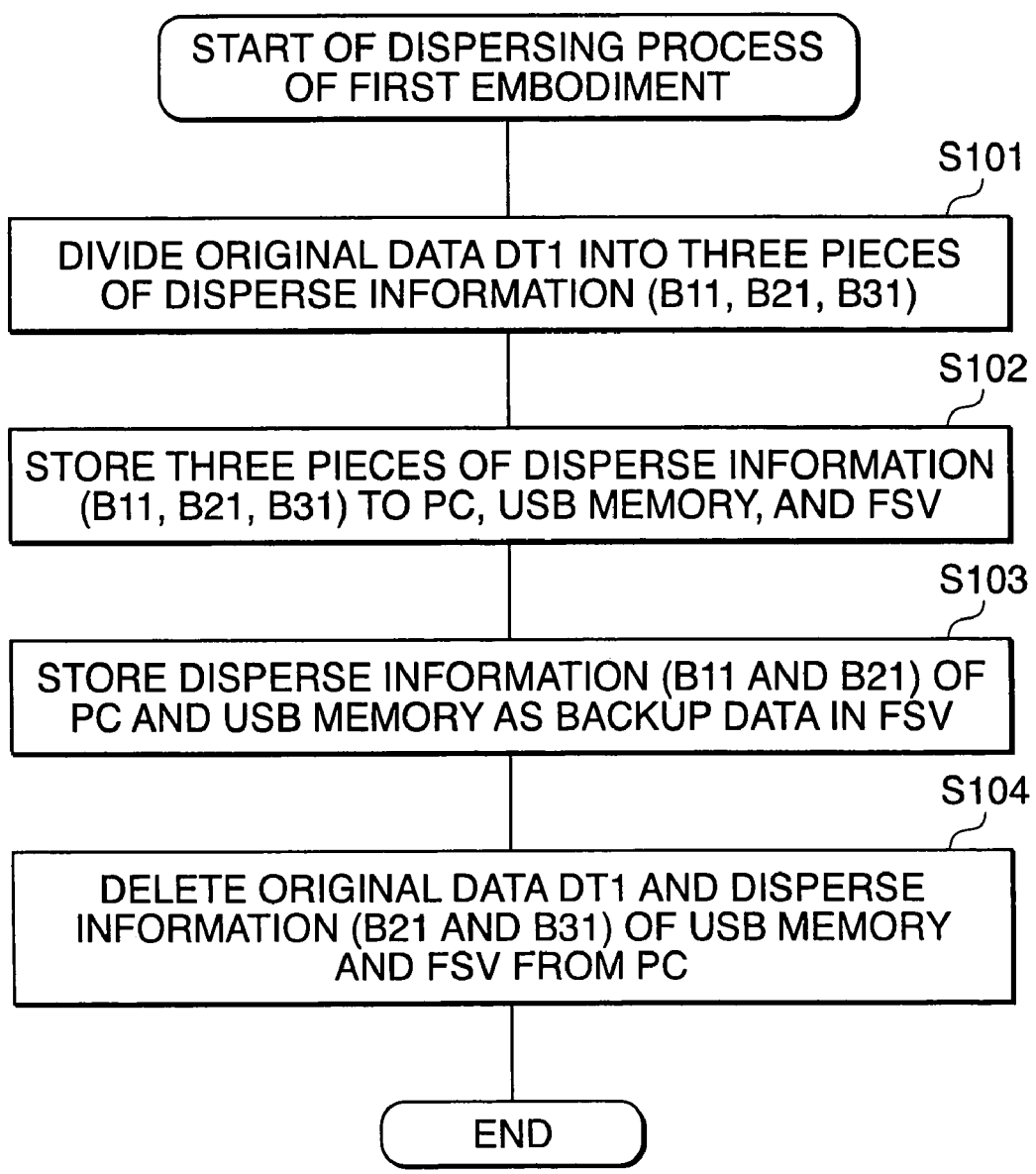
FIG. 4 is a flowchart of a dispersing process of a first embodiment of the invention.

FIG. 4 shows a flowchart of the data dispersing process of the first embodiment.

Original data generated by the user is DT1, and the post-edit data after the original data DT1 is carried out is DT2.

It is assumed that the original data DT1 is divided into three pieces of disperse information (B11, B21, and B31), and the three pieces of disperse information (B11, B21, and B31) are stored in the personal computer (PC), the USB memory 51, and the file server FSV 61.

The personal computer PC corresponds to the information processor of the present invention.

As shown in FIG. 1, the personal computer PC and the USB memory 51 are connected to each other by the USB interface port, and the personal computer PC and the FSV 61 are connected to each other via a network.

The file server FSV 61 is not carried out, but the user carries out the personal computer PC and the USB memory 51.

It is assumed that all of the processes such as storage, dispersing, reconstruction, editing, and difference calculation on the carried original data are performed by the personal computer PC, and results of the processes are stored in any of the personal computer PC and the USB memory.

The data dispersion is performed by the secret sharing scheme using the number of pieces of disperse information of 3 and the threshold value of 2.

That is, original data is reconstructed by using arbitrary two pieces of disperse information. It is assumed that the original data DT1 generated by the user is stored in the data storing unit 7 in the personal computer PC.

In FIG. 4, first, in step S101, before the personal computer or the like is carried out, the dividing unit 2 divides the original data DT1 into three pieces of disperse information (B11, B21, and B31) by using the secret sharing scheme. At this time, all of the disperse information is still in the disperse information storing unit 8 of the personal computer (see FIG. 5).

In step S102, the disperse information (B11, B21, and B31) is stored in the personal computer PC, the USB memory 51, and the FSV 61, respectively.

In step S103, the disperse information B11 stored in the personal computer PC and the disperse information B21 stored in the USB memory 51 is stored as backup information in the FSV 61.

In the FSV 61, all of the disperse information (B11, B21, and B31) is stored. Also in the case where the number of dividing times is n (n≧4), n pieces of disperse information are stored in the FSV 61.

In step S104, the original data DT1 stored in the data storing unit 7 in the personal computer PC, the disperse information B21 for the USB memory 51 stored in the disperse information storing unit 8, and the disperse information B31 for the FSV 61 is deleted.

Management information indicating that the original data DT1 is divided in the three pieces of disperse information and the storage locations of the disperse information is stored in the data storing unit 7 in the hard disk in the personal computer PC.

FIG. 5 is a diagram illustrating storages of data in the steps S101 and S104 in the dispersing process in FIG. 4.

Figure 6:
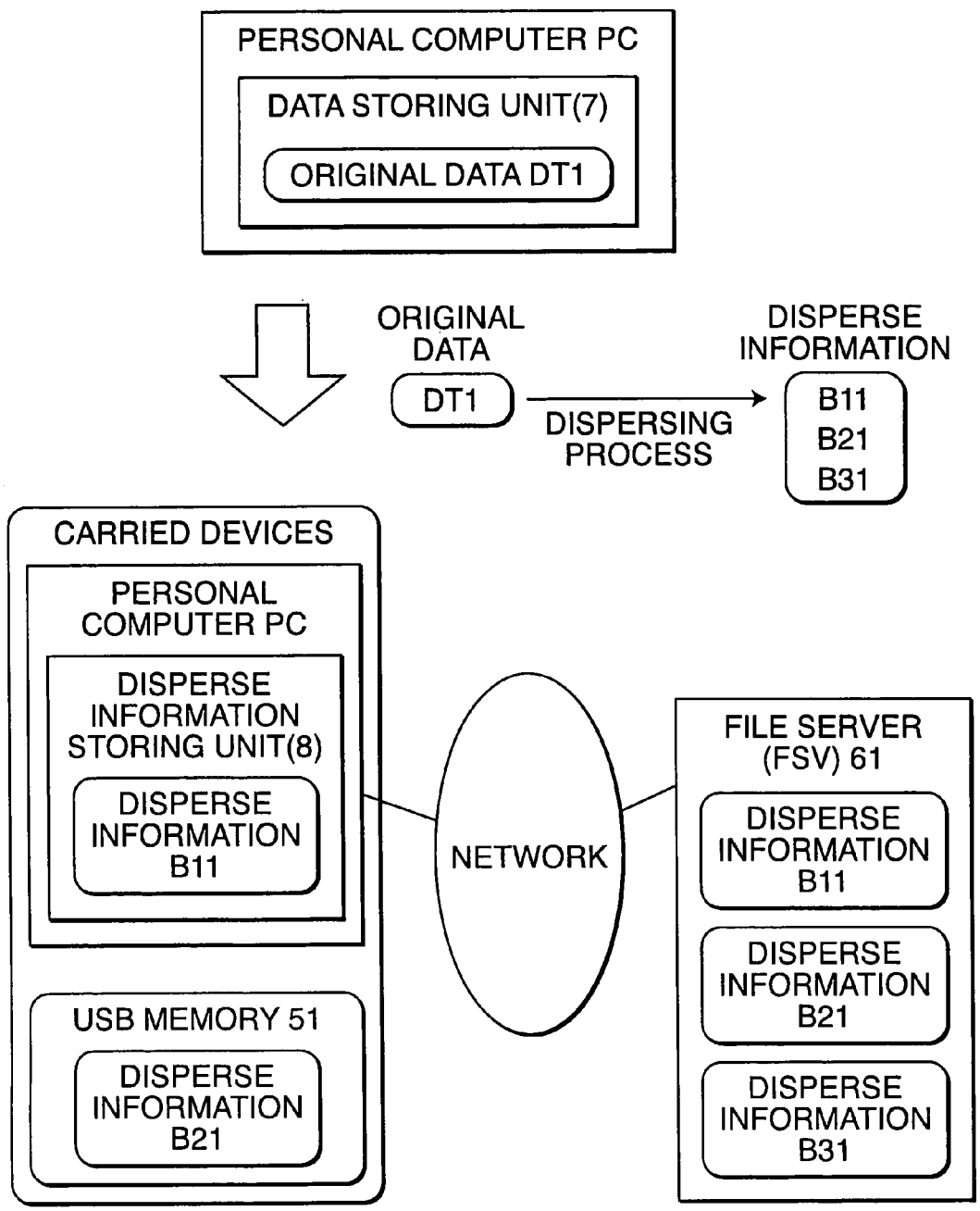
FIG. 6 is a diagram illustrating storages of the disperse information of the first embodiment of the invention.

FIG. 6 is a diagram illustrating storages of data obtained by executing the process in step S104.

By the above-described processes, the original data DT1 is divided into three pieces of data, and the three pieces of data are dispersively stored in different recording media.

After that, the user carries out the personal computer PC and the USB memory 51.

(Data Reconstructing Process Before Edition In First Embodiment)

Next, the data reconstructing process in the first embodiment of the invention will be described.

Figure 7:
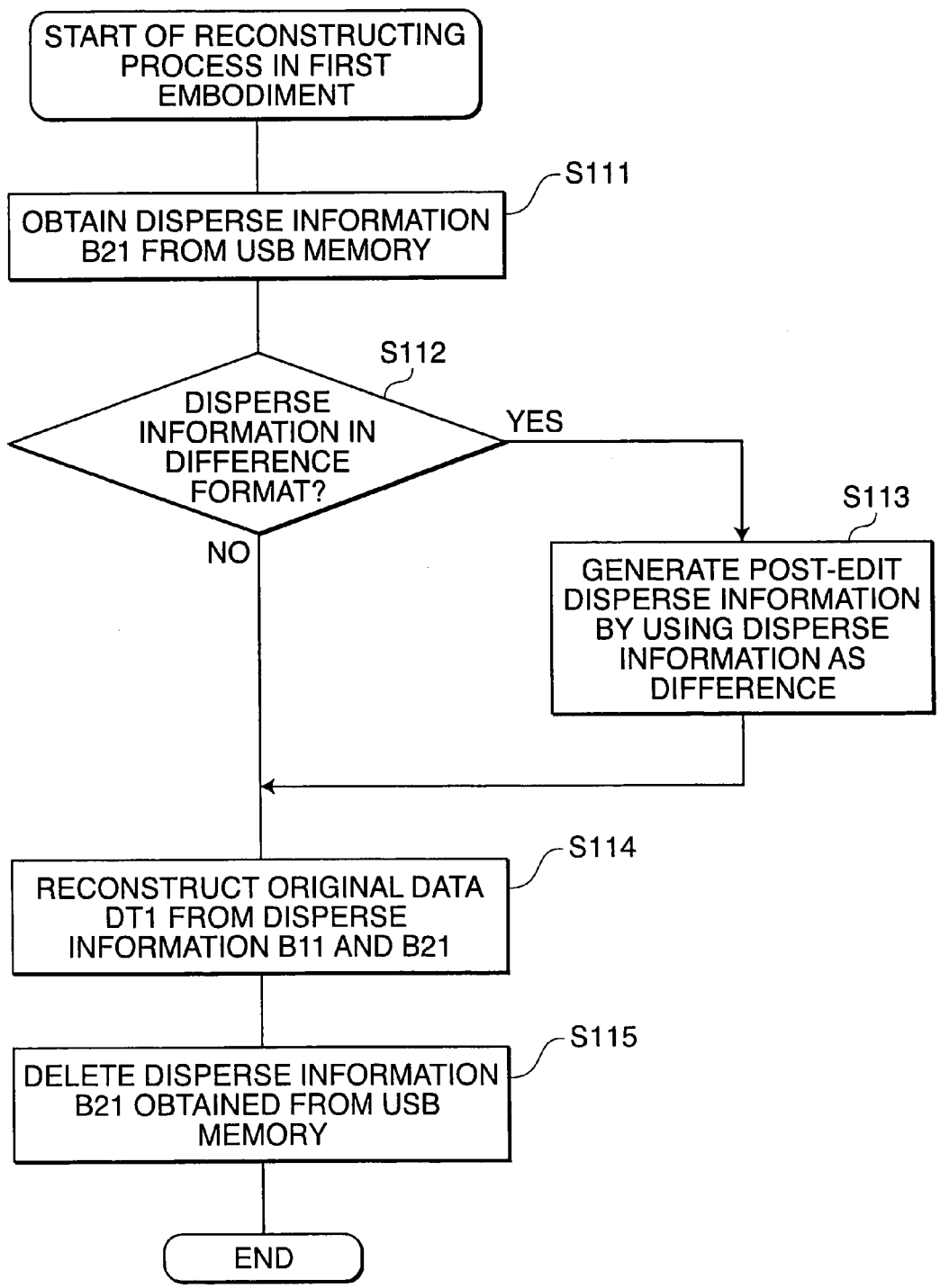
FIG. 7 is a flowchart of a reconstructing process of the first embodiment of the invention.

FIG. 7 is a flowchart of the data reconstructing process of the first embodiment.

The case where the user edits the data DT1 dispersively stored in the personal computer PC and the USB memory in an outside place will be described.

At start of the flowchart, the data DT1 is divided into three pieces of data as shown in FIG. 6. The disperse information B11 is stored in the personal computer PC, and the disperse information B21 is stored in the USB memory 51.

Figure 8:
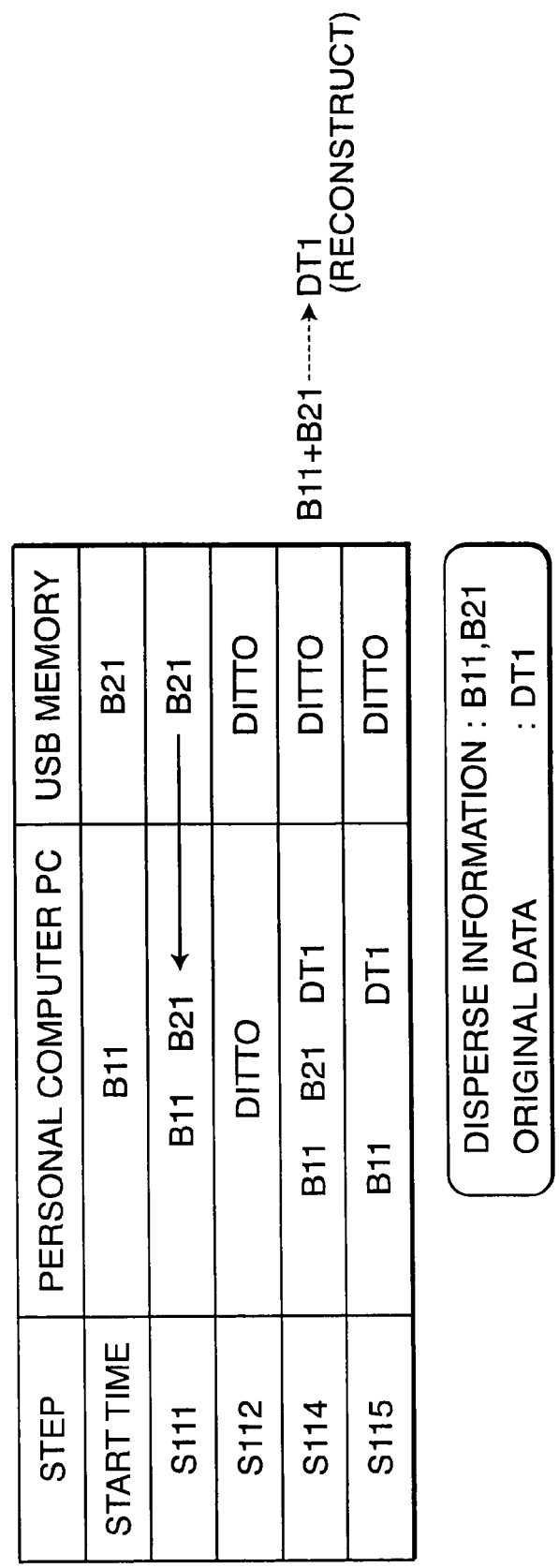
FIG. 8 is a diagram showing storages of the disperse information of the first embodiment of the invention.

FIG. 8 is a diagram illustrating storages of the disperse information and the like in the case where the disperse information B21 obtained from the USB memory is not the difference information in the first embodiment.

The user connects the USB memory 51 to the USB interface of the personal computer PC. After that, it is assumed that the user enters an instruction of reading the data DT1. The control unit 1 confirms that the data DT1 is dispersively stored and the storage locations of the disperse information on the basis of the management information of the data DT1 stored in the data storing unit 7.

In step S111 in FIG. 7, the control unit 1 obtains the disperse information B21 corresponding to the data DT1 from the USB memory 51 on the basis of the input instruction from the user.

Next, in step S112, whether the obtained disperse information B21 is difference information or not or includes difference or not is determined. In the case where the disperse information B21 is not the difference information, the program moves to step S114. On the other hand, when the disperse information B21 is difference information or includes difference information, the program advances to step S113.

First, the case where the disperse information B21 is not difference information will be described.

In the embodiment shown in FIGS. 5 and 6, the disperse information B21 stored in the USB memory 51 is not difference information, so that the program advances to step S114.

In step S114, the original data DT1 is reconstructed by using the disperse information B11 stored in the hard disk of the personal computer PC and the disperse information B21 obtained from the USB memory. As a result, a state where the user can edit the original data DT1 in an outside place is obtained.

In step S115, the obtained disperse information B21 is deleted from the hard disk of the personal computer PC. However, the process of erasing the disperse information B21 is not essential. The disperse information B21 may not be deleted since there is the case where the disperse information B21 is used at the time of performing the dispersing process after the following editing process.

From the viewpoint of preventing illegal use at the time of theft, after the original data DT1 is restored, the USB memory may be pulled out at the time of editing. It is sufficient to connect the USB memory to the personal computer PC at the time of storing disperse information generated by the dispersing process after completion of the editing.

Next, the process (step S113) performed in the case where the disperse information B21 is difference information in the step S112 in FIG. 7 will be described.

This case corresponds to the case where the editing and storage is repeated more than once at an outside place. It is assumed that the editing and storage is performed only once on the original data DT1, thereby obtaining the post-edit data DT2, and the disperse information of the post-edit data DT2 is B12, B22, and B32.

The state after such editing is that the carry-out disperse information B11 and the difference S(B12−B11) is stored as the disperse information B12 in the personal computer PC, and the disperse information B21 and the difference S(B22−B21) is stored as the disperse information B22 in the USB memory 51.

The difference S(B22−B21) is information on the USB memory, and is the difference between the disperse information B22 generated by dispersion performed after the editing process of the first time and the disperse information B21 stored in the USB memory at the time of carry.

The difference S(B12−B11) is information on the personal computer PC and is the difference between the disperse information B12 generated by dispersion performed after the editing process of the first time and the disperse information B11 stored in the personal computer PC at the time of carry.

"m" in "Bnm" as expression of disperse information refers to the number of editing times, and "n" in "Bnm" expresses the recording medium (n=1: personal computer, n=2: USB memory).

Figure 9:
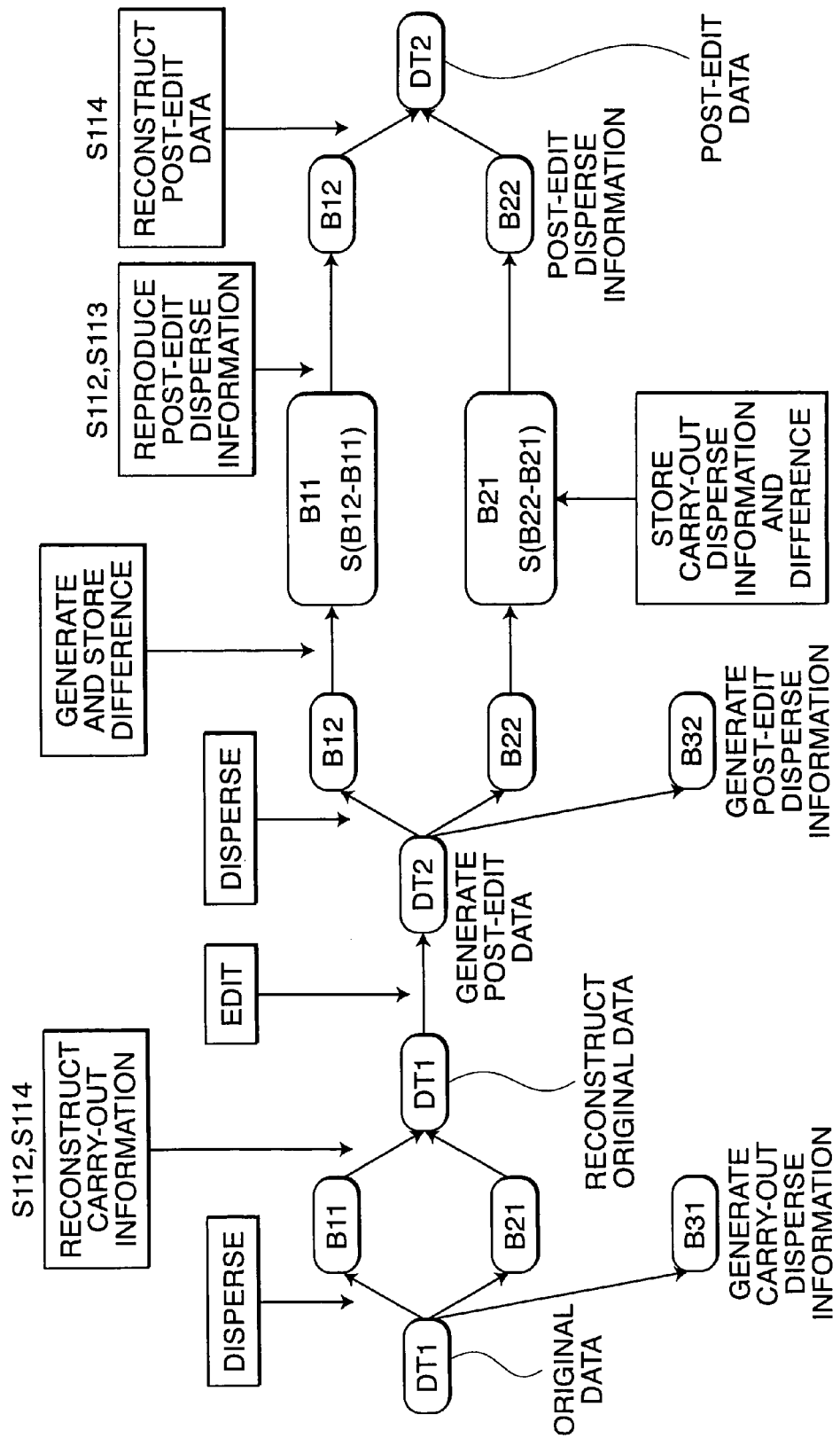
FIG. 9 is a diagram showing dispersing, editing, and storing processes of the first embodiment of the invention.

FIG. 9 is a diagram showing the case of performing processes such as generation and storage on disperse information including editing and difference generation in the first embodiment. All of the processes such as dispersing, reconstruction, editing, storage, reproduction, and the like are performed by the personal computer PC.

Figure 10:
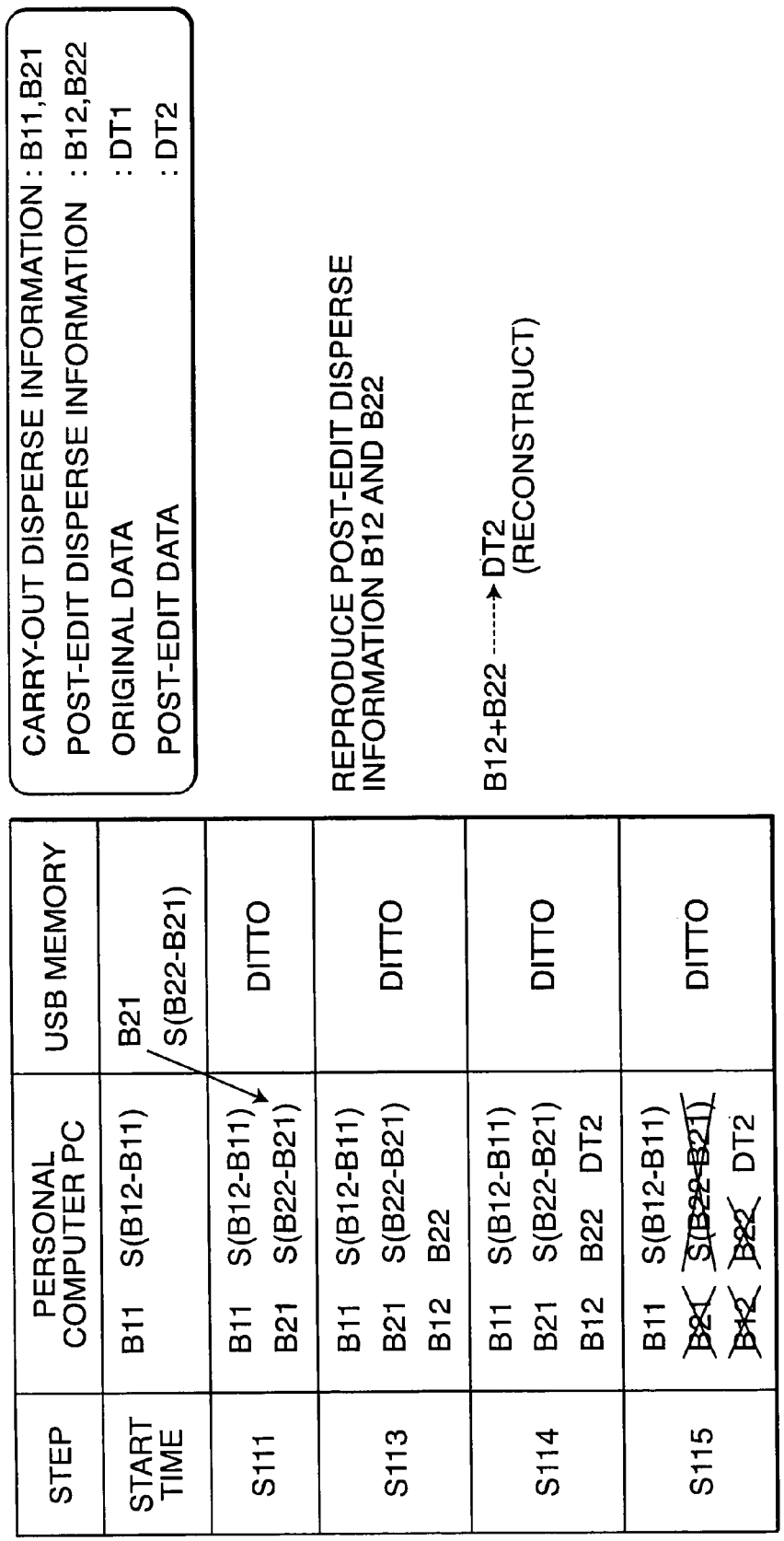
FIG. 10 is a diagram showing storages of the disperse information of the first embodiment of the invention.

FIG. 10 is a diagram showing storages of the disperse information and the like in the case where obtained disperse information includes difference information.

In this case, as shown in FIG. 10, at the start of the flowchart of FIG. 7, the disperse information B 11, the difference information S(B12−B11), and the difference information S(B22−B21) is stored in the personal computer PC. The disperse information B21, the difference information S(B22−B21), and the difference information S(B12−B11) is stored in the USB memory 51.

In step S111 in FIG. 7, the disperse information B21 and the difference information S(B22−B21) in the USB memory is copied to the hard disk of the personal computer PC. In this case, since it is determined in step S112 that the disperse information includes the difference information, the program advances to step S113 in FIG. 7.

In step S113, post-edit disperse information is reproduced from the difference information and the carry-out disperse information.

In this case, the post-edit disperse information B12 is reproduced from the carry-out disperse information B11 and the difference information S(B12−B11). The post-edit disperse information B22 is reproduced from the carry-out disperse information B21 and the obtained difference information S(B22−B21).

Next, in step S114, the post-edit data DT2 is reconstructed from the reproduced two pieces of disperse information B12 and B22.

In step S115, in addition to the obtained disperse information and the difference information (B21 and S(B22−B21)), the reconstructed post-edit disperse information (B12 and B22) is deleted.

By the above process, in the case where the difference exists, the post-edit data DT2 can be reconstructed. After that, the post-edit data DT2 can be further edited.

(Dispersing and Storing Process After Edition of First Embodiment)

Next, the process of performing the dispersing process on post-edit data (for example, the data DT2 in FIG. 9) to generate post-edit disperse information and storing the disperse information and the like will be described.

Figure 13:
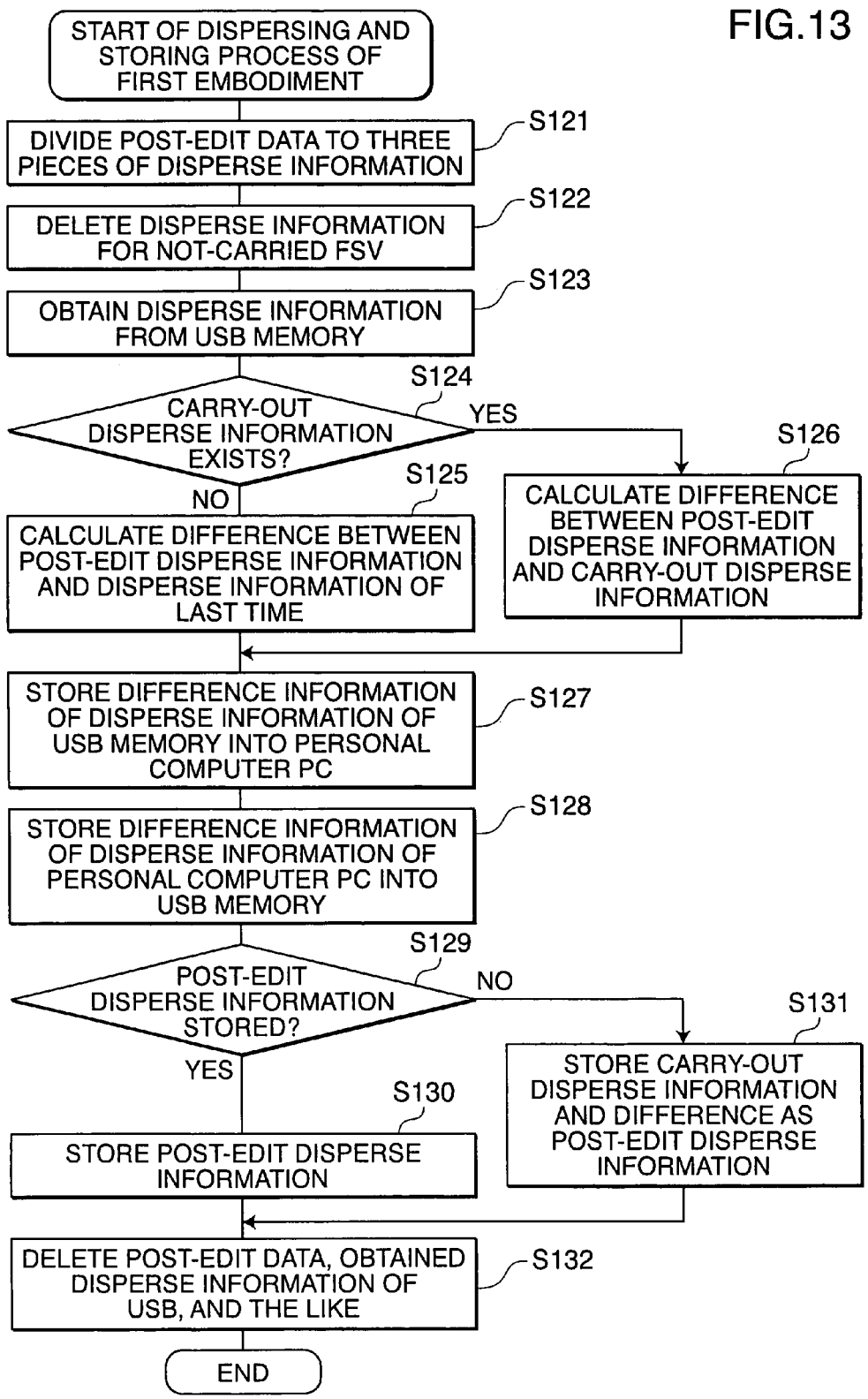
FIG. 13 is a flowchart of a dispersing and storing process of the first embodiment of the invention.

FIG. 13 shows the flowchart of the process of generating and storing post-edit disperse information of the invention. A process of dividing post-edit data into three pieces of disperse information and a process of generating difference information for carried devices (the personal computer PC and the USB memory) and storing the disperse information and the difference information are mainly performed. Information is stored in one of the preset storing formats of FIGS. 11 and 12. For example, in the examples shown in FIGS. 9 and 10, the storing formats of FIGS. 11B and 12B are used.

First, at the start, the user enters an instruction of performing a process of dispersing the post-edit data DT2 and storing disperse information, and the following processes are executed. In the case where the USB memory 51 is not connected, the USB memory 51 is connected to the personal computer and a storing instruction is entered.

Alternatively, the control unit 1 may detect that the USB memory 51 is not connected, and notify the user of a message that the USB memory 51 is to be connected by using characters, figure, sign, sound, or the like.

It is assumed here that, at the start, the present post-edit data is DT3, and disperse information generated in the immediately preceding editing operation is B12 and B22. At the start, the post-edit data DT3 and the disperse information B12 is stored in the personal computer PC, and the disperse information B22 is stored in the USB memory 51.

FIG. 14 is a diagram showing changes in storages of the disperse information and the like in the first embodiment.

First, in step S121 in FIG. 13, the post-edit data DT3 is divided into three pieces by the secret sharing scheme. Disperse information generated by the division is called B13, B23, and B33.

At the stage, all of the three pieces of disperse information are stored in the disperse information storing unit 8 in the personal computer PC. The disperse information B13 is for the personal computer PC, the disperse information B23 is for the USB memory, and the disperse information B33 is for the file server FSV.

In step S122, the disperse information B33 for the file server FSV as a not-carried device is deleted.

In step S123, the pre-edit disperse information for the USB memory is obtained from the USB memory 51. In the embodiment, as the pre-edit disperse information, the disperse information B22 is obtained.

In the case where the disperse information B22 remains in the personal computer, it is unnecessary to obtain the disperse information B22. In the case where the number of pre-edit disperse information in the USB memory is not one and, for example, carry-out disperse information (such as B21) is included, all of the disperse information is obtained.

In step S124, a check is made to see whether carry-out disperse information exists in the personal compute PC or not.

Whether the disperse information is carry-out disperse information or not can be determined by, for example, preparing a header for disperse information and checking the header.

In the state of step S123 in FIG. 14, the disperse information is not carry-out disperse information. Consequently, the program advances to step S125. In the case where there is carry-out disperse information, the program advances to step S126.

In step S125, the difference between the post-edit disperse information (B13 and B23) and the disperse information (B12 and B22) of the immediately preceding editing operation is calculated.

That is, the difference (S(B13−B12)) of the disperse information (B12 and B13) for the personal computer PC and the difference (S(B23−B22)) of the disperse information (B22 and B23) for the USB memory are computed.

On the other hand, in step S126, since the carry-out disperse information (B11 and B21) exists in the personal computer PC, the difference between the post-edit disperse information (B13 and B23) and the carry-out disperse information (B11 and B21) is calculated. That is, as the difference information, S(B13−B11) and S(B23−B21) is obtained.

In step S127, the obtained difference information of the USB memory requested is stored in the personal computer PC. In step S128, the obtained difference information of the personal computer requested is stored in the USB memory 51.

In the case of the step S125 shown in FIG. 14, S(B23−B22) is stored in the personal computer as the difference information (SA2) of the USB memory, and S(B13−B12) is stored in the USB memory as the difference information (SA1) of the personal computer.

In step S129, a check is made to see whether the post-edit disperse information whose difference is calculated is stored or not.

The check corresponds to the process for determining which one of the storing formats shown in FIGS. 11 and 12 is used. In the case where the storing format is determined in advance, the determined information is stored in the storing format and the other information is deleted.

In the case of storing the post-edit disperse information, the program advances to step S130. For example, in the case of FIG. 14, the post-edit disperse information (B13 and B23) and the difference information S(B23−B22) stored in step S125 is stored. In the USB memory, the post-edit disperse information B23 and the difference information S(B13−B12) is stored.

In step S132, unnecessary information such as the post-edit data (DT3), the disperse information (B22) obtained from the USB memory, and the pre-edit disperse information (B12) in the personal computer is deleted from the personal computer PC.

For example, in the case of FIG. 14, in the personal computer PC, the post-edit disperse information B13 and the difference information S(B23−B22) in the personal computer is left, and the other disperse information and the difference information is deleted.

In step S132, the post-edit disperse information B23 and the difference information S(B13−B12) is left in the USB memory, and the other disperse information is deleted.

In the embodiment of FIG. 14, by the dispersing and storing process after editing, the disperse information in the format of FIG. 11A and the difference information in the format of FIG. 12A is stored.

On the other hand, in the case where the post-edit disperse information is not stored in step S129, the program advances to step S131. In this case, the post-edit disperse information is not stored but the carry-out disperse information and the difference between the carry-out disperse information and the latest post-edit disperse information is stored.

In step S131, information in the storing format of FIG. 11B and information in the storing format of FIG. 12B is stored.

FIG. 15 is a diagram showing an example of changes in storages of data in the case where the difference of carry-out disperse information is calculated and the difference is stored together with the carry-out disperse information.

FIG. 15 corresponds to the case where the steps S126 and S131 are executed.

In FIG. 15, it is assumed that, at the start of the flowchart of FIG. 13, the post-edit data DT3, the carry-out disperse information B11, and the difference S(B12−B11) is stored in the personal computer PC. The difference S is the difference between the disperse information B12 after the first editing operation and the carry-out disperse information B11 in the personal computer, and is the difference on the personal computer PC side.

It is assumed that the carry-out disperse information B21 and the difference S(B22−B21) is stored in the USB memory. The difference S is the difference on the USB memory side, and is the difference between the disperse information B22 after the first editing operation and the carry-out disperse information B21 of the USB memory.

Next, processes similar to those of FIG. 14 are executed in steps S121 to S124 in accordance with the flow of FIG. 13.

In step S124, information of DT3, B13, B23; B11, S(B12−B11); B21, S(B22−B21) is stored in the personal computer PC.

Therefore, the carry-out disperse information (B11 and B21) is included in the personal computer PC, so that the program advances to step S126.

In step S126, the difference is calculated. In this case, the difference between the disperse information (B13 and B23) of the present post-edit data DT3 and the carry-out disperse information (B11 and B21) is calculated. That is, the difference S(B13−B11) and the difference S(B23−B21) are obtained.

After that, in step S128, the difference information S(B13−B11) is stored in the USB memory.

Further, step S129 is branched to step S131 where the carry-out disperse information (B11 and B21) and the difference between the carry-out disperse information and the present post-edit disperse information is stored.

In step S131 in FIG. 15, the carry-out disperse information B11 in the personal computer and the difference S(B13–B11) is stored in the personal computer PC. In the USB memory, the carry-out disperse information B21 in the USB memory and the difference S(B23–B21) is stored in the USB memory.

In step S132 in FIG. 15, in the personal computer PC, the post-edit data DT3, the information (B21 and S(B22–B21) obtained from the USB memory, B13, B23, S(B12–B11), and the like are deleted. In the USB memory, S(B22–B21) is deleted.

The above-described series of processes of dispersing, difference generation, and storage are processes performed after data editing in an outside place in response to a storing request from the user.

(Process for Updating Post-Edit Disperse Information in First) Embodiment

When the user performs a data editing process in an outside place, the disperse information in the personal computer PC and the USB memory changes and becomes different from the disperse information (B11, B21, and B31) stored in the file server FSV which is not carried out.

After the user returns from the outside place and updates the disperse information (B11, B21, and B31) as backup information stored in the file server FSV to the post-edit disperse information (for example, B12, B22, and B32).

Figure 16:
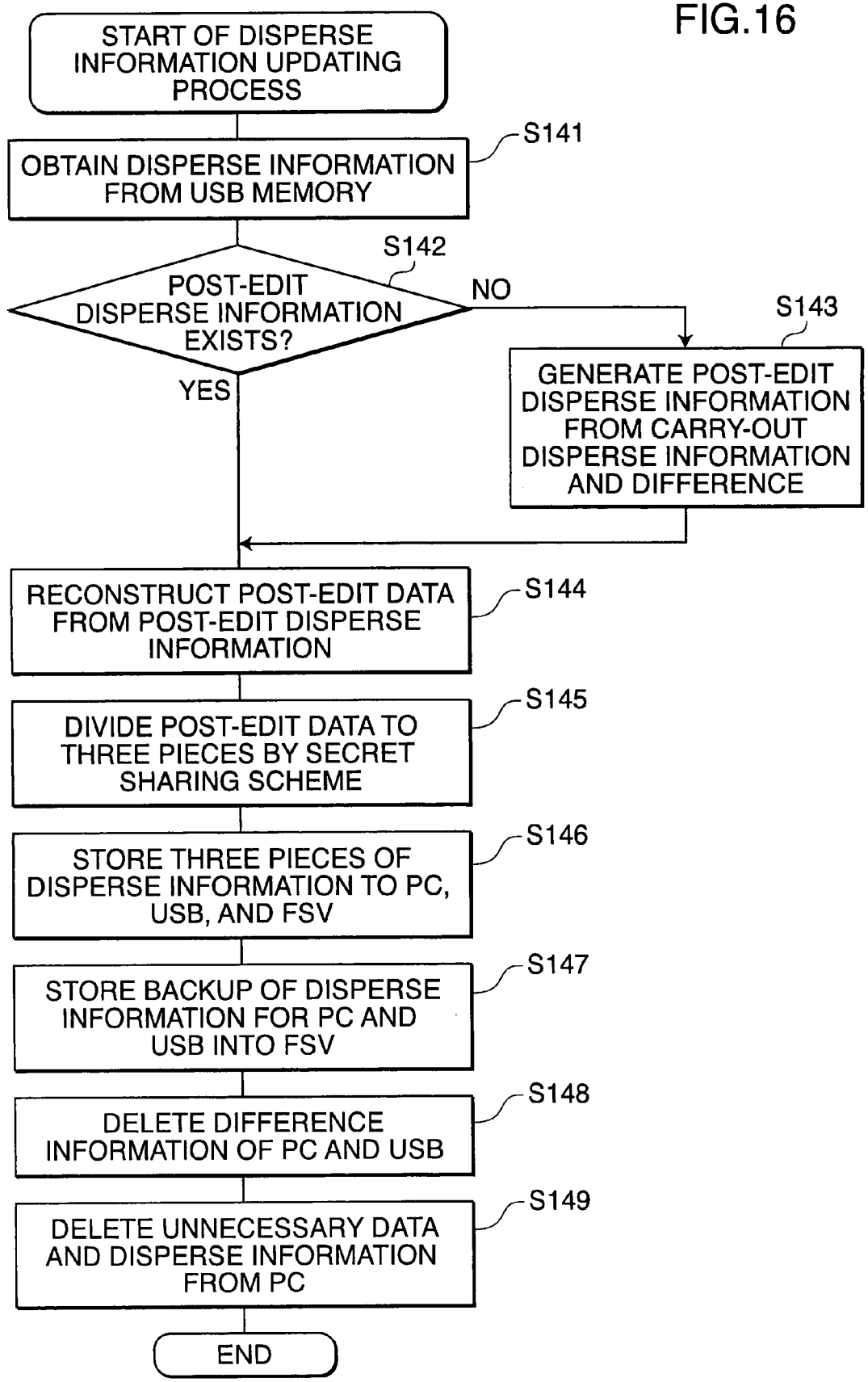
FIG. 16 is a flowchart of a disperse information updating process of the first embodiment of the invention.

FIG. 16 shows the flowchart of the disperse information updating process in the first embodiment.

It is assumed that, at start of the flowchart of FIG. 16, disperse information of the post-edit data in an outside place and the difference information is stored in the personal computer PC and the USB memory.

FIG. 17 is a diagram showing changes in the disperse information in the updating process of FIG. 16.

At the time of start, the post-edit disperse information B12 and the difference information S(B22–B21) of the USB memory is stored in the personal computer PC. The post-edit disperse information B22 and the difference information S(B12–B11) of the personal computer PC is stored in the USB memory.

The difference information S(B22–B21) is the difference between the post-edit disperse information B22 in the USB memory and the carry-out disperse information B21. The difference information S(B12–B11) is the difference between the post-edit disperse information B12 in the personal computer PC and the carry-out disperse information B11.

It is assumed that the carry-out disperse information (B11, B21, and B31) is stored in the file server FSV at the time of start. In this case, due to the editing in an outside place, the original data DT1 is changed to the post-edit data DT2, and the carry-out disperse information (B11 and B21) changes to the post-edit disperse information (B12 and B22).

The user returns home from the outside place, connects the personal computer PC and the USB memory to each other, connects the personal computer PC to a network to which the file server FSV 61 is connected, and starts the updating process of FIG. 16.

The updating process may be automatically started when the personal computer PC is connected to the network. Alternatively, it may be started after the personal computer PC is connected to the network and an update request from the user is input.

In step S141 in FIG. 16, the personal computer PC obtains the post-edit disperse information from the USB memory 51. When difference information is included, the difference information is also obtained.

In FIG. 17, the personal computer PC obtains the post-edit disperse information B22 and the difference information S(B12–B11) from the USB memory.

In step S142, a check is made to see whether post-edit disperse information exists in the personal computer PC or not. If YES, the program advances to step S144. If NO, the program advances to step S143.

The step S143 corresponds to the case where carry-out disperse information and the difference information is stored in the personal computer. In step S143, post-edit disperse information is generated from the carry-out disperse information and the difference information.

In step S144, the post-edit data DT2 is reconstructed from the post-edit disperse information (B12 and B22) in the personal computer PC and the USB memory.

In step S145, the post-edit data DT2 is divided into three pieces of disperse information by the secret sharing scheme, thereby generating post-edit disperse information B12, B22, and B32. Although the disperse information B12 and B22 already exists in the personal computer, the dispersing process is performed to generate the post-edit disperse information B32 for the file server FSV.

In step S146, the generated three pieces of disperse information (B12, B22, and B32) are stored in the personal computer PC, the USB memory, and the file server FSV, respectively. It is unnecessary to store the disperse information (B12 and B22) because the disperse information (B12 and B22) already exists in the personal computer PC and the USB memory, but the post-edit disperse information B32 is stored in the file server FSV.

In step S147, the post-edit disperse information (B12 and B22) in the personal computer PC and the USB memory is stored in the file server FSV. At this time, the carry-out disperse information (B11, B21, and B31) is deleted. Consequently, the disperse information stored as backup information in the file server FSV is updated to the post-edit disperse information (B12, B22, and B32).

In step S148, the difference information in the personal computer PC and the USB memory is deleted.

In FIG. 17, the difference information (S(B22–B21) and S(B12–B11)) stored in the personal computer PC is deleted, and the difference information S(B12–B11) stored in the USB memory is deleted.

In step S149, the post-edit data DT2 stored in the personal computer PC and unnecessary disperse information is deleted. In FIG. 17, the unnecessary disperse information is the disperse information B22 and B32.

By the above-described updating process, on completion of the step S149, the post-edit disperse information B12 is stored in the personal computer PC, the post-edit disperse information B22 is stored in the USB memory, and the post-edit disperse information B12, B22, and B32 is stored in the file server.

FIG. 18 is a diagram showing an example in changes in the disperse information in the case where the step S143 in the flowchart of FIG. 16 is executed.

In FIG. 18, it is assumed that, at the time of start of the flowchart of FIG. 16, the carry-out disperse information B11 and the difference information S(B12–B11) is stored in the personal computer PC, and the carry-out disperse information B21 and the difference information S(B22–B21) is stored in the USB memory. In this case, B21, S(B22–B21), and S(B12–B11) is obtained from the USB memory in step S141.

Since the post-edit disperse information does not exist in the personal computer PC in step S142, the program advances to step S143.

In step S143, the post-edit disperse information (B12 and B22) is generated.

The post-edit disperse information B12 is generated from the carry-out disperse information B11 and the difference S(B12–B11).

The post-edit disperse information B22 is generated from the carry-out disperse information B21 and the difference information S(B22–B21).

In step S144, the post-edit data DT2 is reconstructed from the generated two pieces of post-edit disperse information (B12 and B22).

Since the processes in S145 and subsequent steps for generating three pieces of disperse information from the post-edit data DT2 are similar to those of FIG. 17, they will not be described here.

By the updating process as described above, all of information stored in the personal computer, USB memory, and file server FSV is updated to post-edit information. After that, the post-edit data is dealt as original data (DT1) shown in FIGS. 5 and 9.

(Post-Edit Data Reconstructing Process Performed in the Case Where USB Memory is Lost in First Embodiment)

The case where a personal computer PC and a USB memory are carried out, an editing process is performed in an outside place and, after that, the USB memory is lost will be described.

Since the USB memory is lost, post-edit data is reconstructed by using information stored in the personal computer PC and disperse information of the original data stored in the file server FSV. Even if the USB memory is stolen, only the post-edit disperse information and difference information for the personal computer PC is stored in the USB memory. Consequently, post-edit data cannot be reconstructed from only the information in the USB memory.

Figure 19:
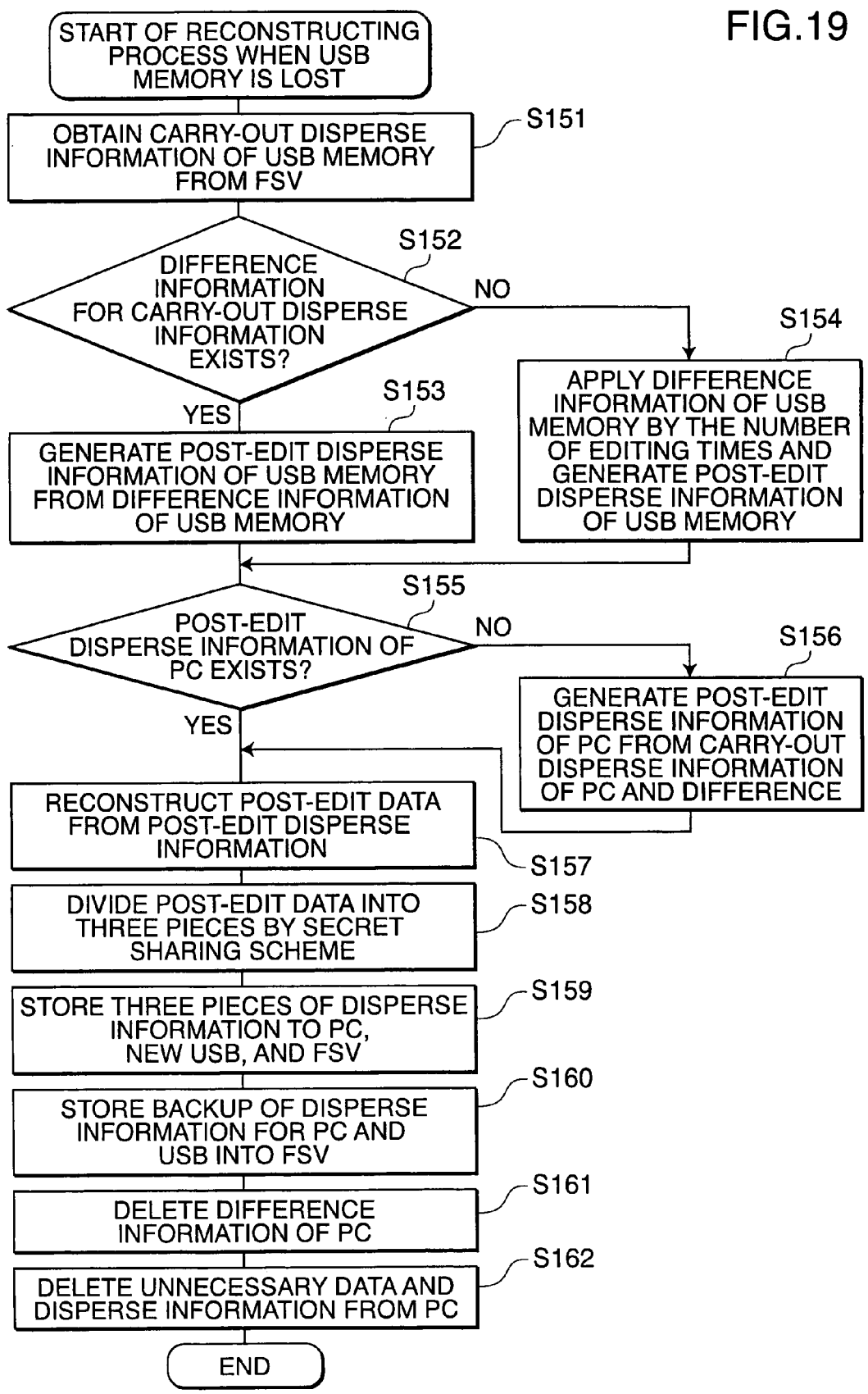
FIG. 19 is a flowchart of a reconstructing process performed when a USB memory is lost in the first embodiment of the invention.

FIG. 19 shows the flowchart of the post-edit data reconstructing process performed when the USB memory in the first embodiment is lost.

FIG. 20 is a diagram showing changes in storages of the disperse information and the like in the flowchart of the reconstructing process.

It is assumed that, at the time of start of the flowchart, as shown in FIG. 20, the post-edit disperse information B13 and the difference information (S(B23–B22) and S(B22–B21)) in the format of FIG. 12A is stored in the personal computer PC. The difference is the difference in the disperse information for the USB memory.

It is assumed that the carry-out disperse information (B11, B21, and B31) is stored as backup information in the file server FSV.

To start the reconstructing process, the personal computer PC and the file server FSV are connected to each other via the network.

In the example, the carry-out disperse information B11 is edited, thereby obtaining the disperse information B12. Further, the editing is performed, thereby generating the disperse information B13. That is, the editing is performed twice in an outside place. The post-data to be reconstructed is DT3.

First, when the user enters a request for reconstructing post-edit data, in step S151, carry-out disperse information (B21) in the USB memory is obtained from the file server FSV.

In step S152, a check is made to see whether the difference information stored in the personal computer PC is the difference for the carry-out disperse information or not. It is sufficient to check the header of the difference information to determine whether the difference information is the difference for the carry-out disperse information or not.

In the case where the difference information for the carry-out disperse information is stored in the personal computer, the program advances to step S153 where the post-edit disperse information in the USB memory is generated from the difference and the carry-out disperse information (B21) for the USB memory obtained in the personal computer in S151.

For example, when the stored difference information is only S(B22–B21), in step S153, the post-edit disperse information B22 of the USB memory is generated from B21 and S(B22–B21).

On the other hand, when it is determined in step S152 that the difference information stored in the personal computer PC is not the difference for the carryout disperse information, the program advances to step S154.

In the case of the example of FIG. 20, the difference information S(B23–B22) exists in the personal computer PC, the program advances to step S154.

By sequentially applying the stored difference only by the number of editing times in step S154, the post-edit disperse information (B23) in the USB memory is generated.

In FIG. 20, first, the disperse information B22 of the USB memory after the first editing operation is generated from the obtained disperse information B21 of the USB memory and the difference information S(B22–B21).

Next, from the generated disperse information B22 and the difference information S(B23–B22), the disperse information B23 of the USB memory after the editing operation of the second time. As a result, the disperse information B23 for the USB memory in when the USB memory is lost is reproduced.

In step S155, a check is made to see whether the post-edit disperse information (B13) of the personal computer is stored in the personal computer PC or not. If YES, the program advances to step S157. If NO, the program advances to step S156.

In the case of FIG. 20, the post-edit disperse information B13 itself exists in the personal computer PC, so that the program advances to step S157.

On the other hand, in the case where the program advancers to step S156, at the start of the flowchart of FIG. 19, in place of the post-edit disperse information B13, the carry-out disperse information B11 and the difference information S(B13–B11) is stored in the personal computer PC.

In this case, in step S156, the post-edit disperse information B13 of the personal computer PC is generated from the disperse information B11 and the difference information S(B13–B11).

Next, in step S157, the post-edit data DT3 generated in an outside place is reconstructed from the post-edit disperse information B13 of the personal computer PC and the post-edit disperse information B23 of the USB memory.

In step S158, the reconstructed post-edit data DT3 is dispersed into three pieces of post-edit disperse information (B13, B23, and B33).

In step S159, the three pieces of post-edit disperse information are stored in the personal computer PC, a new USB memory, and the file server FSV.

In step S160, backup information of the post-edit disperse information (B13 and B23) of the personal computer PC and the USB memory is stored in the file server FSV.

In step S161, the difference information S(B23−B22) and S(B22−B21) is deleted from the personal computer PC.

In step S162, the post-edit data DT3 and unnecessary disperse information (B23, B33, B21, and B22) is deleted.

By the above-described processes, also in the case where the USB memory is lost after editing in an outside place, the post-edit disperse information (B23) in the USB memory is reproduced, and the post-edit data (DT3) is reconstructed. That is, in the case where the USB memory is lost, to reconstruct the post-edit data DT3, it is sufficient for the user to perform an easy reconstruction requesting operation without entering the information again by himself/herself. Thus, the load on the user can be lessened.

The post-edit data reconstructing process performed in the case where the USB memory is lost has been described with reference to FIGS. 19 and 20. Also in the case where the personal computer PC is stolen in an outside place and only the USB memory is left in hand, by similar processes, the post-edit data can be reconstructed from the disperse information stored in the USB memory and the difference information. However, since the personal computer PC by which the editing process was performed cannot be used, the reconstructing process is performed by using an alternate personal computer PC having the function of the present invention.

Although the case where the number of dividing times of the disperse information is 3, the threshold value is 2, and carryout devices (recording devices) are two devices of the information processor and the USB memory has been described in the first embodiment, the invention is not limited to the case.

Generally, the number "n" of dividing times may be n≧4, the threshold value may be k (1<k<n), and the carryout devices may be k recording devices. For example, the number "n" of dividing times may be 5, the threshold value "k" may be 3, and the carryout devices may be three devices of the information processor, the USB memory, and an FD. In this case as well, by storing difference information of the other two devices (for example, the information processor stores the difference information of the USB memory and the FD) and performing the above-described series of processes (dispersing, reconstruction, editing, dispersive storing, updating, and the like), post-edit data can be reconstructed and disperse information can be updated.

Second Embodiment of the Invention

An example of the case where backup information of disperse information is not stored in the file server FSV will be described hereinbelow.

The second embodiment corresponds to the example B in FIG. 3.

The three pieces of disperse information (B11, B21, and B31) are generated from the original data (DT1) by the secret sharing scheme and are stored in the personal computer PC, the USB memory, and the file server FSV, respectively. It is assumed that all of processes of dispersing of the original data, editing, storage, reconstruction, difference calculation, and the like are performed by the personal computer PC.

The personal computer PC and the USB memory are carried out and the original data is edited in an outside place.

Before the personal computer PC is carried out, three pieces of disperse information are generated from the original data and stored in the personal computer PC, the USB memory, and the file server FSV. In the file server FSV, only the disperse information for FSV is stored and backup information of the disperse information for the personal computer PC and the USB memory is not stored.

Figure 21:
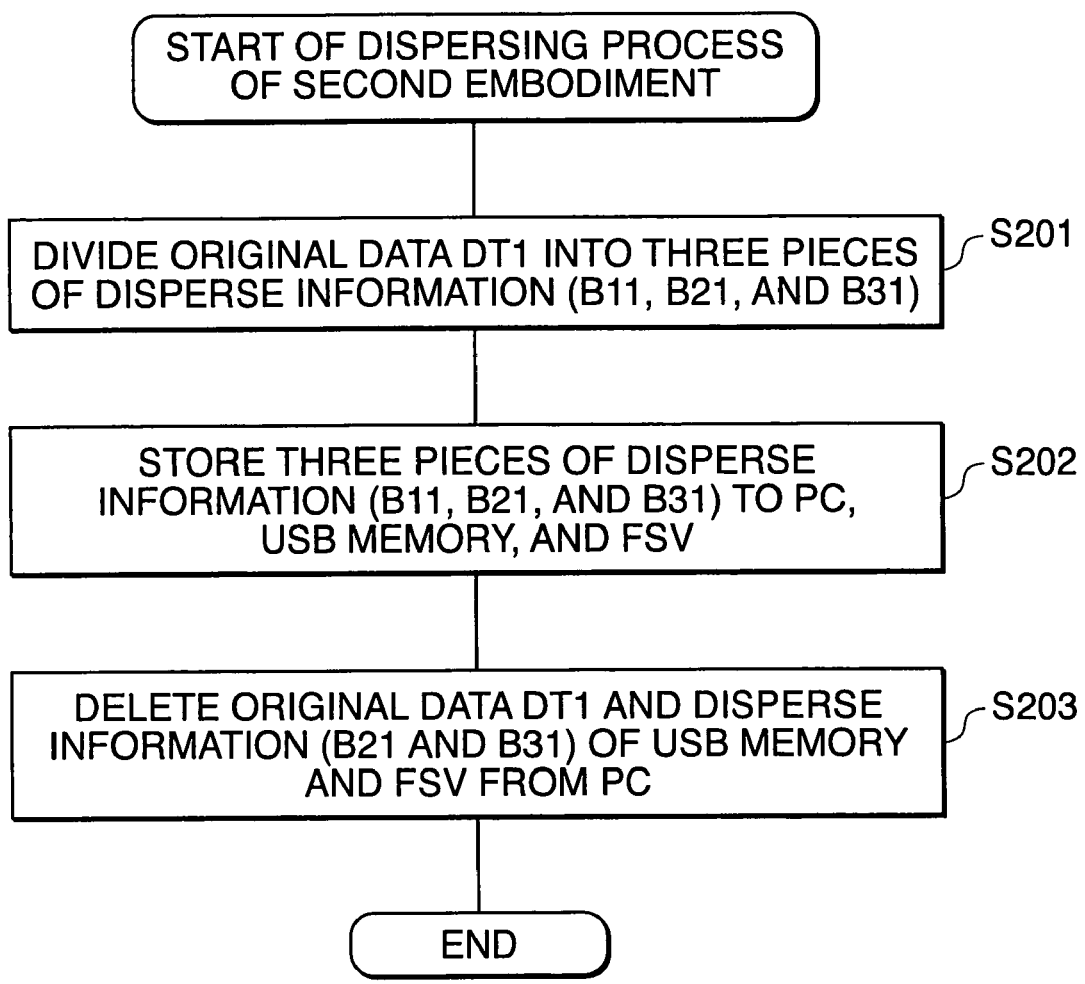
FIG. 21 is a flowchart of a dispersing process of a second embodiment of the invention.

FIG. 21 shows the flowchart of the dispersing process of the second embodiment of the present invention.

In step S201, the original data DT1 is divided into the three pieces of disperse information (B11, B21, and B31).

In step S202, the three pieces of disperse information (B11, B21, and B31) are stored in the PC, the USB memory, and the FSV, respectively.

In step S203, the original data DT1, the disperse information B21 in the USB memory, and the disperse information B31 in the file server FSV is deleted from the personal computer PC.

FIG. 22 is a diagram showing storages of the disperse information of the second embodiment.

The dispersing process of the second embodiment is different from that of the first embodiment with respect to the point that only the disperse information B31 for FSV is stored in the file server FSV after the step S203.

After the step S203, the user carries out the personal computer PC and the USB memory and edits the original data on an outside place.

(Data Reconstructing Process at the Time of Editing in Second Embodiment)

Next, the case where the user carries out the personal computer PC and the USB memory and, in an outside place, reads and edits the original data DT1 will be described.

It is assumed that the original data DT1 is dispersed in three pieces of disperse information and each of the personal computer PC and the USB memory stores the disperse information for itself. When the user enters an instruction of reading the original data DT1 for editing the original data to the personal computer PC in such a state, the data reconstructing process shown in FIG. 23 starts.

Figure 23:
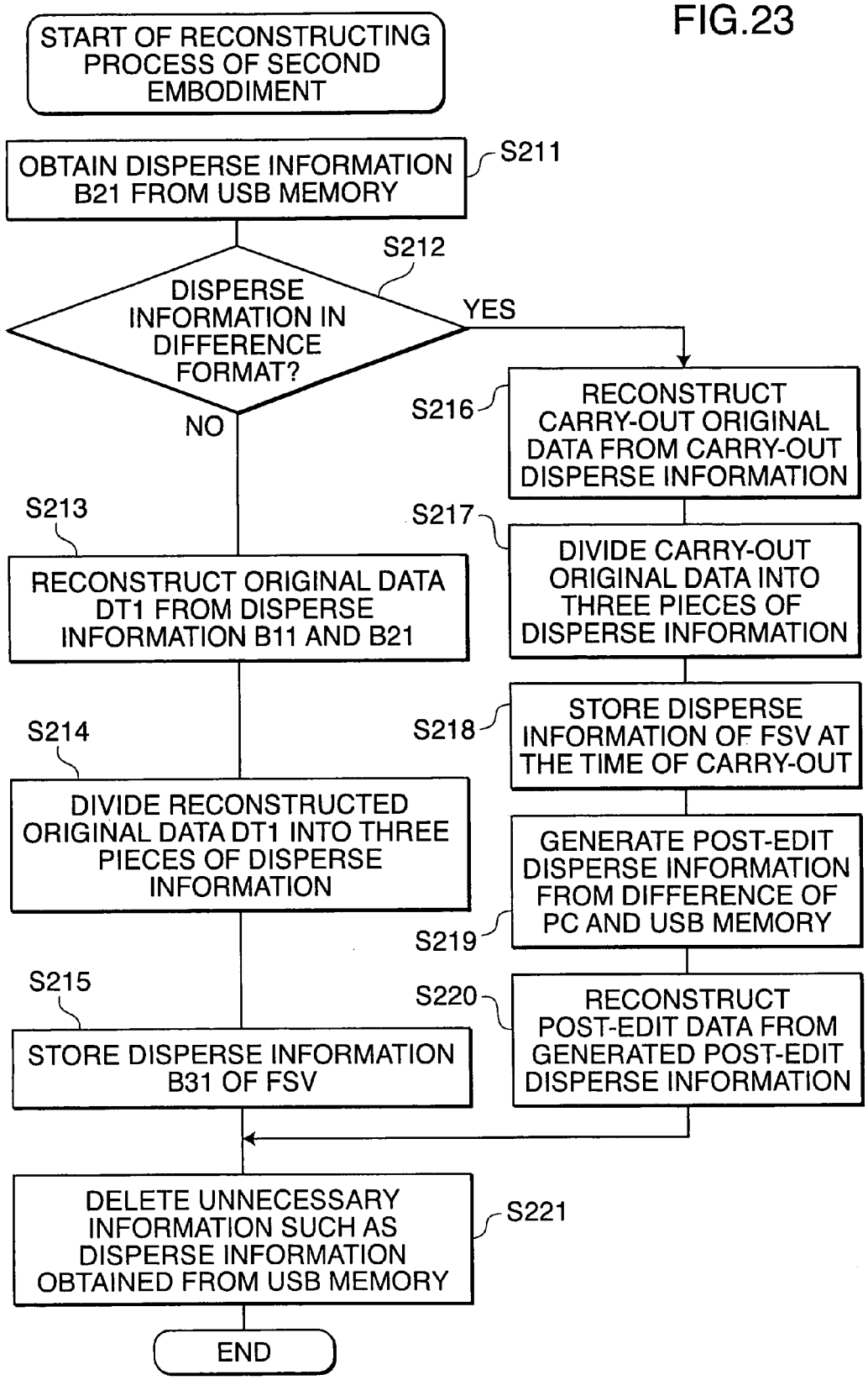
FIG. 23 is a flowchart of a reconstructing process of the second embodiment of the invention.

FIG. 23 shows the flowchart of the data reconstructing process at the time of editing of the second embodiment.

First, the case where the disperse information B11 is stored in the personal computer PC and the disperse information B21 is stored in the USB memory at the start of the flow will be described.

Figure 24:
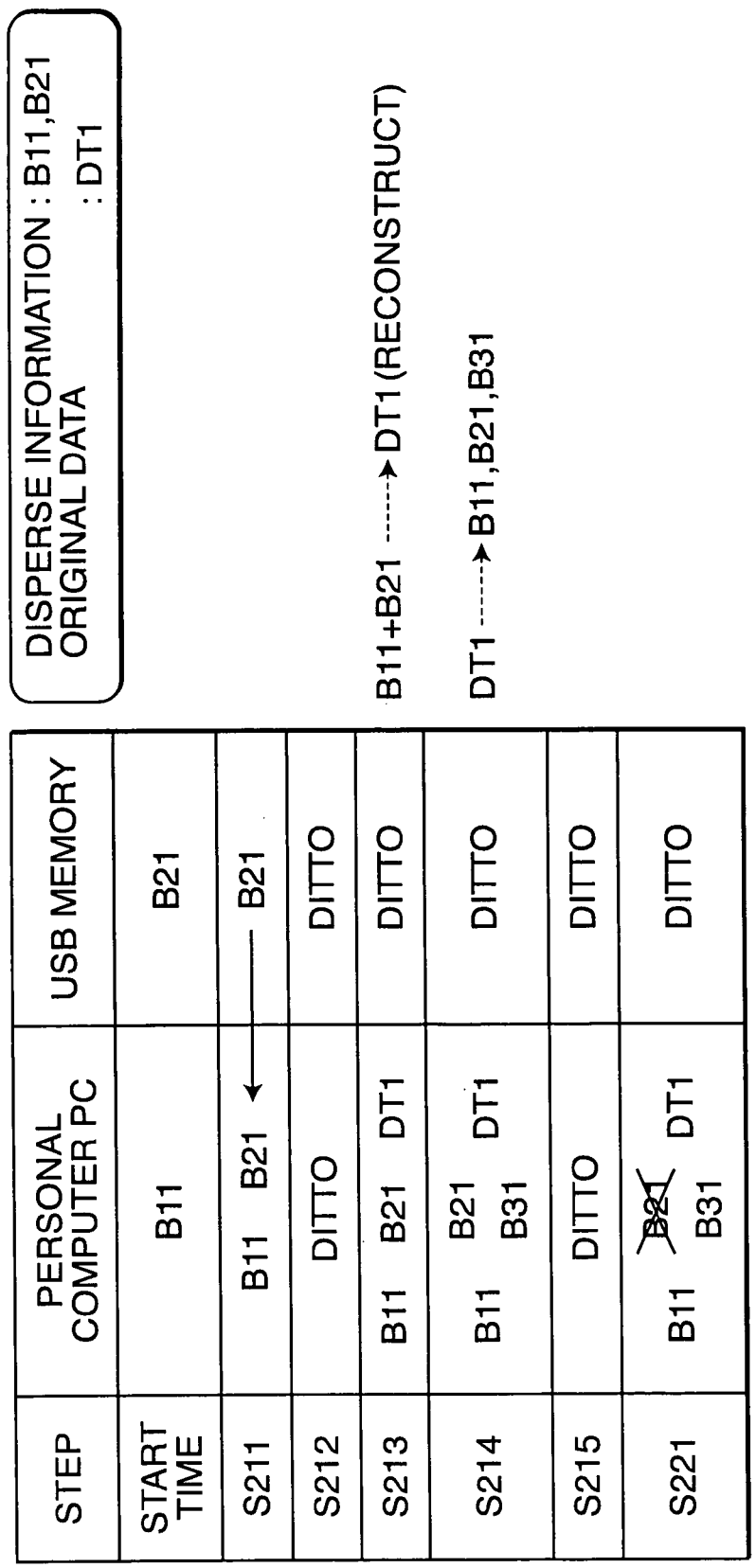
FIG. 24 is a diagram showing storages of the disperse information of the second embodiment of the invention.

FIG. 24 is a diagram showing changes in the storages of the disperse information in the data reconstructing process.

In step S211 in FIG. 23, the control unit 1 of the personal computer PC obtains the disperse information from the USB memory. In FIG. 24, the control unit 1 copies the disperse information B21 in the USB memory into the personal computer PC.

In step S212, a check is made to see whether the obtained disperse information is difference information or not, or whether the obtained disperse information includes the difference or not.

If NO, the program advances to step S213. If YES, the program advances to step S216.

In the case of FIG. 24, since the obtained disperse information B21 is not difference information, the program advances to step S213.

In step S213, the original data DT1 is reconstructed from the two pieces of disperse information (B11 and B12) in the personal computer. PC.

In step S214, the original data DT1 is divided into three pieces of disperse information (B11, B21, and B31) by the secret sharing scheme.

In step S215, the disperse information B31 for the file server is temporarily stored in the disperse information storing unit 8 in the personal computer.

The disperse information B31 for the file server may be stored in the USB memory.

In step S221, the disperse information B21 in the USB memory is deleted in the personal computer PC. After that, the original data DT1 reconstructed in the personal computer PC can be edited.

The case where it is determined in the check of step S212 that the difference information is included in the obtained disperse information and the program advances to step S216 will be described.

Figure 25:
FIG. 25 is a diagram showing storages of the disperse information of the second embodiment of the invention.

FIG. 25 is a diagram showing changes in storages of disperse information in the case where the processes of steps S216 to S220 are executed.

It is assumed that at the start of the flow of FIG. 23, the carry-out disperse information B11 and the difference information S(B12−B11) is stored in the personal computer PC, and the carry-out disperse information B21 and the difference information S(B22−B21) is stored in the USB memory.

In this case, in step S211, the disperse information B21 and the difference information S(B22−B21) is obtained from the USB memory.

In step S212, since the difference information is included, the program advances to step S216.

In step S216, the original data DT1 is reconstructed from the carry-out disperse information (B11 and B21) at the time of carry-out in the personal computer PC.

In step S217, the three pieces of carry-output disperse information (B11, B21, and B31) are generated from the original data DT1.

In step S218, the disperse information for the file server FSV at the time of carry-out is stored in the personal computer PC.

In step S219, the post-edit disperse information (B12 and B22) is generated by using the disperse information (B11 and B21) for the personal computer PC and the USB memory and the difference information.

For example, the post-edit disperse information B12 in the personal computer is generated from the carry-out disperse information B11 and the difference S(B12−B11).

In step S220, the post-edit data DT2 is reconstructed from the two pieces of generated post-edit disperse information B12 and B22.

In step S221, the disperse information obtained from the USB memory and the unnecessary information is deleted from the personal computer PC. For example, in FIG. 25, the information DT1, B21, B12, B22, and S(B22−B21) is deleted.

In this case, after execution of the reconstructing process of FIG. 23, the disperse information B11 and B31, the difference information S(B12−B11), and the post-edit data DT2 is stored in the personal computer PC, and the disperse information B21 and the difference information S(B22−B21) is stored in the USB memory.

After that, the post-edit data DT2 can be edited on the personal computer PC.

In FIG. 23, the erasing process of step S221 is preferably executed but is not essential. The disperse information and the like may be left as it is in the personal computer PC.

At the time of editing, to prevent illegal use due to theft, the USB memory may be disconnected.

(Dispersive Storing Process After Editing in Second Embodiment)

Next, the case where the user performs editing and the post-edit data DT3 is stored will be described.

FIG. 26 is a flowchart of the dispersive storing process of the second embodiment.

FIG. 27 is a diagram showing changes in storages of the disperse information of the flowchart.

It is assumed that at the start of the flow of FIG. 26, the post-edit data DT3, the carry-out disperse information B11 and B31, and the difference information S(B12−B11) is stored in the personal computer PC, and the carry-out disperse information B21 and the difference information S(B22−B21) is stored in the USB memory.

After the user enters an instruction of storing the post-edit data DT3, the process of FIG. 26 starts in the personal computer PC.

First, in step S231, the post-edit data DT3 is divided into three pieces of disperse information (B13, B23, and B33) by the secret sharing scheme.

In step S232, the disperse information and the difference information is obtained from the USB memory.

In the case of FIG. 27, the disperse information B21 and the difference information S(B22−B21) is obtained.

In step S233, a check is made to see whether there is carry-out disperse information in the personal computer PC or not. If NO, the program advances to step S235. If YES, the program advances to step S234.

In the case of FIG. 27, since the carry-out disperse information (B11, B21, and B31) exists, the program advances to step S234.

In step S234, the difference between the post-edit disperse information (B13, B23, and B33) and the carry-out disperse information is calculated.

In the case of FIG. 27, the difference information S(B13−B11) is generated from the post-edit disperse information B13 in the personal computer and the carry-out disperse information B11. Similarly, the difference information S(B23−B21) is generated with respect to the disperse information for the USB memory.

In step S235, the difference S(B33−B31) is calculated from the post-edit disperse information B33 in the file server FSV and the carry-out disperse information B31.

In step S236, the difference S(B33−B31) of the file server FSV obtained in step S235 is stored in both of the personal computer PC and the USB memory.

In the case of FIG. 27, the difference of the file server FSV already exists in the personal compute PC, so that the difference is stored in the USB memory.

In step S237, a check is made to see whether the post-edit disperse information is stored or not.

The processes in the steps S237, S238, and S239 are similar to those in the steps S129, S130, and S131 in FIG. 13.

That is, the post-edit disperse information and the like is stored on the basis of the predetermined storing formats (FIGS. 11 and 12).

In the case where the program advances to step S238, the post-edit disperse information (B13 and B23) itself is stored in the personal computer PC and the USB memory.

On the other hand, in the case where the program advances to step S239, the carry-out disperse information and the difference information is stored as the post-edit disperse information in the personal computer PC and the USB memory.

FIG. 27 shows the case where the program advances to step S239. In place of storing the post-edit disperse information B23 in the USB memory, the carry-out disperse information B21 in the USB memory and the difference information S(B23−B21) is stored.

Next, in step S240, the post-edit data DT3 and unnecessary information is deleted from the personal computer PC and the USB memory.

In FIG. 27, the unnecessary information in the personal computer PC is DT3, B13, B23, B33, B31, S(B12−B11), B21, S(B22-B21), and S(B23-B21) which is deleted from the personal computer PC. The unnecessary information in the USB memory is S(B22-B21) which is deleted from the USB memory.

After the dispersive storing process, in FIG. 27, the disperse information B11, the difference information S(B13-B11), and the difference information S(B33-B31) remains in the personal computer PC, and the disperse information B21, the difference information S(B23-B21), and the difference information S(B33-B31) remains.

(Updating Process After Editing in Second Embodiment)

A process of updating the disperse information in the file server FSV, performed after the editing process is finished and the personal computer PC and the USB memory are carried home.

Figure 28:
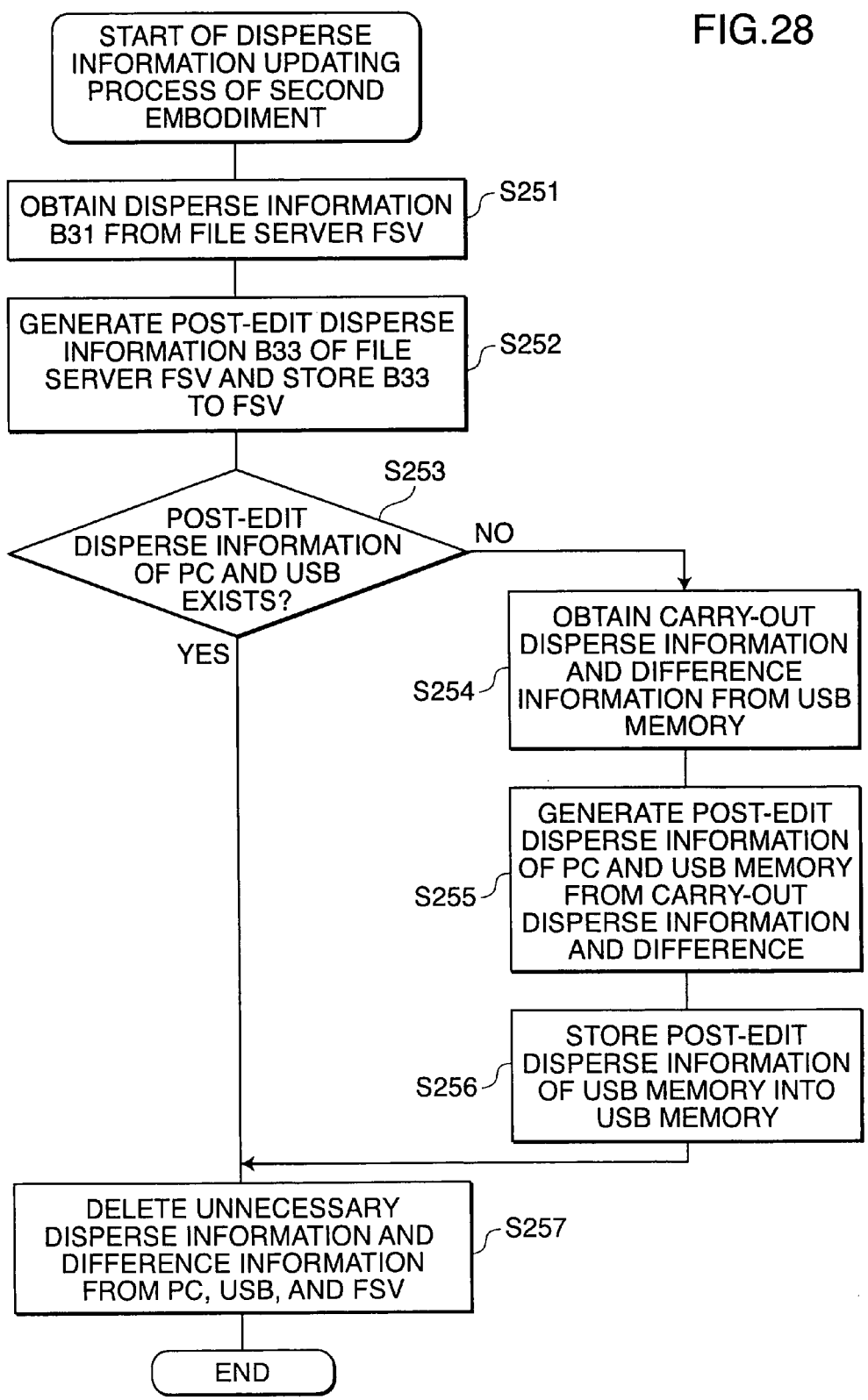
FIG. 28 is a flowchart of a disperse information updating process of the second embodiment of the invention.

FIG. 28 is a flowchart of the updating process of the second embodiment.

FIG. 29 is a diagram showing changes in storages of disperse information and the like in the updating process of the second embodiment.

In FIG. 29, it is assumed that, at the time of start of the flow of the updating process, the disperse information B11 when the personal computer is carried out, the post-edit difference information S(B13-B11), and the difference information S(B33-B31) is stored in the personal computer PC. The disperse information B21 when the USB memory is carried out, the post-edit difference information S(B23-B21), and the difference information S(B33-B31) is stored in the USB memory.

It is assumed that the carry-out disperse information B31, that is, the disperse information B31 obtained by dividing the original data DT1 and stored in the file server FSV is stored in the file server FSV.

In the second embodiment, in the file server FSV, backup information of the disperse information in the personal computer PC ad the USB memory is not stored, and only the disperse information for the file server is stored. Consequently, it is sufficient to update the disperse information (B31) for the file server to the post-edit disperse information B33.

In the case where the post-edit disperse information is not included in the personal computer PC and the USB memory, the disperse information in the personal computer PC and the USB memory is updated.

In step S251 in FIG. 28, the personal computer PC obtains the carry-out disperse information B31 for the file server which is stored in the file server FSV.

Next, in step S252, the post-edit disperse information B33 of the file server FSV is generated by using the difference S(B33-B31) of the file server FSV and the obtained disperse information B31.

The generated post-edit disperse information B33 is stored in the file server FSV.

In step S253, a check is made to see whether post-edit disperse information (B13, B23) exists in the personal computer PC and the USB memory or not. If YES, the program advances to step S257. If NO, the program advances to step S254.

In the case of FIG. 29, in the personal computer PC and the USB memory, only the carry-out disperse information (B11 and B21) exists and no post-edit disperse information (B13 and B23) exists. Consequently, the program advances to step S254.

In step S254, the carry-out disperse information B21 and the difference information S(B23-B21) is obtained from the USB memory.

In step S255, post-edit disperse information (B13, B23) is generated from the carry-out disperse information (B11, B21) and the difference information (S(B13-B11) and S(B23-B21)) at the time of editing in the personal computer PC and the USB memory.

In step S256, the generated post-edit disperse information B23 for the USB memory is stored in the USB memory.

In step S257, unnecessary information and the difference information in the personal computer PC, the USB memory, and the file server FSV is deleted.

After the erasing process, the post-edit disperse information B13 remains in the personal computer PC, the post-edit disperse information B23 remains in the USB memory, and the post-edit disperse information B33 remains in the file server FSV.

By the above-described process, after the editing process is performed in an outside place, the storage state in the personal computer PC, the USB memory, and the file server FSV is updated and can be synchronized to the same post-edit information.

In the second embodiment, after the editing, the difference information S(B33-B31) of the disperse information for the file server FSV is stored in the personal computer PC, so that it is sufficient to update only the disperse information in the file server FSV. The disperse information updating process is simpler than that in the first embodiment.

By storing the difference information S(B33-B31) for the file server FSV in both of the personal computer PC and the USB memory, even if one of the personal computer PC and the USB memory is lost, the data after the updating process and the editing can be reconstructed.

(Post-edit Data Reconstructing Process Performed in the Case Where USB Memory is Lost in Second Embodiment)

The case where the USB memory is lost after the data editing process is performed in an outside place will be described.

Figure 30:
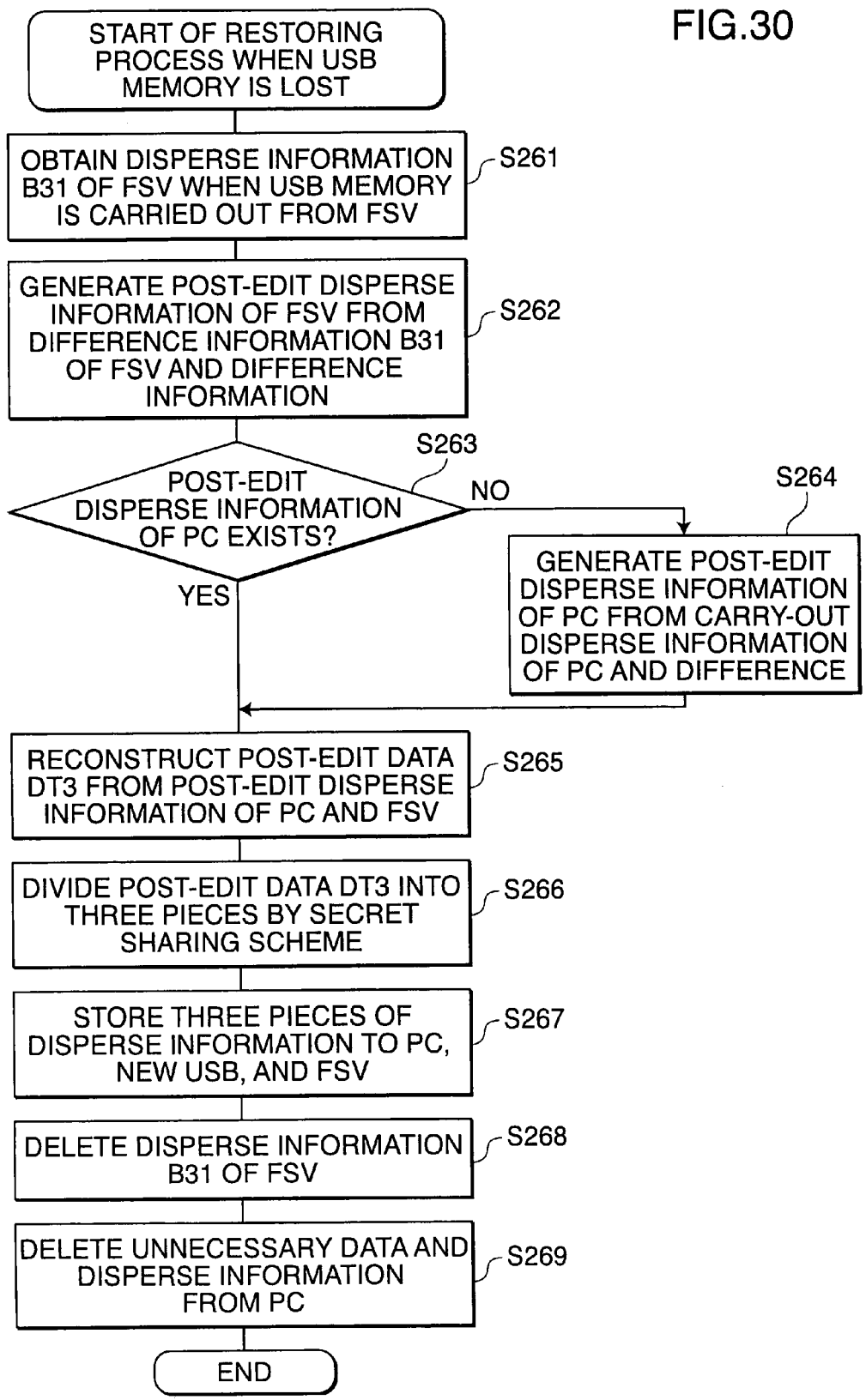
FIG. 30 is a flowchart of a reconstructing process performed when a USB memory is lost in the second embodiment of the invention.

FIG. 30 shows the flowchart of the post-edit data reconstructing process performed when the USB memory is lost in the second embodiment.

FIG. 31 is a diagram showing changes in storages of the disperse information and the like in the reconstructing process.

It is assumed that the user performs the editing process in an outside place and, after that, looses the USB memory. The user returns from the outside place, connects the personal computer PC and the file server FSV to each other, and executes the reconstructing process in the personal computer PC.

It is assumed that, at the time of start of the reconstructing process, as shown in FIG. 31, the carry-out disperse information B11 and the difference information S(B13-B11) and S(B33-B31) is stored in the personal computer PC. Each of the two pieces of difference information is the difference for the carry-out disperse information of the personal computer PC.

It is also assumed that the disperse information B31 in the file server FSV at the time of carry-out is stored in the file server FSV.

First, in step S261, the personal computer PC obtains the disperse information B31 of the file server FSV from the file server FSV.

Next, in Step 262, the post-edit disperse information B33 for the file server FSV is generated by using the obtained disperse information B31 and the stored difference information S(B33-B31) of the file server FSV.

In step S263, a check is made to see whether there is the post-edit disperse information (B13) of the personal computer PC itself or not. If YES, the program advances to step S265. If NO, the program advances to step S264 in order to generate the post-edit disperse information B13 of the personal computer.

In step S264, the post-edit disperse information B13 of the personal computer PC is generated from the carry-out disperse information B11 of the personal computer PC and the difference information S(B13−B11) of the personal computer at the time of editing.

Next, in step S265, the post-edit data DT3 generated is reconstructed by using the post-edit disperse information (B13) of the personal computer PC generated in step S264, and the post-edit disperse information (B33) of the file server FSV generated in step S262.

In step S266, the reconstructed post-edit data DT3 is divided into three pieces of post-edit disperse information (B13, B23, and B33) by the secret sharing scheme.

The post-edit disperse information B23 of the lost USB memory is reproduced.

In step S267, the three pieces of post-edit disperse information (B13, B23, and B33) are stored in the personal computer PC, a new USB memory, and the file server FSV, respectively.

In the case of FIG. 31, the post-edit disperse information B23 is copied in a new USB memory, and the post-edit disperse information B33 is copied in the file server FSV.

In step S268, the carry-out disperse information B31 stored in the file server FSV is deleted. As a result, the disperse information in the file server FSV is updated to post-edit disperse information.

In step S269, the post-edit data DT3 and unnecessary disperse information such as the difference information in the personal computer PC is deleted.

In FIG. 31, B11, B31, S(B13−B11), S(B33−B31), B23, B33, and DT3 is deleted. As a result, only the post-edit disperse information B13 is left in the personal computer PC.

By the above-described processes, also in the case where the USB memory is lost after editing is performed in an outside place, the post-edit data can be reconstructed, the disperse information in the file server FSV can be updated to post-edit information, the storage state of the personal computer PC, the USB memory, and the file server FSV can be synchronized to the post-edit disperse information and, after that, the user can continue the editing process on the post-edit data by an easy operation without re-entering the post-edit data.

Since the post-edit disperse information in the USB memory is reproduced, redundancy is maintained.

Also in the second embodiment, in the case where the number of dividing times of the disperse information "n" is n≧3, the threshold value "k" is 1<k<n, and k pieces of devices (recording devices) are carried, post-edit data can be reconstructed, and disperse information can be updated.

Third Embodiment of the Invention

The case of using the mobile file server MSV 62 in place of the USB memory, dividing data generated by the user into three pieces, and storing the three pieces of data to the personal computer PC, the FSV 61, and the MSV 62 will be described.

Each of the FSV 61 and the MSV 62 is connected to the personal computer PC via a network such as a LAN.

The mobile file server MSV 62 has a CPU and can perform processes such as dispersion, data reconstruction, and the like by itself. The mobile file server MSV 62 has portable size and weight.

In the third embodiment, it is assumed that the personal computer PC and the mobile file server MSV 62 are carried out.

It is also assumed that, before carry-out, the original data DT1 generated by the user is divided into three pieces of disperse information (B11, B21, and B31) by the secret sharing scheme, and the three pieces of disperse information (B11, B21, and B31) are stored in the personal computer PC, the MSV 62, and the FSV 61, respectively.

Further, backup information of the disperse information of the personal computer PC and the MSV 62 is stored in the FSV 61.

In the case where the devices are carried out and the original data is edited in an outside place, post-edit disperse information is stored in the personal computer PC and the MSV 62. The USB memory in the first embodiment is replaced with the MSV 62, the difference information of the personal computer PC and the MSV 62 is calculated, the personal computer PC stores the difference information of the MSV 62, and the MSV 62 stores the difference information of the personal computer PC.

It is assumed that the editing process is performed by the personal computer PC in an outside place in a manner similar to the first and second embodiments.

The reconstruction of data before carry-out, dispersing of post-edit data, storage of disperse information, and calculation of the difference in disperse information in an outside place may be executed by the personal computer PC or the MSV 62, or may be independently executed by each of the personal computer PC and the MSV 62.

FIG. 32 shows the flowchart of the dispersing process before carry-out in the third embodiment.

The flowchart is substantially the same as that of FIG. 4 in the first embodiment.

Ii is sufficient to replace the USB memory in FIGS. 4 and 5 with the mobile file server MSV 62. However, in the case where the dispersing process in step S301 is executed by the MSV 62, three pieces of disperse information (B11, B21, and B31) are generated by the MSV 62, so that the disperse information B11 in the personal computer PC and the disperse information B31 in the FSV 61 is deleted from the MSV 62 in step S304. After the dispersing process, the disperse information (B11 and B21) is stored in the personal computer PC and the MSV 62 which are carried out.

(Original Data Reconstructing Process in Third Embodiment)

Next, the process for generating original data DT1 in the case where the user carries out the personal computer PC and the MSV 62 and, in an outside place, edits the original data DT1 will be described.

Since the disperse information (B11 and B21) is stored in the personal computer PC and the MSV 62, the original data DT1 is reconstructed from the two pieces of disperse information.

In the case of performing the editing a plurality of times in an outside place and further performing the editing, post-edit disperse information in the personal computer PC and the MSV 62 is generated by using the difference information stored in the personal computer PC and the MSV 62 and, after that, the latest post-edit data is reconstructed.

In the case of the third embodiment, the personal computer PC and the mobile file server FSV 62 are connected to a network and, after that, the editing is performed. Various connection modes such as a wired LAN, a wireless LAN, the Internet, VPN, and the like can be used.

FIG. 33 shows the flowchart of the data reconstructing process of the third embodiment, which corresponds to the flowchart shown in FIG. 7 except that the data restoring process is executed by the mobile file server MSV 62. Alternatively, the data reconstructing process may be performed by the personal computer PC.

Also in FIG. 33, the original data DT1 at the time of carry-out is reconstructed by using the two pieces of disperse information (B11 and B21) at the time of carry-out (step S312 and steps S314 to S316). Alternatively, in the case of reconstructing the post-edit data (DTn) subjected to the editing process a plurality of times, after generating the post-edit disperse information of PC and MSV62 by using the stored difference, the post-edit data (DTn) is reconstructed from the two pieces of disperse information (steps S313 and S315).

As described above, the data reconstructing process of the third embodiment is almost the same as the reconstructing process in FIG. 7 of the first embodiment in which the USB memory is replaced with the MSV.

(Dispersive Storing Process of Post-Edit Data in Third Embodiment)

Figure 34:
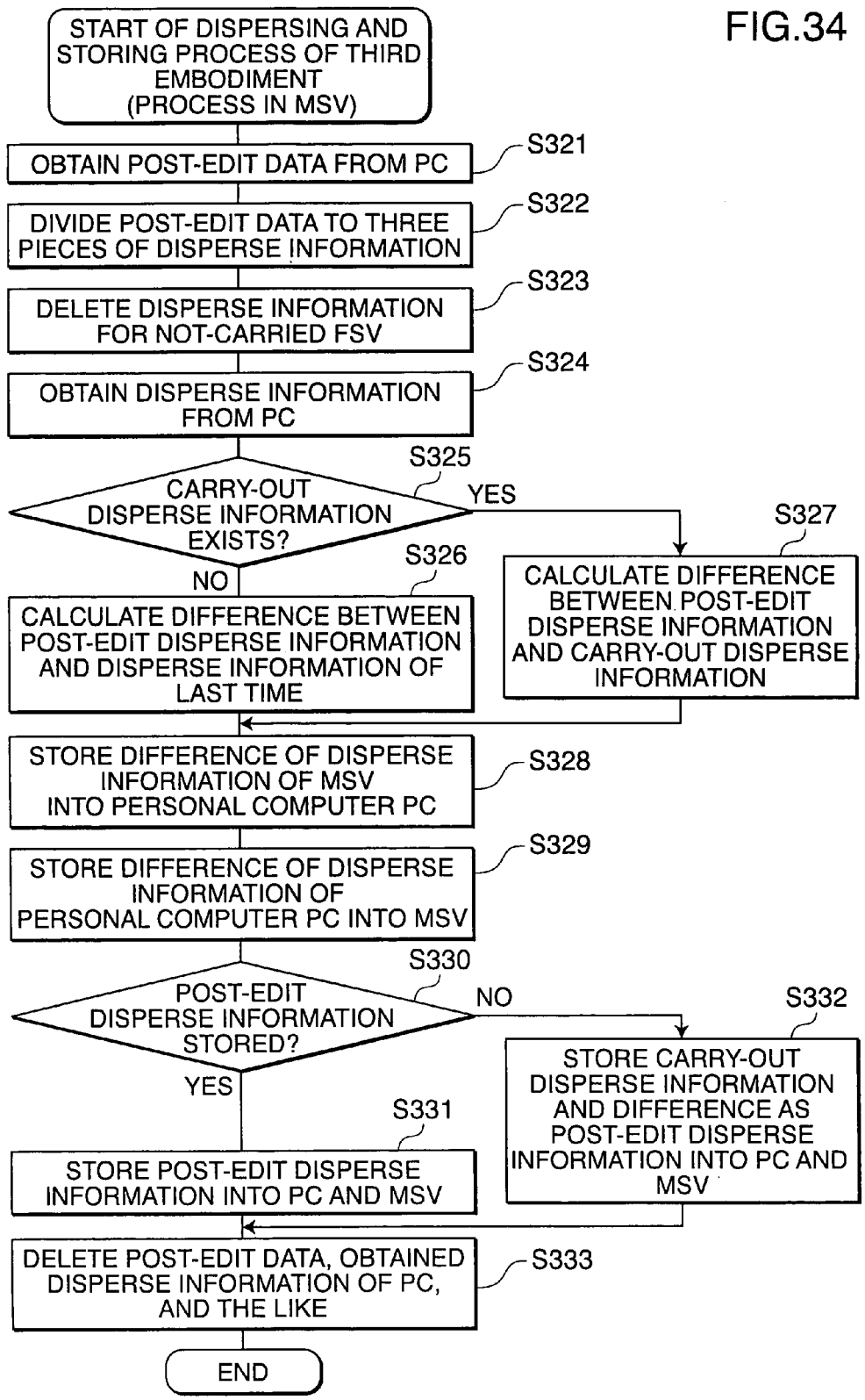
FIG. 34 is a flowchart of a dispersing and storing process of the third embodiment of the invention.

FIG. 34 shows a flowchart of a process of dispersively storing post-edit data in the third embodiment.

The dispersive storing process is executed in the case where the user edits data by the personal computer PC in an outside place and gives an instruction of storing the data.

FIG. 34 corresponds to the flowchart of FIG. 13 and differs from the first embodiment with respect to the point that the processes such as dispersing, storage, and erasing are performed by the MSV 62.

The MSV 62 obtains data edited by the personal computer PC from the personal computer PC (S321), divides the post-edit data to three pieces of disperse information, and generates difference information from the pre-edit disperse information and the post-edit disperse information. The difference information for the MSV 62 is stored in the personal computer PC, and the difference information for the personal computer PC is stored in the MSV 62. The series of processes are similar to those of the flowchart of FIG. 13.

(Disperse Information Updating Process of Third Embodiment)

Figure 35:
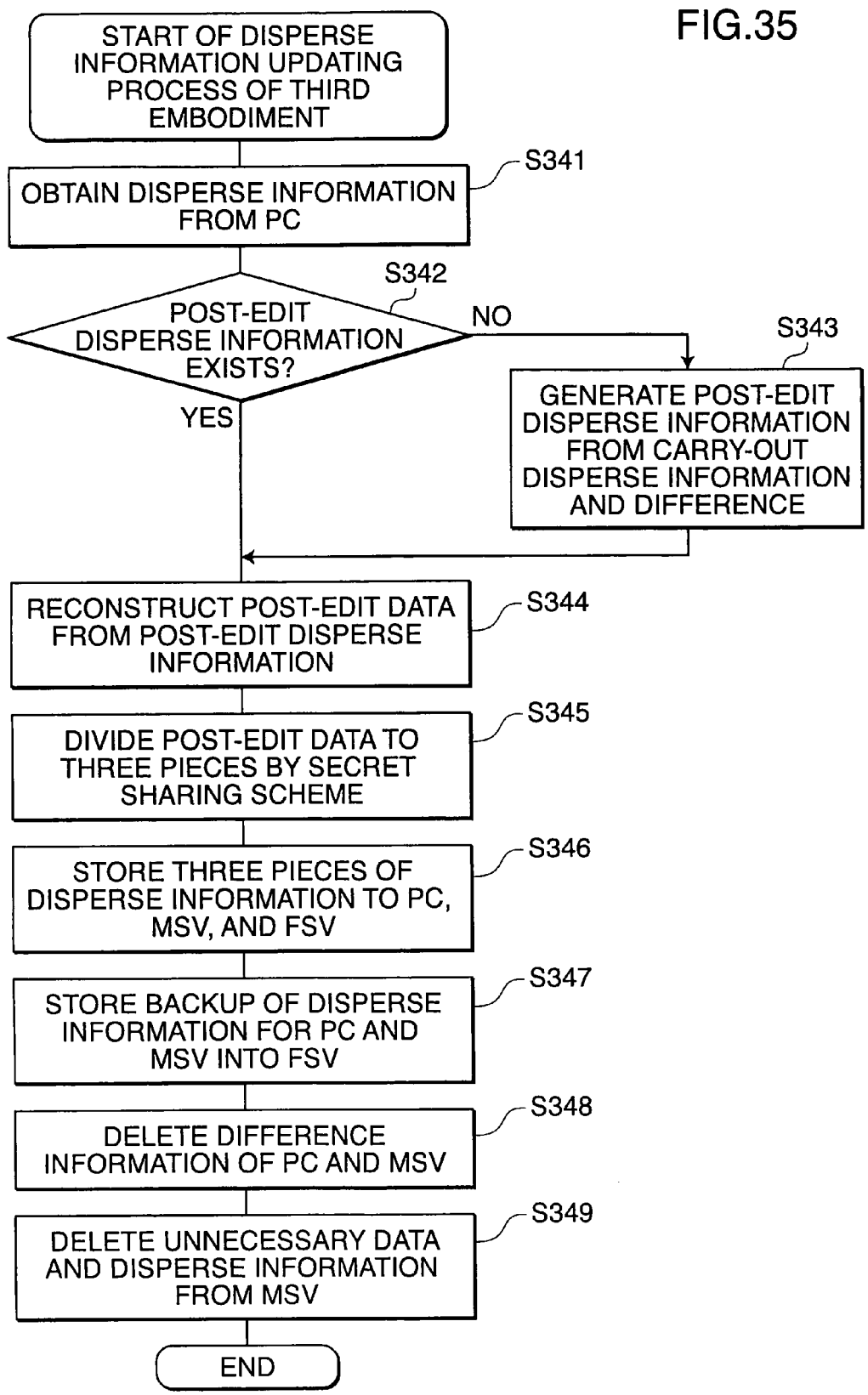
FIG. 35 is a flowchart of a disperse information updating process of the third embodiment of the invention.

FIG. 35 shows the flowchart of a disperse information updating process of the third embodiment.

The updating process is performed after the user edits data in an outside place, returns from the outside place, and connects the personal computer PC, the MSV 62, and the FSV 61 via a network. The flowchart of FIG. 35 corresponds to the updating process of FIG. 16.

From the post-edit disperse information in the personal computer PC and the MSV 62 carried back, the post-edit data is reconstructed. The reconstructed post-edit data is divided again into three pieces of disperse information. The post-edit disperse information for the not-carried FSV 61 is generated, and the disperse information stored as backup information in the FSV 61 is updated to post-edit information. The series of processes are similar to those of the flowchart of FIG. 16.

(Reconstructing Process performed when MSV is lost in the Third Embodiment)

Figure 36:
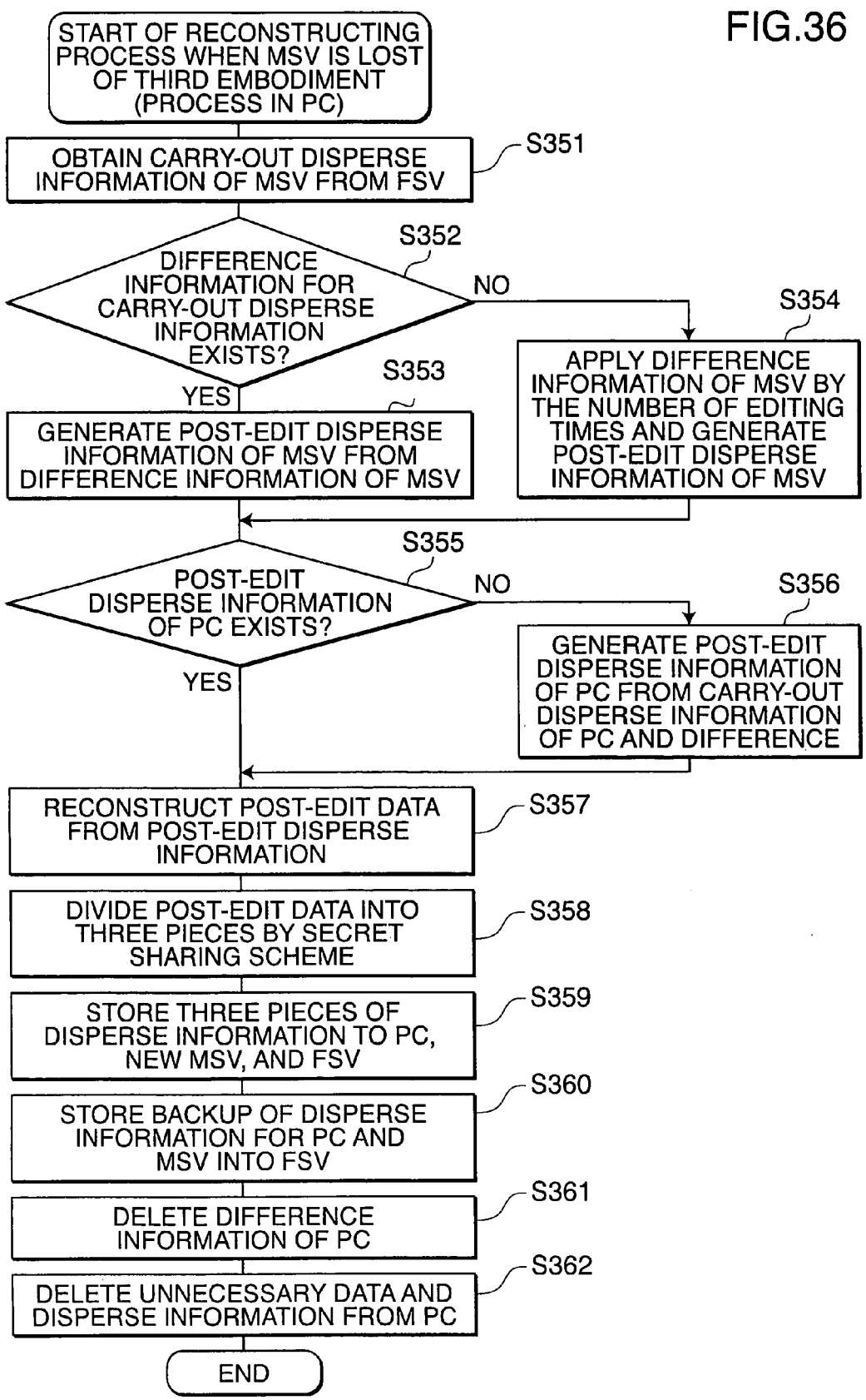
FIG. 36 is a flowchart of a reconstructing process performed when an MSV is lost in the third embodiment of the invention.

FIG. 36 shows the flowchart of the post-edit data reconstructing process performed when an MSV is lost in the third embodiment. The reconstructing process is a process performed in the case where data is edited in an outside place and, after that, a mobile file server MSV is lost on the outside. When the user returns from the outside, the reconstructing process is performed in such a manner that the post-edit data is reconstructed, disperse information of the post-edit data is stored in a new mobile file server MSV, and backup information of the disperse information in the FSV is also updated to the post-edit data.

The flowchart of FIG. 36 corresponds to the reconstructing process of FIG. 19.

In FIG. 36, post-edit disperse information of the MSV is generated from carry-out disperse information for the MSV whose backup data is stored in the FSV 61 and the difference information for the MSV in the carried personal computer PC.

The post-edit data is reconstructed from the post-edit disperse information in the personal computer PC and the post-edit disperse information in the MSV. Further, the reconstructed post-edit data is divided into three pieces of disperse information, and the three pieces of disperse information are stored in the PC, the MSV, and the FSV. After that, the editing can be performed by using the post-edit data and the disperse information.

In FIG. 36, the case where the MSV 62 is lost has been described. By performing similar processes also in the case where the personal computer PC is lost in an outside place, the post-edit data can be reconstructed. In this case, a new personal computer PC is prepared. By the new personal computer PC, processes similar to those of FIG. 36 are executed.

Fourth Embodiment of the Invention

In a fourth embodiment, the case of using the mobile file server MSV 62 in place of the USB memory in the second embodiment and backup information of the personal computer PC and the MSV 62 is not stored in the file server FSV 61 will be described.

The fourth embodiment is different from the second embodiment with respect to the point that the mobile file server MSV 62 is used. The reconstructing process before editing, the process of generating the post-edit difference information performed at the time of storage after the editing, and the like are similar to those of the second embodiment.

In a manner similar to the third embodiment, data reconstruction, dispersive storage, difference information calculation, and the like may be performed by the MSV 62 in an outside place or may be performed independently in each of the personal computer PC and the MSV 62. The editing process in an outside place is performed by the personal computer PC.

Figure 37:
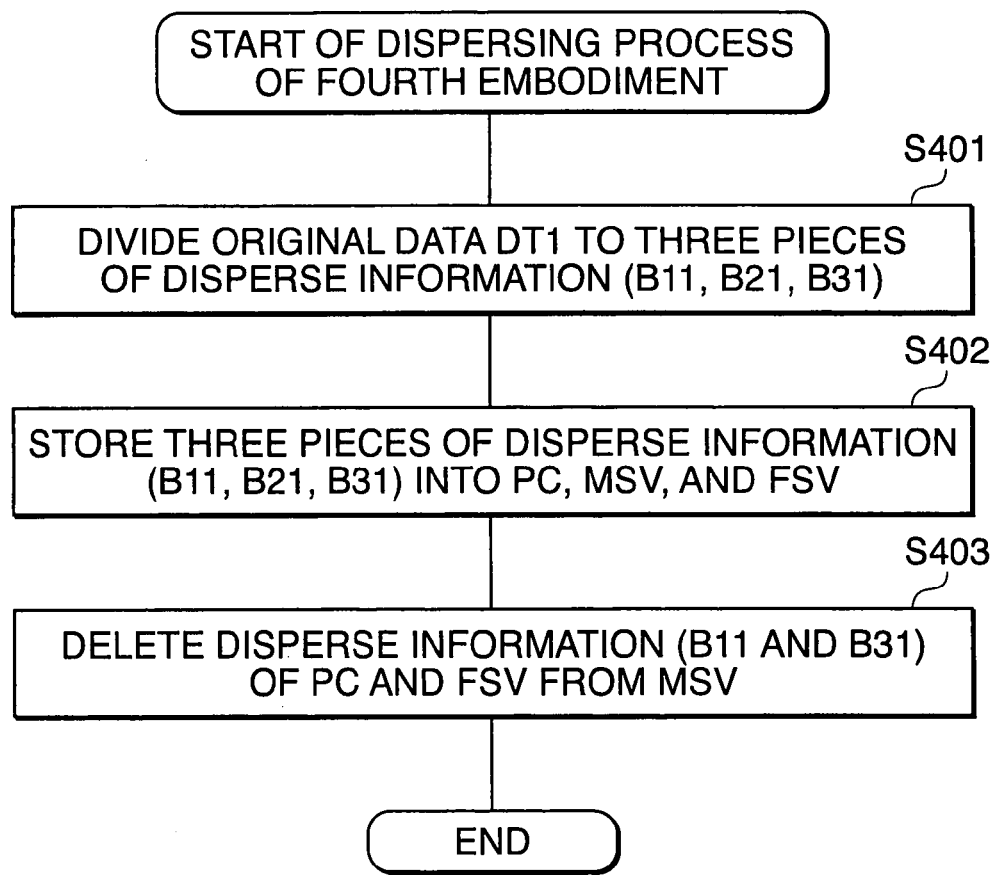
FIG. 37 is a flowchart showing a dispersing process of a fourth embodiment of the invention.

FIG. 37 shows a flowchart of the dispersing process performed before the devices are carried out in the fourth embodiment. The flowchart is substantially the same as that of FIG. 21 of the second embodiment. FIG. 37 shows the case where the dispersing process is performed by the mobile file server MSV 62.

In step S403, three pieces of disperse information (B11, B21, and B31) are generated by the MSV 62, so that the disperse information B11 of the personal computer PC and the disperse information B31 of the FSV 61 is deleted from the MSV 62. The original data DT1 generated in the personal computer PC is also deleted.

After the dispersing process, the disperse information (B11 and B21) is stored in the personal computer PC and the MSV 62 which are carried out. In the FSV 61, backup information of the disperse information of the personal computer PC and the MSV 62 is not stored but only the disperse information B31 of the FSV is stored.

(Original Data Reconstructing Process of Fourth Embodiment)

The process for generating original data to edit the original data DT1 in an outside place by the personal computer PC and the MSV 62 which are carried out will be described.

The original data DT1 is edited in an outside place after the personal computer PC and the MSV are connected to each other via a network.

Figure 38:
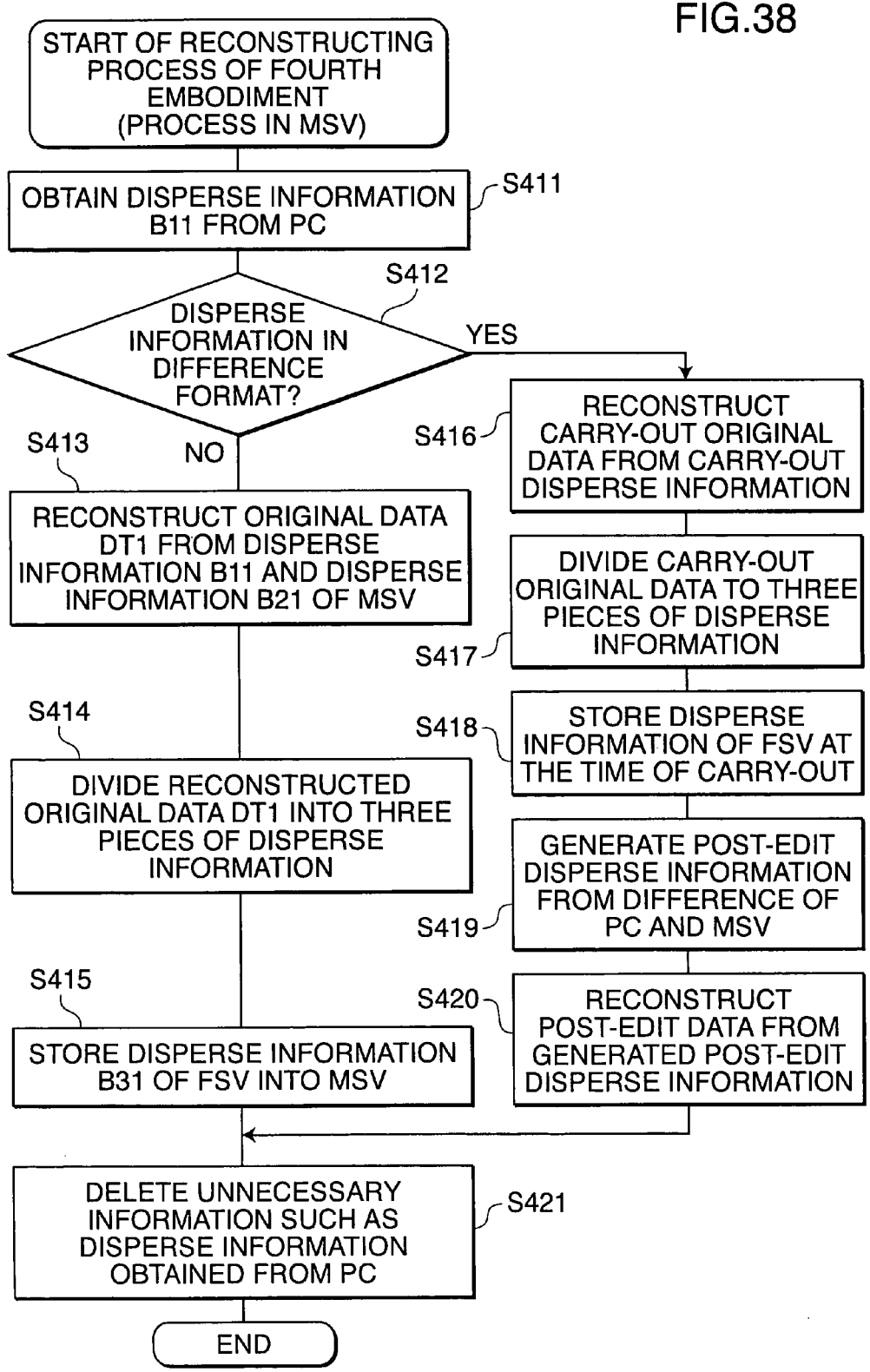
FIG. 38 is a flowchart showing a reconstructing process of the fourth embodiment of the invention.

FIG. 38 shows the flowchart of the data reconstructing process of the fourth embodiment. The flowchart corresponds to the flowchart shown in FIG. 23. The flow of FIG. 38 relates to the case of performing the data reconstructing process by the MSV 62. The data reconstructing process can be also performed by the personal computer PC.

In FIG. 38, the original data DT1 at the time of carry-out is reconstructed by using the two pieces of disperse information (B11 and B21) at the time of carry-out (step S413). The reconstructed original data DT1 is divided into three pieces of disperse information, and the disperse information (B31) for the file server FSV is stored in the MSV 62 (S415).

In the case of restoring post-edit data subjected to the editing operation a plurality of times, post-edit disperse information in the personal computer PC and the MSV 62 is generated by using the stored difference information and, after that, the post-edit data is reconstructed from the two pieces of disperse information.

As described above, the data reconstructing process of the fourth embodiment is substantially the same as the reconstructing process in FIG. 23 of the second embodiment except for the point that the USB memory is replaced by the MSV.

(Dispersive Storing Process of Post-Edit Data in Fourth Embodiment)

Figure 39:
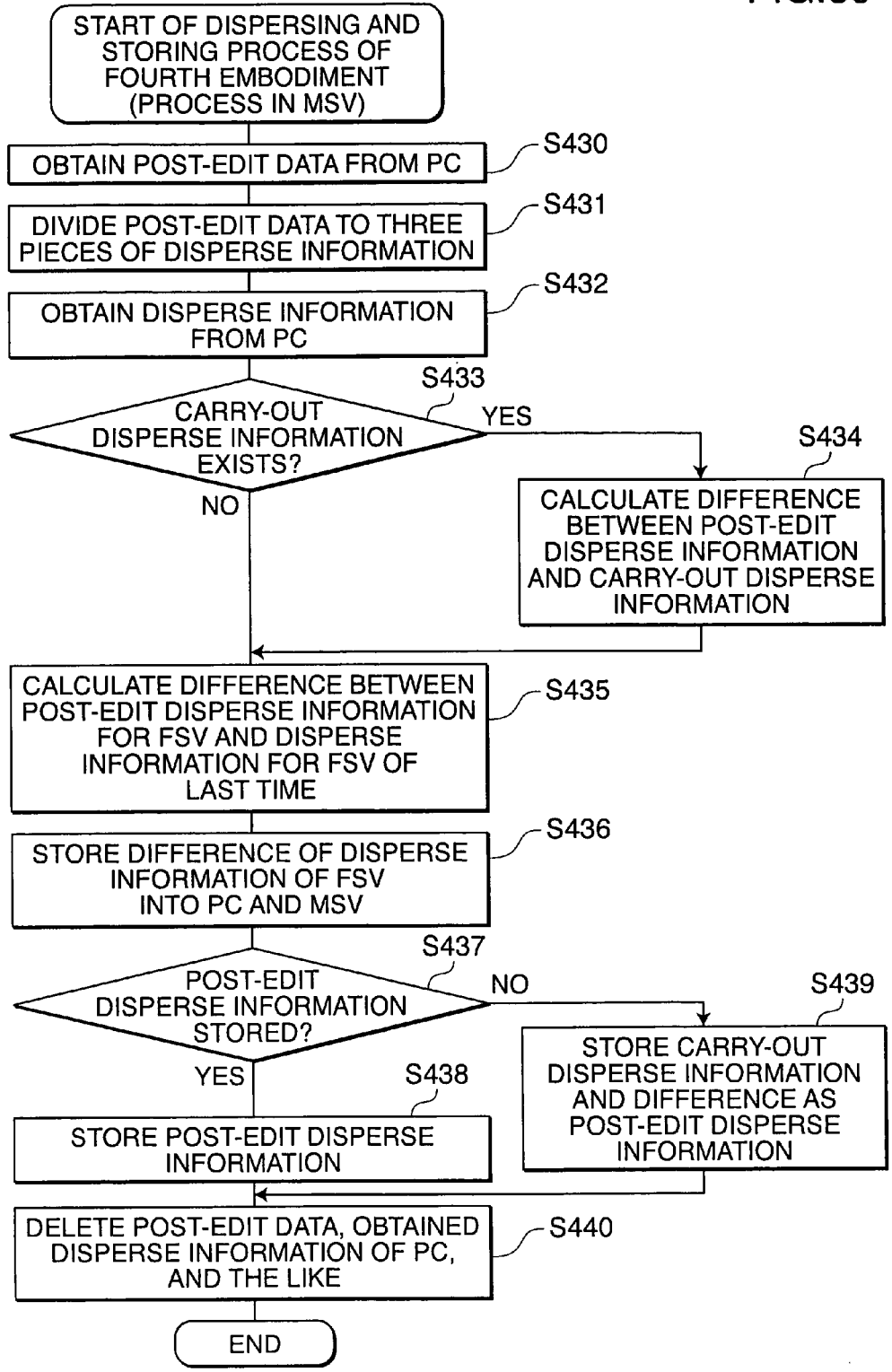
FIG. 39 is a flowchart showing a dispersing and storing process of the fourth embodiment of the invention.

FIG. 39 is a flowchart of a process of dispersively storing post-edit data in the fourth embodiment.

The dispersive storing process is executed in the case where the user edits data by the personal computer PC in an outside place and gives an instruction of storing the data.

FIG. 39 shows the case where the dispersive storing process is performed by the MSV 62. Alternatively, a similar process may be performed by the personal computer PC.

The MSV 62 obtains data edited by the personal computer PC from the personal computer PC, divides the post-edit data to three pieces of disperse information, and generates difference information for the FSV from the pre-edit and post-edit disperse information for the FSV. The difference information for the FSV is stored in both of the personal computer PC and the MSV 62.

The series of processes are similar to those of the flowchart of FIG. 26.

(Disperse Information Updating Process of Fourth Embodiment)

FIG. 40 shows the flowchart of a disperse information updating process of the fourth embodiment.

The flowchart of FIG. 40 corresponds to the updating process of FIG. 28 in the second embodiment.

The updating process is performed after the user edits data in an outside place, returns from the outside place, and connects the personal computer PC, the MSV, and the FSV via a network.

Although FIG. 40 shows the processes in the MSV 62, similar processes may be performed by the personal computer PC.

First, the disperse information of the FSV stored in the FSV is obtained. By using the difference information of the FSV generated at the time of editing in the outside place and the obtained disperse information of the FSV, post-edit disperse information of the FSV is generated.

When there is no post-edit disperse information in the personal computer PC and the MSV, the post-edit data is generated by using the difference information generated at the time of editing and the carry-out disperse information.

The generated post-edit disperse information for the PC, MSV, and FSV is stored in the PC, MSV, and FSV, respectively.

As a result, all of the disperse information in the PC, MSV, and FSV is updated to post-edit disperse information. The series of processes are similar to those of the flowchart of FIG. 28 in the second embodiment.

(Reconstructing Process performed when MSV is lost in the Fourth Embodiment)

Figure 41:
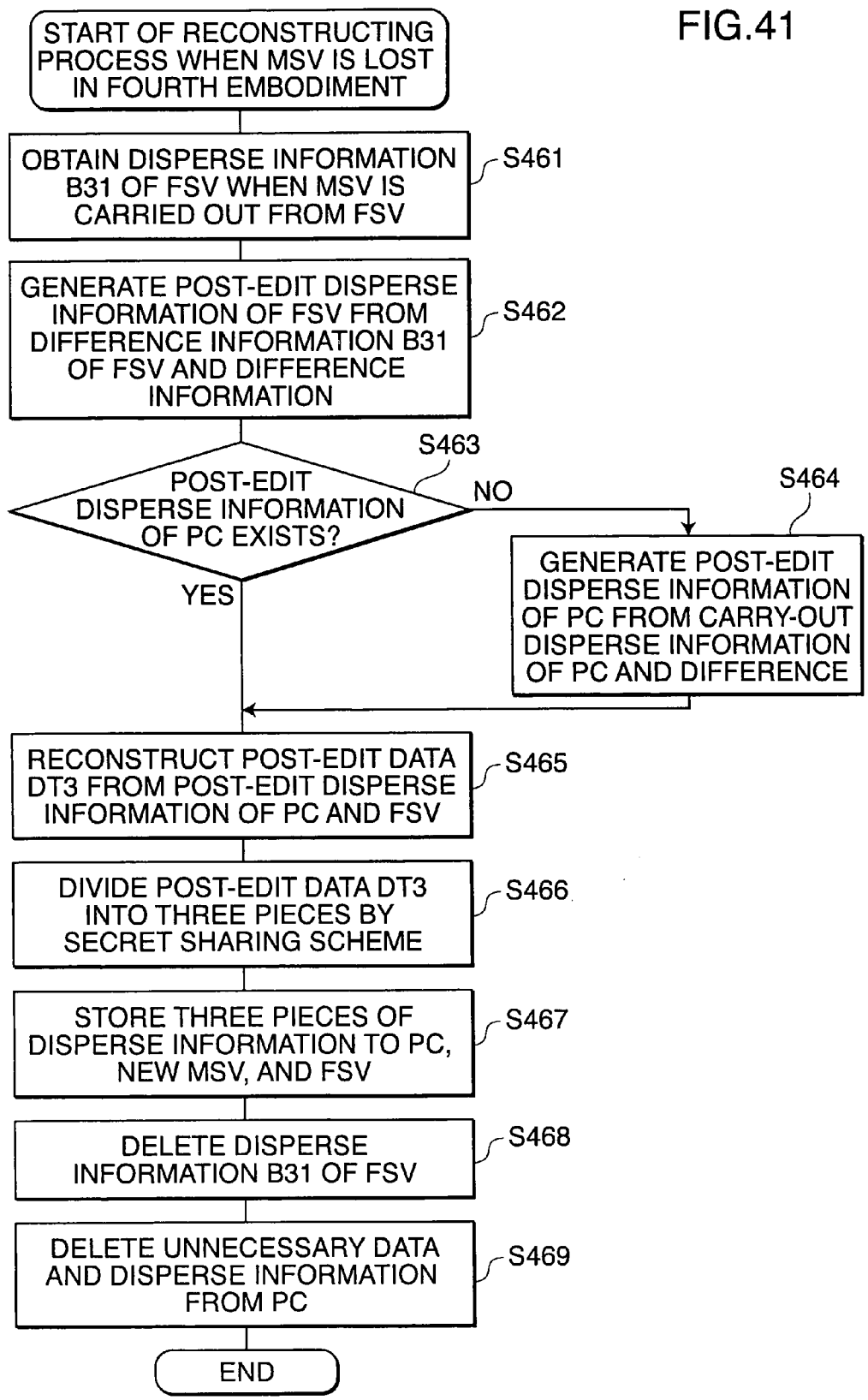
FIG. 41 is a flowchart of a reconstructing process performed when an MSV is lost in the fourth embodiment of the invention.
Figure 42:
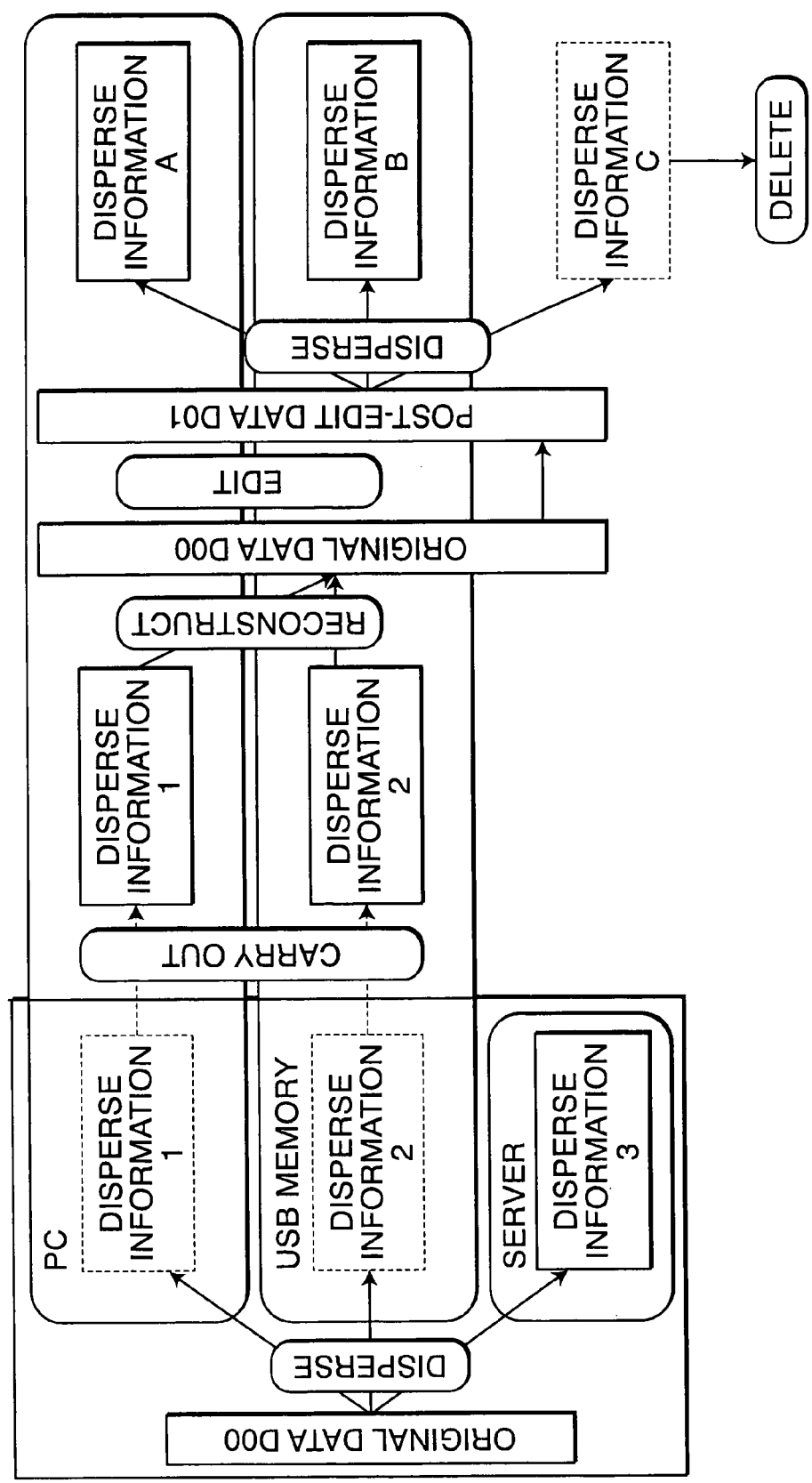
FIG. 42 is a diagram showing conventional information dispersing and reconstructing process.

FIG. 41 shows the flowchart of the reconstructing process performed when an MSV is lost in the fourth embodiment.

The flowchart of FIG. 41 corresponds to the reconstructing process of FIG. 30 of the second embodiment.

The process is performed in the case where the MSV is lost in an outside place, and the user returns from the outside, connects the PC, the MSV, and FSV via a network, reconstructs the post-edit data generated on the outside, and updates the disperse information stored in the PC, a new MSV, and the FSV to the post-edit data.

The flow of FIG. 41 shows the case where the process is performed by the personal computer PC. Alternatively, a similar process can be performed by a new MSV.

In FIG. 41, the carry-out disperse information of the FSV is obtained from the FSV, and the post-edit disperse information of the FSV is generated by using the obtained disperse information of the FSV and the difference information of the FSV stored in the personal computer PC (S461 and S462).

Next, in the case where the post-edit disperse information of the personal computer PC is not stored in the personal computer PC, the post-edit disperse information of the PC is generated from carry-out disperse information for the personal computer PC and the difference information (S464). From the generated post-edit disperse information of the PC and the FSV, post-edit data is reconstructed (S465).

After that, the reconstructed post-edit data is divided into three pieces of disperse information, and the three pieces of disperse information are stored in the PC, the new MSV, and the FSV (S466 and S467).

By the above-described processes, even if the MSV is lost, the post-edit data can be restored and the disperse information in the personal computer PC, the new MSV, and the FSV can be updated to the post-edit data.

FIG. 41 shows the case where the MSV 62 is lost. Also in the case where the personal computer PC is lost, by performing a similar process, the post-edit data can be reconstructed.

According to the present invention, in the case where original data DT0 is divided into k pieces of restorable disperse information, the k pieces of disperse information are stored in k pieces of different recording devices, and the recording devices are carried out, even if the data is edited in an outside place and, after that, one of the recording devices is lost, the post-edit disperse information corresponding to the lost recording device can be restored. Thus, while assuring redundancy of the disperse information, the post-edit data can be reconstructed.

What is claimed is:

1. An information processor having an information dispersing function, comprising:
a dividing unit for dividing a first data into n pieces of disperse information, and executing secret sharing scheme capable of restoring the first data by using arbitrary k pieces (1<k<n) of disperse information out of the n pieces of disperse information;

a first storage control unit for storing the arbitrary k pieces of disperse information out of the disperse information generated by the dividing unit into plurality of recording devices;

an editing unit for reconstructing the first data by using the k pieces of disperse information stored in the plurality of recording devices and editing the restored first data;

a difference generating unit, after the dividing unit divides a second data which is post-edit data originated in the restored first data into n pieces of post-edit disperse information, for calculating the difference between post-edit disperse information corresponding to the recording device and pre-edit disperse information which has been stored in the recording device; and a second storage control unit for storing, for each of the recording devices, the post-edit disperse information of the recording device and the difference corresponding to the other recording devices.

2. An information processor having an information dispersing function, comprising:

a dividing unit for dividing a first data into n pieces of disperse information, and executing secret sharing scheme capable of restoring the first data by using arbitrary k pieces (1<k<n) of disperse information out of the n pieces of disperse information;

a first storage control unit for storing the arbitrary k pieces of disperse information, out of the disperse information generated by the dividing unit into plurality of recording devices;

an editing unit for reconstructing the first data by using the k pieces of disperse information stored in the plurality of recording devices and editing the restored first data;

a difference generating unit, after the dividing unit divides a second data which is post-edit data originated in the restored first data into n pieces of post-edit disperse information, for calculating the difference between (n-k) pieces of post-edit disperse information which do not correspond to any of the recording devices and (n-k) pieces of pre-edit disperse information which do not correspond to any of the recording devices; and wherein (n-k) pieces of pre-edit disperse information obtain from the restored first data, and a second storage control unit for storing, for each of the recording devices, the post-edit disperse information of the recording device and the difference.

3. The information processor according to claim 1, wherein the recording device is a portable recording medium which is detachable from the information processor and, by connecting the recording medium, an editing work can be performed.

4. The information processor according to claim 3, wherein the remaining (n-k) pieces of disperse information which are not stored in the plurality of recording devices out of the n pieces of disperse information generated by the dividing unit are stored in (n-k) pieces of not-carried information devices in a one-to-one corresponding manner, one of the not-carried information devices is a file server, and all of the n pieces of disperse information generated by the dividing unit are stored in the file server before the recording devices are carried out.

5. The information processor according to claim 2, wherein the recording device is a portable recording medium, the remaining (n-k) pieces of disperse information which are not stored in the plurality of recording devices out of the n pieces of disperse information generated by the dividing unit are stored in (n-k) pieces of not-carried information devices in a one-to-one corresponding manner, and the (n-k) pieces of differences correspond to the (n-k) pieces of information devices in a one-to-one corresponding manner.

6. The information processor according to claim 4 or 5, wherein the pre-edit disperse information is carry-out disperse information generated by the dividing unit before the recording device is carried out.

7. The information processor according to claim 4 or 5, wherein when the pre-edit disperse information is carry-out disperse information generated by the dividing unit before the recording device is carried out, the second storage control unit stores the carry-out disperse information and the difference generated by the difference generating unit in each of the recording devices, but does not store the post-edit disperse information.

8. The information processor according to claim 4 or 5, wherein the pre-edit disperse information is post-edit disperse information generated in an editing operation of last time, the difference is calculated from the post-edit disperse information and the pre-edit disperse information and, when the editing operation is performed a plurality of times, all of differences calculated for the editing operations of the plurality of times are stored.

9. The information processor according to claim 4 or 5, wherein the portable recording medium is any of a flash memory, a USB memory, a magneto-optical recording medium, a magnetic recording medium, and a network storage.

10. The information processor according to claim 4, further comprising a reconstructing unit for generating post-edit disperse information corresponding to the k pieces of recording devices from disperse information corresponding to the k pieces of recording devices stored in the file server and the differences corresponding to the recording devices stored by the second storage control unit after editing, and reconstructing the post-edit data from the generated k pieces of post-edit disperse information.

11. The information processor according to claim 10, further comprising an updating unit for storing n pieces of post-edit disperse information into corresponding k pieces of recording devices and (n-k) pieces of information devices, wherein the n pieces of post-edit disperse information are the information obtained by dividing the post-edit data reconstructed by the reconstructing unit into n pieces by the dividing unit.

12. The information processor according to claim 5, further comprising an updating unit for generating post-edit disperse information corresponding to the not-carried (n-k) pieces of information devices from (n-k) pieces of differences generated by the difference generating unit and (n-k) pieces of disperse information stored in the not-carried (n-k) pieces of information devices, and storing the generated post-edit disperse information into the corresponding (n-k) pieces of information devices.

13. A program embodied on a non-transitory recording medium, executed by an information processor of a computer, comprising:

a dividing function of dividing a first data into n pieces of disperse information, and executing secret sharing scheme capable of restoring the first data by using arbitrary k pieces (1<k<n) of disperse information out of the n pieces of disperse information;

a first storage control function of storing the arbitrary k pieces of disperse information out of the n pieces of disperse information generated into plurality of different recording devices;

an editing function of reconstructing the first data by using the k pieces of disperse information stored in the recording devices and editing the restored first data;

a difference generating function, after division of post-edit data into n pieces of post-edit disperse information, of calculating the difference between post-edit disperse information corresponding to the recording device and pre-edit disperse information which has been stored in the recording device; and a second storage control function of storing, for each of the recording devices, the post-edit disperse information of the recording device and the difference corresponding to the other recording devices.

14. A program of an information processor for making a computer realize:

a dividing function of dividing a first data into n pieces of disperse information, and executing secret sharing scheme capable of restoring the first data DT0 by using arbitrary k pieces ($1<k<n$) of disperse information out of the n pieces of disperse information;

a first storage control function of storing the arbitrary k pieces of disperse information out of the n pieces of disperse information generated into plurality of different recording devices;

an editing function of reconstructing the first data by using the k pieces of disperse information stored in the plurality of recording devices and editing the restored first data;

a difference generating function, after division of post-edit data to n pieces of post-edit disperse information, of calculating the difference between (n–k) pieces of post-edit disperse information which do not correspond to any of the recording devices and (n–k) pieces of pre-edit disperse information which do not correspond to any of the recording devices; and wherein (n–k) pieces of pre-edit disperse information obtain from the restored first data, and a second storage control function of storing, for each of the recording devices, the post-edit disperse information of the recording device and the difference.

15. An information dispersing and storing system comprising an information processor capable of editing a first data, a plurality of portable recording devices, and a file server connected to the information processor via a network, wherein the information processor comprises:

a dividing unit for dividing the first data into n pieces of disperse information, and executing secret sharing scheme capable of restoring the first data by using arbitrary k pieces ($1<k<n$) of disperse information out of the n pieces of disperse information;

a first storage control unit for storing the arbitrary k pieces of disperse information out of the disperse information generated by the dividing unit into plurality of different portable recording devices;

an editing unit for reconstructing the first data by using the k pieces of disperse information stored in the plurality of recording devices and editing the restored first data;

a difference generating unit, after the dividing unit divides a second data which is post-edit data originated in the restored first data into n pieces of post-edit disperse information, for calculating the difference between post-edit disperse information corresponding to the recording device and pre-edit disperse information which has been stored in the recording device; and a second storage control unit for storing, for each of the recording devices, the post-edit disperse information of the recording device and the difference corresponding to the other recording devices, when the recording device and the information processor are carried out, all of carry-out disperse information generated by the dividing unit before carry-out is stored in the file server, in each of the recording devices, carry-out disperse information generated by the dividing unit before carry-out and corresponding to the recording device is stored, and after the editing process by the editing unit, post-edit disperse information corresponding to the recording device and the difference is stored by the second storage control unit.

16. The information dispersing and storing system according to claim 15, further comprising a reconstructing unit, when a recording device A out of the carried recording devices is lost, for generating post-edit disperse information corresponding to the recording device A by using carry-out disperse information corresponding to the recording device A and stored in the file server and the differences corresponding to the recording device A and stored by the recording devices other than the recording device A, and reconstructing post-edit data from post-edit disperse information corresponding to the recording devices other than the recording device A and stored in the other recording devices and the generated post-edit disperse information corresponding to the recording device A.

17. An information dispersing and storing system comprising an information processor capable of editing a first data, a plurality of portable recording devices, and a file server connected to the information processor via a network, wherein the information processor comprises:

a dividing unit for dividing the first data into n pieces of disperse information, and executing secret sharing scheme capable of restoring the first data by using arbitrary k pieces ($1<k<n$) of disperse information out of the n pieces of disperse information;

a first storage control unit for storing the arbitrary k pieces of disperse information which can be carried, out of the disperse information generated by the dividing unit into plurality of recording devices;

an editing unit for reconstructing the first data by using the k pieces of disperse information stored in the plurality of recording devices and editing the restored first data;

a difference generating unit, after the dividing unit divides a second data which is post-edit data originated in the restored first data into n pieces of post-edit disperse information, for calculating the difference between (n–k) pieces of post-edit disperse information which do not correspond to any of the recording devices and (n–k) pieces of pre-edit disperse information which do not correspond to any of the recording devices; and wherein (n–k) pieces of pre-edit disperse information obtain from the restored data DT0, and a second storage control unit for storing, for each of the recording devices, the post-edit disperse information of the recording device and the difference, and when the recording devices and the information processor are carried out, carry-out disperse information generated by the dividing unit before carry-out and corresponding to the file server and the recording devices is stored in the file server and the recording devices.

18. The information dispersing and storing system according to claim 17, further comprising a reconstructing unit, when a recording device A out of the carried recording devices is lost, for generating post-edit disperse information corresponding to the file server by using carry-out disperse information corresponding to the file server and stored in the file server and the difference corresponding to the file server and stored in the recording device other than the recording device A, and reconstructing post-edit data from post-edit disperse information corresponding to the recording devices other than the recording device A and stored in the other recording devices and the generated post-edit disperse information corresponding to the file server.

19. An information processor according to claim 1 or 2, wherein the plurality of recording devices are k pieces of portable recording devices.

* * * * *

UNITED STATES PATENT AND TRADEMARK OFFICE
CERTIFICATE OF CORRECTION

PATENT NO. : 7,818,579 B2
APPLICATION NO. : 11/800639
DATED : October 19, 2010
INVENTOR(S) : Nishiguchi et al.

It is certified that error appears in the above-identified patent and that said Letters Patent is hereby corrected as shown below:

In the Claims:

Col. 39, line 14, delete "A program of an information processor for making a computer realize" and insert --A program embodied on a non-transitory recording medium, executed by an information processor of a computer comprising--.

Signed and Sealed this
Eighth Day of March, 2011

David J. Kappos
*Director of the United States Patent and Trademark Office*